(12) United States Patent
Tanaka

(10) Patent No.: US 8,727,256 B2
(45) Date of Patent: May 20, 2014

(54) SEATBELT RETRACTOR

(75) Inventor: Masataka Tanaka, Osaka (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 210 days.

(21) Appl. No.: 13/384,857

(22) PCT Filed: Sep. 24, 2010

(86) PCT No.: PCT/JP2010/067292
§ 371 (c)(1),
(2), (4) Date: Jan. 19, 2012

(87) PCT Pub. No.: WO2011/040615
PCT Pub. Date: Apr. 7, 2011

(65) Prior Publication Data
US 2012/0119010 A1    May 17, 2012

(30) Foreign Application Priority Data
Sep. 30, 2009 (JP) .................................. 2009-227642

(51) Int. Cl.
*B60R 22/38* (2006.01)

(52) U.S. Cl.
USPC ........................................................ 242/374

(58) Field of Classification Search
USPC ............................ 242/374, 382; 297/471, 472
See application file for complete search history.

(56) References Cited

U.S. PATENT DOCUMENTS

| 6,364,236 | B1 | 4/2002 | Föhl |  |
|---|---|---|---|---|
| 8,403,365 | B2 * | 3/2013 | Tanaka et al. | 280/806 |
| 8,540,178 | B2 * | 9/2013 | Nakaoka et al. | 242/374 |
| 2011/0049284 | A1 * | 3/2011 | Kaneko et al. | 242/374 |
| 2011/0062267 | A1 * | 3/2011 | Nakaoka et al. | 242/374 |
| 2011/0291396 | A1 * | 12/2011 | Tanaka et al. | 280/806 |

FOREIGN PATENT DOCUMENTS

| EP | 1 155 928 A1 | 11/2001 |
| EP | 1 731 388 A1 | 12/2006 |
| GB | 2 312 148 A | 10/1997 |
| JP | A-2003-335217 | 11/2003 |

OTHER PUBLICATIONS

International Search Report dated Dec. 6, 2010 in International Application No. PCT/JP2010/067292.
Written Opinion of the International Searching Authority dated Dec. 6, 2010 in International Application No. PCT/JP2010/067292.

* cited by examiner

*Primary Examiner* — Sang Kim
(74) *Attorney, Agent, or Firm* — Oliff PLC

(57) ABSTRACT

In case one of three clutch pawls protrudes outwardly from the side surface of a pawl base and engages with a clutch gear and the remaining two clutch pawls are not yet engaged with the clutch gear, the peripheral portion of a deforming through hole of the clutch pawl engaging with the clutch gear is plastically deformed and the clutch pawl is deformed in a substantially L-shape while engaging with the clutch gear. Then, the pawl base can be rotated further and the remaining two clutch pawls further protrude outwardly from the side surface of the pawl base and engage with the clutch gear.

6 Claims, 36 Drawing Sheets

SEATBELT RETRACTOR

TECHNICAL FIELD

The present invention relates to a seatbelt retractor which removes the slack of webbing in case of an emergency such as vehicle collision or the like.

BACKGROUND ART

Conventionally, a pretensioner mechanism for retracting a webbing is mounted in a seatbelt retractor provided for a seat of a vehicle for the purpose of holding a passenger effectively and securing safety of the passenger in case of emergency such as vehicle collision.

For instance, a take-up drum onto which a webbing is wound has flange portions formed so as to overhang radially at the both ends of a shaft central direction. A webbing is wound around a drum main body portion between the both flange portions. Further, a coupling body made of a steal material or the like is press-fitted and fixed in a coupling hole portion formed in one of the flange portions in a manner that relative rotation thereof with respect to the take-up drum is disabled (for instance, refer to paragraphs 0010 to 0059 and FIG. 1 through FIG. 9 of Japanese Laid-open Patent Publication No. 2003-335217).

In case of vehicle collision, the pretensioner mechanism operates in the following manner so as to retract the webbing onto the take-up drum and hold a passenger. First, gas is generated from a gas generating member and a rack is caused to move, whereby a pinion gear body is rotated and driven. A cam surface is formed on an inner peripheral surface of one side portion of the pinion gear body and a plurality of clutch rollers are arranged between this cam surface and the coupling body. Then, the rotation of the pinion gear body guides the respective clutch rollers to the cam surface so as to be depressed and operated radially inwardly.

The respective clutch rollers depressed and operated are brought in an engaged state between the cam surface of the pinion gear body and the outer peripheral surface of the engagement shaft portion of the coupling body, whereby the pinion gear body and the coupling body are caused to rotate integrally. Accordingly, the take-up drum is rotated and driven in a webbing-pull-out direction and thereby the webbing is retracted.

DISCLOSURE OF THE INVENTION

However, in the above-described seatbelt retractor disclosed in Japanese Laid-open Patent Publication No. 2003-335217, several operations are carried out in case of vehicle collision between the instant when gas is generated from the gas generating member and thereby the rack starts to move and the instant when retracting of webbing is started. Specifically, operations must be carried out such as rotation of the pinion gear body in response to movement of the rack and depressing operation or the like of the respective clutch rollers radially inwardly in response to the rotation of the pinion gear body. While these operations are being carried out, the webbing will not be retracted. Therefore, there is time delay between the instant when gas is generated from the gas generating member upon detection of vehicle collision and the instant when retraction of the webbing is started and thereby a passenger is restrained. This can result in delay in carrying out an emergency operation for holding a passenger and securing safety of the passenger.

Further, in case of vehicle collision, the clutch rollers are engaged between the cam surface of the pinion gear body and the outer peripheral surface of the engagement shaft portion of the coupling body. As a result, the pinion gear body and the coupling body are coupled and caused to rotate integrally, whereby the webbing is retracted. In this case, it is difficult to finish a series of the processes, namely, from rotation start of the pinion gear body till completion of engagement, at constant length of time in any case. Specifically, the respective positions of the clutch rollers in a normal state are not fixed and thus the positions of the clutch rollers at the time of rotation start differ from each other. This results in variation in engagement processes.

In addition to the difference in the respective positions of the clutch rollers, at least three clutch rollers are kept in a disengagement state until completion of engagement between the cam surface of the pinion gear body and the outer peripheral surface of the engagement shaft of the coupling body. Further, engagement processes differ depending on the difference in condition of the surfaces of the respective members, such as degrees of dirt or damage. Therefore, it is impossible to make time required for engagement of each clutch constant. Further, engagement may further proceeds in accordance with retraction load of webbing and thus driving force may not be transmitted effectively. This may cause variation in required time until retracting of the webbing is started.

The present invention has been made in view of the above-described problems and an object thereof is to provide a seatbelt retractor which can reduce time delay or variation in timing until start of retraction of a webbing onto a take-up drum which is rotated and driven by means of driving unit of the pretensioner mechanism in case of emergency such as vehicle collision, thereby making it possible to retract a webbing promptly.

In order to achieve the above object, there is provided a seatbelt retractor comprising a take-up drum which retracts a webbing and is rotatably housed in a housing, a pretensioner assembly which rotates the take-up drum in its retracting direction to retract the webbing in case of vehicle collision, wherein the pretensioner assembly comprises: a pinion gear body which rotates coaxially with rotational axis of the take-up drum in case of vehicle collision; a driving device which rotates and drives the pinion gear body; a first rotation body which is mounted coaxially and fixedly with the pinion gear body; a second rotation body which is mounted coaxially and fixedly with the pinion gear body and is kept in stationary state in an initial phase of rotation of the pinion gear body; and a plurality of engaging members each formed in a substantially flat plate shape and held between the first rotation body and the second rotation body, the plurality of engaging members each of which includes a first end portion which is rotatably supported at the first rotation body so as to be capable of swinging radially outwardly and a second end portion which is caused to protrude from an outer peripheral portion of the first rotation body and an outer peripheral portion of the second rotation body by swinging of each of the plurality of engaging members radially outwardly in response to relative rotation of the first rotation body with respect to the second rotation body, wherein the take-up drum comprises: a flange portion which extends radially outwardly from an outer periphery of an edge portion of the take-up drum closer to the pinion gear body, the flange portion further extending in a direction of the rotational axis so as to face the outer peripheral portion the first rotation body and the outer peripheral portion of the second rotation body; a clutch gear formed in an inner peripheral surface of the flange portion facing the outer peripheral portion of the first rotation body and the outer peripheral portion of the second rotation body, wherein each of the plurality of engaging members comprises: an engaging pawl portion formed at the second end portion, the engaging pawl portion engaging with the clutch gear at a projecting position of the engaging pawl portion; and a deformable portion formed between the engaging pawl portion and the first end portion, the deformable portion being deformable plastically, and wherein, in case only part of the plurality of engaging members engages with the clutch gear, or in case at least one of the plurality of engaging members has tooth contact with the clutch gear, the deformable portion of the part of the plurality of engaging members or the at least one of the plurality of engaging members is plastically deformed, whereby the first rotation body further rotates with respect to the second rotation body and other part of the plurality of engaging members is caused to protrude further and engages with the clutch gear.

In such a seatbelt retractor, the pinion gear body rotates coaxially with the rotational axis of the take-up drum in case of vehicle collision. In response to this rotation, the first rotation body which is fixed coaxially with the pinion gear body rotates relatively with respect to the second rotation body which is also mounted coaxially with the pinion gear body and is kept in stationary state in an initial phase of the rotation. In response to this relative rotation, the plurality of engaging members in a substantially flat plate shape each of which first end portion is rotatably supported at the first rotation body so as to be capable of swinging radially outwardly, being held between the first rotation body and the second rotation body, are caused to protrude radially outwardly and engage with the clutch gear formed in an inner peripheral surface of the flange portion of the take-up drum.

Accordingly, the rotation of the pinion gear body and the first rotation body is transmitted to the take-up drum through the respective engaging members each of which first end portion is rotatably supported at the first rotation body, whereby retraction of the webbing is started. This contributes to reducing delay or time variance until driving force is transmitted. Further, it is possible to carry out a retracting operation in case of vehicle collision promptly and at a stable timing.

Further, in such a seatbelt retractor, in case only part of the plurality of engaging members engages with the clutch gear, or in ease at least one of the plurality of engaging members has tooth contact with the clutch gear, the deformable portion of the part of the plurality of engaging members or the at least one of the plurality of engaging members is plastically deformed, whereby the first rotation body further rotates relatively with respect to the second rotation body and other part of the plurality of engaging members is caused to protrude further and engages with the clutch gear.

Accordingly, the other engaging members engage with the clutch gear and thereby the rotary driving force of the pinion gear body and the first rotation body can be securely transmitted to the take-up drum through the plurality of engaging members. Further, it is possible to disperse the rotating torque of the pinion gear body and the first rotation body through the plurality of engaging members to transmit to the clutch gear. This contributes to obtaining a thin-walled flange portion, thereby reducing the weight of the take-up drum.

In the seatbelt retractor of the present invention, it is preferable that the second rotation body comprises a plurality of guiding portions which are brought into contact with respective front side surfaces of the plurality of engaging members in a rotating direction in response to relative rotation of the second rotation body with respect to the first rotation body and slidably move the plurality of engaging members while depressing radially outwardly.

In such a seatbelt retractor, in response to the relative rotation of the first rotation body with respect to the second rotation body, the respective guiding portions are brought into contact with the front side surfaces of the engaging members in a rotating direction and thereby depress the engaging members radially outwardly. As a result, the plurality of engaging members can engage with the clutch gear promptly and at a stable timing. This contributes to reducing delay or time variance until driving force is transmitted from the pinion gear body and the first rotation body to the take-up drum. Further, it is possible to carry out a retracting operation in case of vehicle collision promptly and at a stable timing.

In the seatbelt retractor of the present invention, it is preferable that the deformable portion comprises a through hole formed at a flat portion between the engaging pawl portion and the first end portion, and, in case only part of the plurality of engaging members engages with the clutch gear, or in case at least one of the plurality of engaging members has tooth contact with the clutch gear, a peripheral portion of the through hole of the part of the plurality of engaging members or the at least one of the plurality of engaging members is plastically deformed.

In such a seatbelt retractor, the engaging members are each provided with the through hole formed in the flat plate portion between the engaging pawl portion and the first end portion, whereby it is possible to engage the plurality of engaging members with the clutch gear securely in a simple structure. As a result, the rotary driving force of the pinion gear body and the first rotation body can be securely transferred to the take-up drum through the plurality of engaging members.

In the seatbelt retractor of the present invention, it is preferable that the deformable portion comprises a groove portion which has a predetermined depth and is formed in one of surfaces of the flat portion between the engaging pawl portion and the first end portion, and, in case only part of the plurality of engaging members engages with the clutch gear, or in case at least one of the plurality of engaging members has tooth contact with the clutch gear, a peripheral portion of the groove portion of the part of the plurality of engaging members or the at least one of the plurality of engaging members is plastically deformed.

In such a seatbelt retractor, the engaging members are each provided with the groove portion with a predetermined depth formed in one of the surfaces of the flat plate portion between the engaging pawl portion and the first end portion, whereby it is possible to engage the plurality of engaging members with the clutch gear securely in a simple structure. As a result, the rotary driving force of the pinion gear body and the first rotation body can be securely transferred to the take-up drum through the plurality of engaging members.

In the seatbelt retractor of the present invention, it is preferable that the deformable portion is formed so that thickness of the engaging pawl portion is thinner than thickness of the first end portion, and, in case only part of the plurality of engaging members engages with the clutch gear, or in case at least one of the plurality of engaging members has tooth contact with the clutch gear, the engaging pawl portion of the part of the plurality of engaging members or the at least one of the plurality of engaging members is plastically deformed.

In such a seatbelt retractor, the engaging pawl portion of each of the engaging members is formed so that width thereof is thinner than the thickness of the first end portion, whereby it is possible to engage the plurality of engaging members with the clutch gear securely in a simple structure. As a result, the rotary driving force of the pinion gear body and the first rotation body can be securely transferred to the take-up drum through the plurality of engaging members.

In the seatbelt retractor of the present invention, it is preferable that the deformable portion comprises a cut-out groove portion formed inwardly from at least one of side surfaces of the flat portion between the engaging pawl portion and the first end portion, and, in case only part of the plurality of engaging members engages with the clutch gear, or in case at least one of the plurality of engaging members has tooth contact with the clutch gear, a peripheral portion of the cut-out groove portion of the part of the plurality of engaging members or the at least one of the plurality of engaging members is plastically deformed.

In such a seatbelt retractor, the engaging members are each provided with the cut-out groove portion formed so as to extend inwardly from at least one of side surfaces of the flat plate portion between the engaging pawl portion and the first end portion, whereby it is possible to engage the plurality of engaging members with the clutch gear securely in a simple structure. As a result, the rotary driving force of the pinion gear body and the first rotation body can be securely transferred to the take-up drum through the plurality of engaging members.

BEST MODES FOR CARRYING OUT THE INVENTION

Hereinafter, one embodiment of the seatbelt retractor according to the present invention will be described in detail while referring to the accompanying drawings.

[Schematic Configuration]

First, a schematic configuration of a seatbelt retractor 1 according to the present embodiment will be described based on FIG. 1 and FIG. 2.

Figure 1:
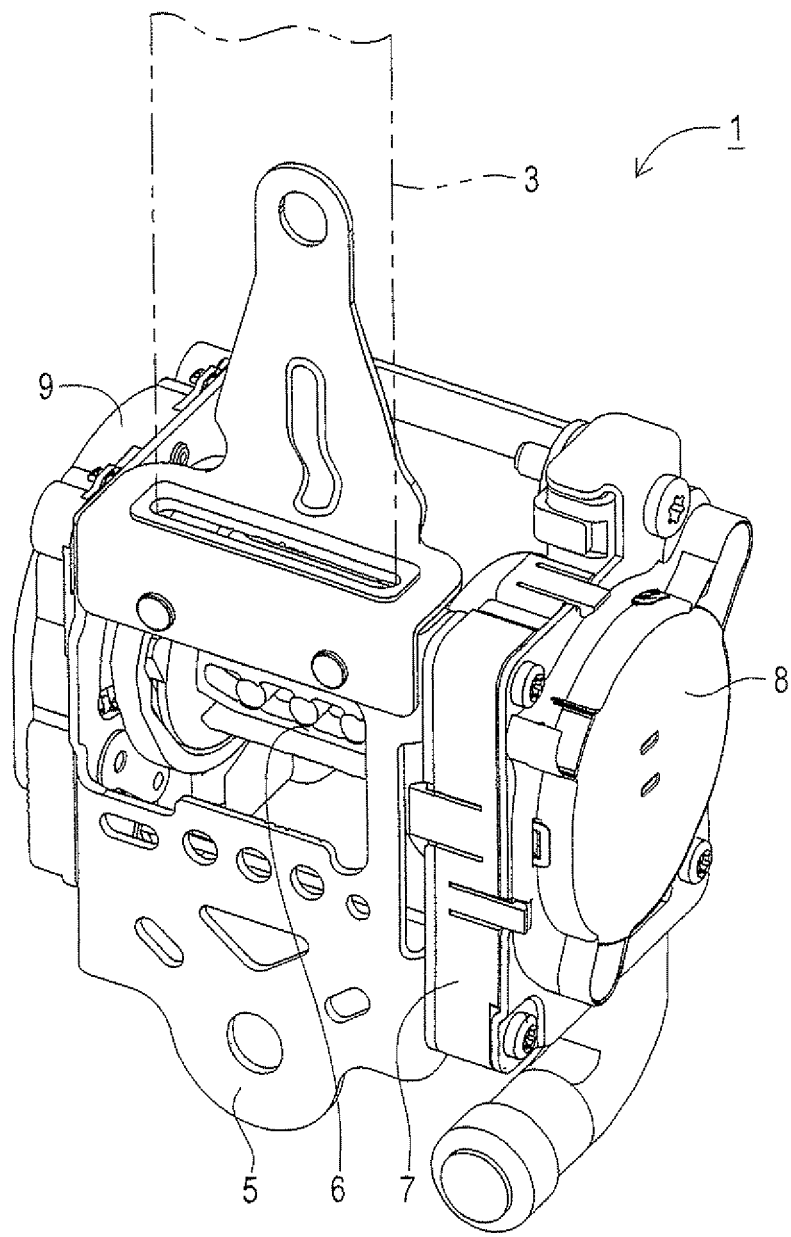
FIG. 1 is a perspective view showing an outer appearance of a seatbelt retractor according to a present embodiment.

FIG. 1 is a perspective view showing an outer appearance of a seatbelt retractor 1 according to the present embodiment. FIG. 2 is a perspective view showing the respective assemblies of the seatbelt retractor 1 in a disassembled state.

Figure 2:
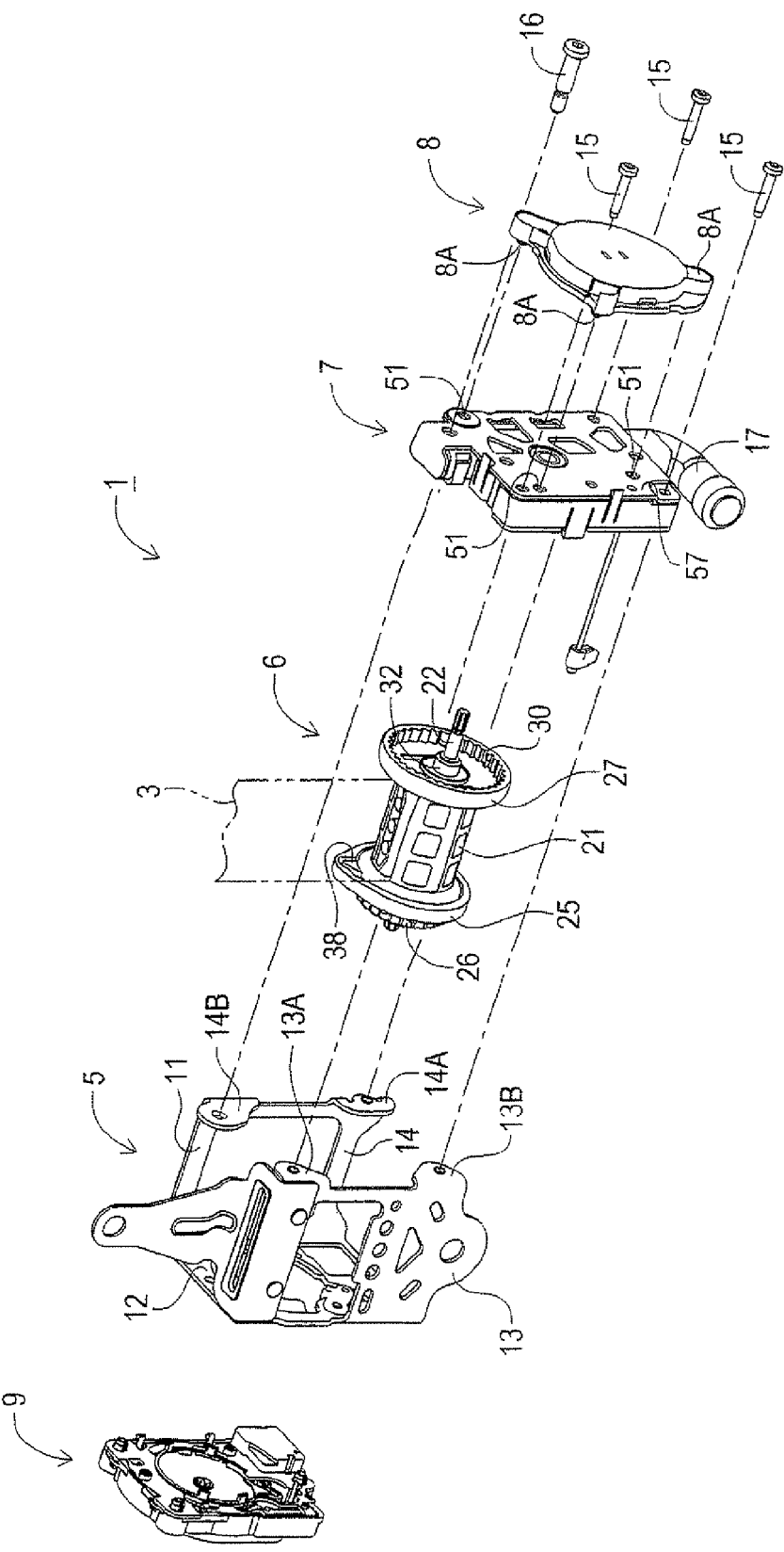
FIG. 2 is a perspective view showing respective assemblies of the seatbelt retractor in a disassembled state.

As shown in FIG. 1 and FIG. 2, the seatbelt retractor 1 is a device for retracting a vehicle webbing 3. The seatbelt retractor 1 is comprised of a housing unit 5, a take-up drum unit 6, a pretensioner unit 7, a take-up spring unit 8 and a locking unit 9.

The locking unit 9 is fixed to a side wall portion 12 of a housing 11 constituting the housing unit 5. The locking unit 9 carries out an actuating operation to stop pull out of the webbing 3 in response to a sudden pull out of the webbing 3 or sudden change in acceleration of a vehicle speed.

The pretensioner unit 7 having a pretensioner mechanism 17 (refer to FIG. 6) as will be described later is mounted to the housing unit 5. To be more specific, the housing unit 5 has a substantially U-shape in plain view and has a side plate portion 13 and a side plate portion 14 which constitute opposite sides thereof. From the top and lower edge portions of the side plate portions 13 and 14, screwed portions 13A, 13B and screwed portion 14A, 14B extend inwardly from each side plate portion 13 and 14 roughly at right angle and form a screw hole separately. The pretensioner unit 7 and the housing unit 5 are screwed with three screws 15 and a stopper screw 16 at the screwed portions 13A, 13B, 14A, and 14B. Thereby, the pretensioner unit 7 constitutes the other side wall portion opposite the side wall portion 12 of the housing 11.

Figure 5:
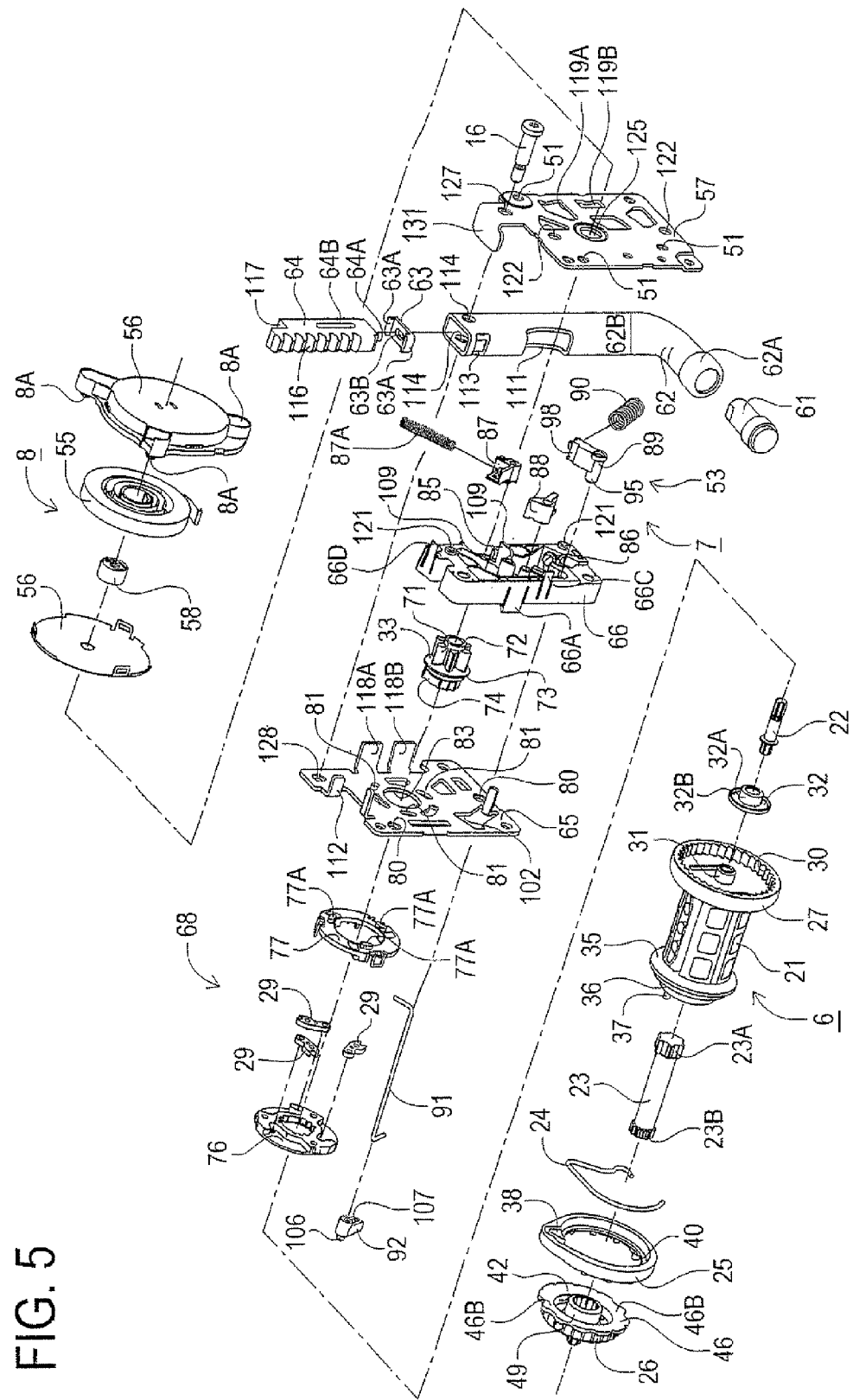
FIG. 5 is an exploded perspective view of the take-up drum unit, a pretensioner unit and a take-up spring unit.

A take-up spring unit 8 is fixed to an outer side of the pretensioner unit 7 by nylon latches 8A which are integrally formed with a spring case 56 (refer to FIG. 5).

A take-up drum unit 6 onto which the webbing 3 is wound is rotatably supported between the pretensioner unit 7 and the locking unit 9 fixed to the side wall portion 12 of the housing unit 5.

[Schematic Configuration of Take-Up Drum Unit]

Next, a schematic configuration of the take-up drum unit 6 will be described based on FIG. 2 through FIG. 5.

Figure 3:
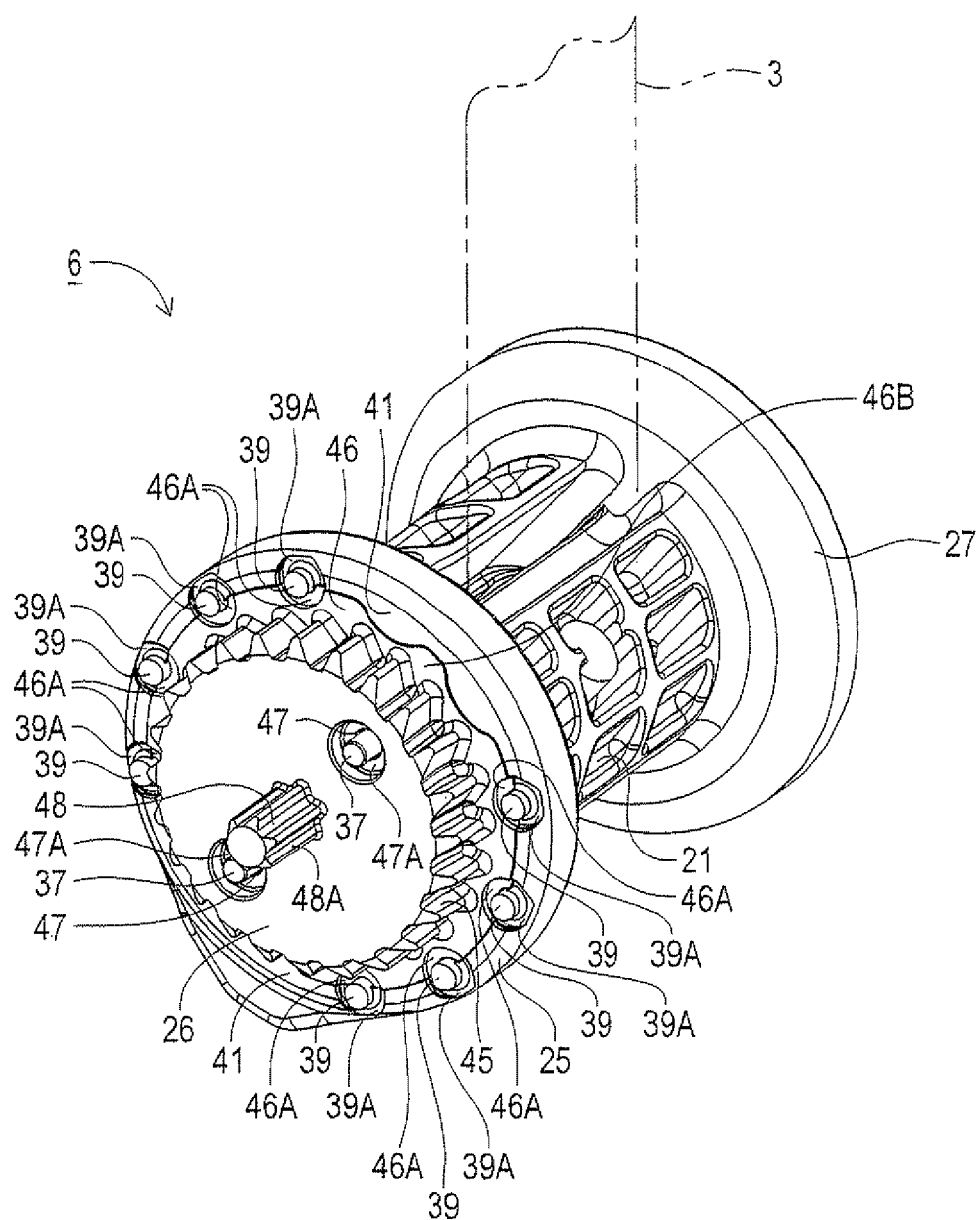
FIG. 3 is a perspective view of a take-up drum unit.
Figure 4:
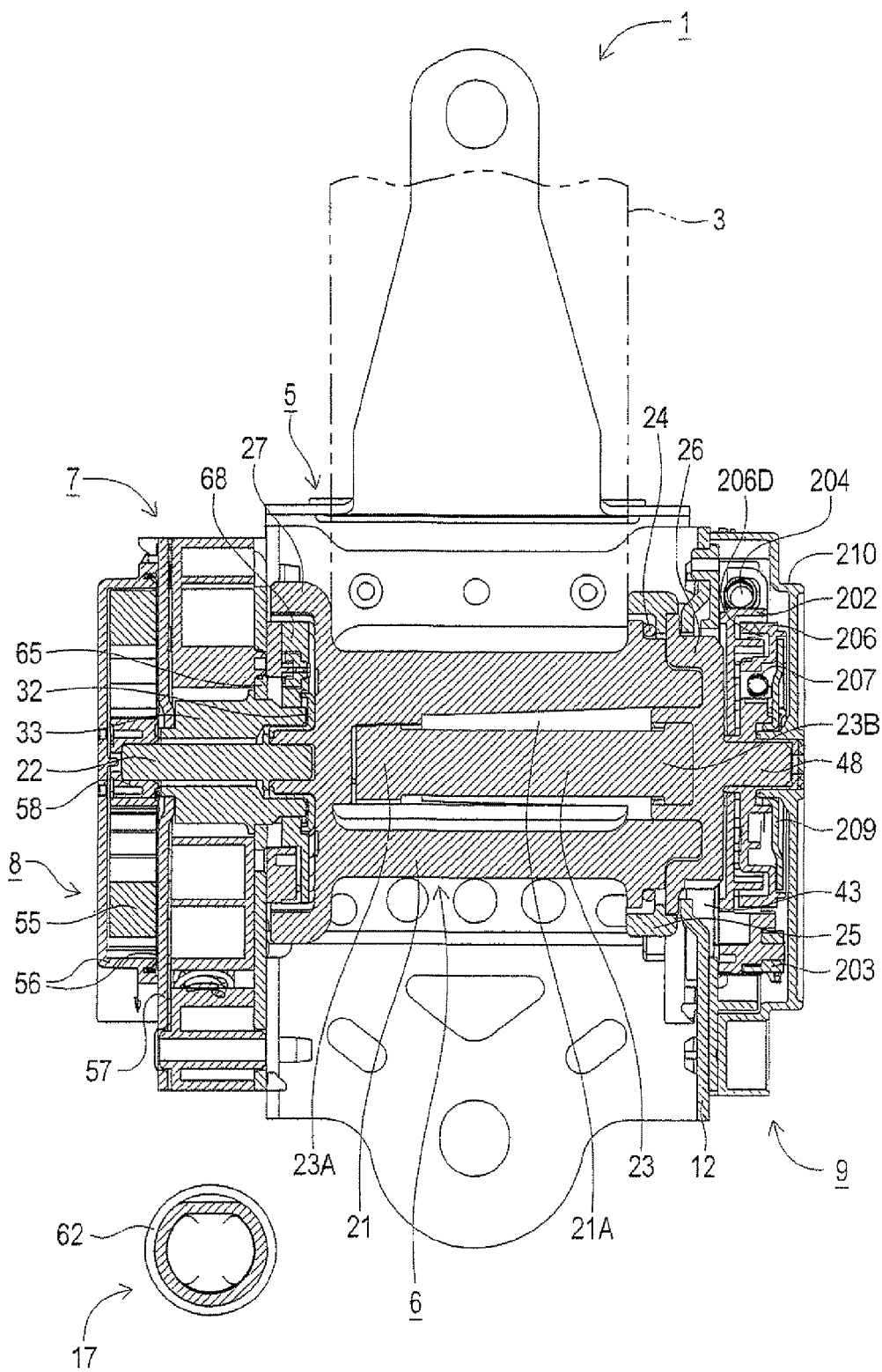
FIG. 4 is a cross-section view of the seatbelt retractor.

FIG. 3 is a perspective view of a take-up drum unit 6. FIG. 4 is a cross-section view of a seatbelt retractor 1. FIG. 5 is an exploded perspective view of the take-up drum unit 6, the pretensioner unit 7 and the take-up spring unit 8.

As shown in FIG. 2 through FIG. 5, the take-up drum unit 6 is comprised of a guiding drum 21, a drum shaft 22, a torsion bar 23, a wire 24, a wire plate 25, a ratchet gear 26 and a bearing 32.

The guiding drum 21 is made of an aluminum material or the like and is formed in a substantially cylindrical shape, with one end portion thereof facing to the pretensioner unit 7 being walled and closed. On an edge portion of a shaft central direction of the guiding drum 21 which is at the side of pretensioner unit 7, there is formed a flange portion 27 which extends radially and outwardly from an outer peripheral portion of the guiding drum 21, roughly at a right angle with its shaft central direction. A clutch gear 30 is formed in an inner peripheral face of this flange portion 27 so that the clutch gear 30 engages the respective clutch pawls 29 in case of vehicle collision as will be described later.

A cylindrical mounting boss 31 is erected at a central position in the end portion of the guiding drum 21 on the pretensioner unit 7 side. Also, a drum shaft 22 formed of a steel material or the like is mounted at the central position of this end portion by press fitting or the like. To the outer periphery of the mounting boss 31, there are fitted the bearing 32 which has a cylindrical portion 32A having substantially a cylindrical shape and being formed of a synthetic resin material such as polyacetal resin or the like, and a flanged end portion 32B which is connected at an outer periphery of a bottom end portion of the cylindrical portion 32A. The take-up drum unit 6 is rotatably supported by a shaft receiving portion 33A of a pinion gear body 33 (refer to FIG. 6 and FIG. 8) through this bearing 32. The pinion gear body 33 is formed of a steel material and the like and constitutes the pretensioner unit 7.

Inside the guiding drum 21, there is formed a shaft hole 21A which extends along a center axis thereof so as to become tapered as for the draft angle. Within the shaft hole 21A on the flange portion 27 side, there is formed a spline groove for fitting the torsion bar 23 which is made of a steel material or the like. The spline 23A side of the torsion bar 23 is inserted in the shaft hole 21A of the guiding drum 21 and is press-fitted to get in contact with the flange portion 27. As a result, the torsion bar 23 is press-fitted and fixed inside the guiding drum 21 so that relative rotation thereof with respect to the guiding drum 21 is disabled.

On the locking unit 9 side in an axial direction of the guiding drum 21, there is formed a flange portion 35 which extends slightly in a radial direction from an outer peripheral surface slightly inside an edge portion of the guiding drum 21. Also, from an outer side of the flange portion 35, there is fanned a cylindrical stepped portion 36 of which outer diameter of a portion at an outer side thereof becomes tapered in an axial direction. A pair of ejector pins 37 and 37 are erected at radially opposite positions in an outer end portion of the stepped portion 36.

On an outer side surface of the flange portion 35, there is formed a convex portion in a predetermined shape (not shown). A rod-shaped wire 24 made up of a metallic material such as a stainless steel material is mounted to an outer periphery of a bottom end portion of the stepped portion 36 so as to match the shape of this convex portion.

An outer peripheral portion of the flange portion 35 is covered by a wire plate 25 which has a substantially egg-like shape in a side plan view. The wire plate 25 is made of an aluminum material or the like and has a convex portion 38 formed at an outer peripheral portion of its inner surface facing to the guiding drum 21. The convex portion 38 is fitted with a wire 24 which protrudes outward from the flange portion 35.

At a central part of the wire plate 25, there is formed a through hole 40 into which the stepped portion 36 will be inserted. On an outer edge portion of the through hole 40 at an outer side in an axial direction thereof, there are provided a pair of engaging convex portions 41 which have two convex portions formed thereon which protrude in a circular shape radially inwardly from an internal peripheral so as to oppose each other in a radial direction. On an outer edge portion at an outer side in an axial direction which is interposed between the respective engaging convex portions 41 of the through hole 40, there are erected four pairs of rivet pins 39 so as to oppose each other in a radial direction. A concave portion 39A being recessed to a predetermined depth in a semi-circular arcuate shape is formed in a bottom end portion of each rivet pin 39.

A ratchet gear 26 has a cylindrical extending portion 42 having a disk-like shape and being made of a steel material or the like. The extending portion 42 extends from an outer peripheral portion in an axial direction up to a length substantially the same with the stepped portion 36. In an outer peripheral surface of this extending portion 42, there is formed a ratchet gear portion 45 which is engaged with the pawl 43 in case of vehicle collision or vehicle emergency as will be described later (refer to FIG. 9). At an edge portion of the extending portion 42 in an axial direction on the guiding drum 21 side, there is formed a baffle flange 46 which extends from an outer peripheral portion of the extending portion 42 in a radial direction. Further, a pair of engaging concave portions 46B are provided at an outer periphery of the baffle flange 46 (refer to FIG. 5) thereon so as to oppose each other in a radial direction. The engaging concave portions 46B each have two concave portions being recessed in a circular shape inwardly in a radial direction thereof. Concave portions 46A being recessed to a predetermined depth in a semi-circular arcuate shape are formed in an outer surface in the axial direction of the baffle flange 46, so as to oppose the respective rivet pins 39.

Through holes 47 are opened in the ratchet gear 26 at positions opposite the respective ejector pins 37 erected from the guiding drum 21 for inserting the respective ejector pins 37. Concave portions 47A being recessed to a predetermined depth are formed in the circumference of the through holes 47. A shaft portion 48 is erected at a center position outside of the ratchet gear 26. A spline 48A is formed at an outer peripheral surface of the shaft portion 48. The take-up drum unit 6 is thus rotatably supported by the locking unit 9 through this shaft portion 48.

A cylindrical mounting boss 49 is erected at a central part of an inner surface of the ratchet gear 26. Spline grooves are formed at an inner peripheral surface of the mounting boss 49 for fitting the spline 23B formed at the other end of the torsion bar 23. The spline 23B formed at the other end of the torsion bar is formed so as to have an outer diameter which is approximately the same as the outer diameter of the spline 23A formed at the one end of the torsion bar 23.

Accordingly, the respective engaging concave portions 46B of the baffle flange 46 in the ratchet gear 26 are fitted with the respective engaging convex portions 41 of the wire plate 25. Thereafter, the respective rivet pins 39 are riveted so as to expand at an inner side of the concave portions 39A at a base end thereof and the concave portions 46A of the baffle flange 46 formed at opposite positions. The wire 24 is mounted to an outer surface of the flange portion 35 in the guiding drum 21. Next, when the wire plate 25 and the ratchet gear 26 are applied to the outside of the flange portion 35, the spline 23B formed at the other end of the torsion bar 23 is fitted inside the mounting boss 49 while the respective ejector pins 37 of the guiding drum 21 are being inserted inside the respective through holes 47 of the ratchet gear 26. Thereafter, the respective ejector pins 37 are riveted so as to be expanded inside the concave portions 47A formed in a circumference of the through holes 47.

As a result, the ratchet gear 26 and the wire plate 25 are mounted so that relative rotation thereof is disabled. This ratchet gear 26 and the wire plate 25 are also mounted to the guiding drum 21 through the torsion bar 23 and the respective ejector pins 37 so relative rotation thereof with respect to the guiding drum 21 is disabled. The webbing 3 is wound around an outer peripheral surface between the flange portion 27 of the guiding drum 21 and the flange portion 35 and the wire plate 25.

[Schematic Configuration of Take-Up Spring Unit]

Next, a schematic configuration of the take-up spring unit 8 will be described based on FIG. 2, FIG. 4 and FIG. 5.

As shown in FIG. 2, FIG. 4 and FIG. 5, the take-up spring unit 8 has a take-up urging mechanism 55 including a spiral spring, a spring case 56 for accommodating this take-up urging mechanism 55 and a spring shaft 58. The take-up spring unit 8 is fixed in the respective through holes 51 in the cover plate 57 constituting the outer side of the pretensioner unit 7 formed of a steel material or the like through nylon latches 8A provided at three locations on the spring case 56. A tip end portion of the drum shaft 22 in the take-up drum unit 6 is coupled with the spiral spring through the spring shaft 58 inside the spring case 56. Thus, the take-up drum unit 6 is urged in a retracting direction of the webbing 3 at all times owing to the urging force of the spiral spring.

[Schematic Configuration of Pretensioner Unit]

Next, a schematic configuration of the pretensioner unit 7 will be described based on FIG. 2, and FIG. 4 through FIG. 8.

Figure 6:
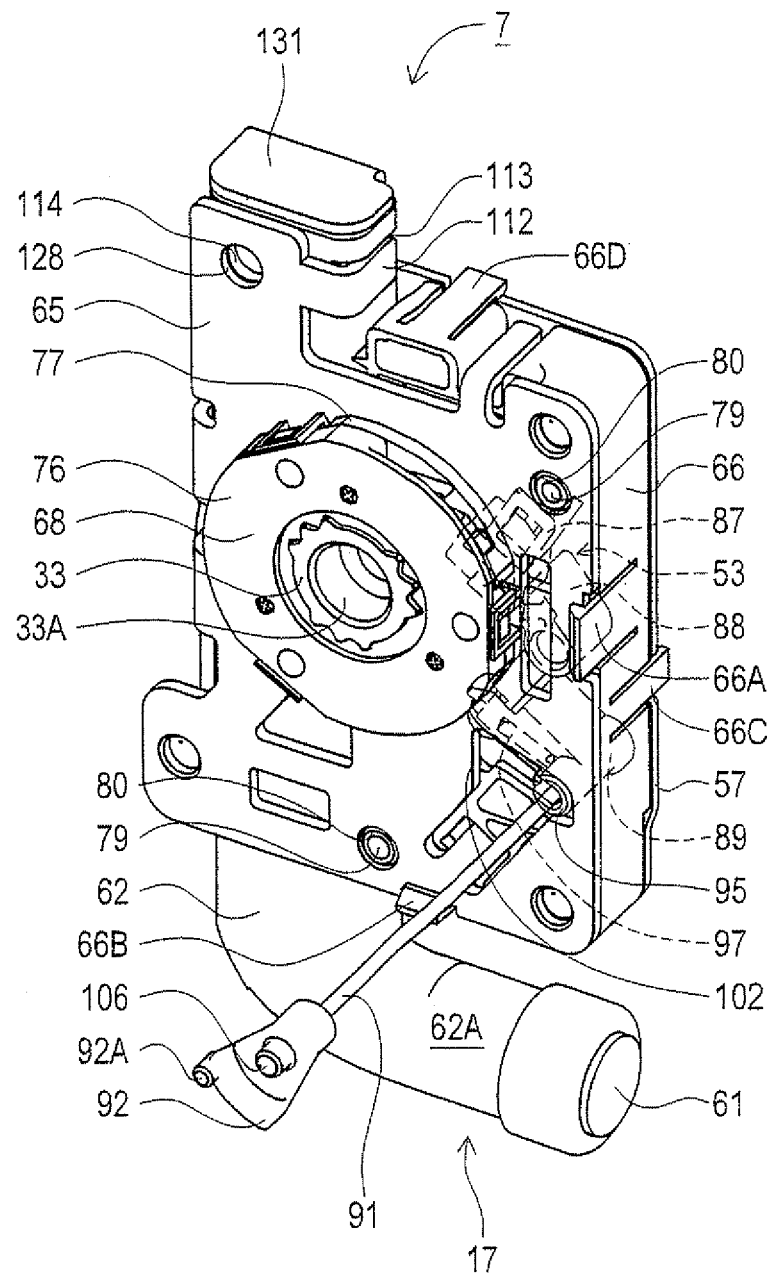
FIG. 6 is a perspective view of a pretensioner unit as seen from a housing unit mounting side thereof.
Figure 7:
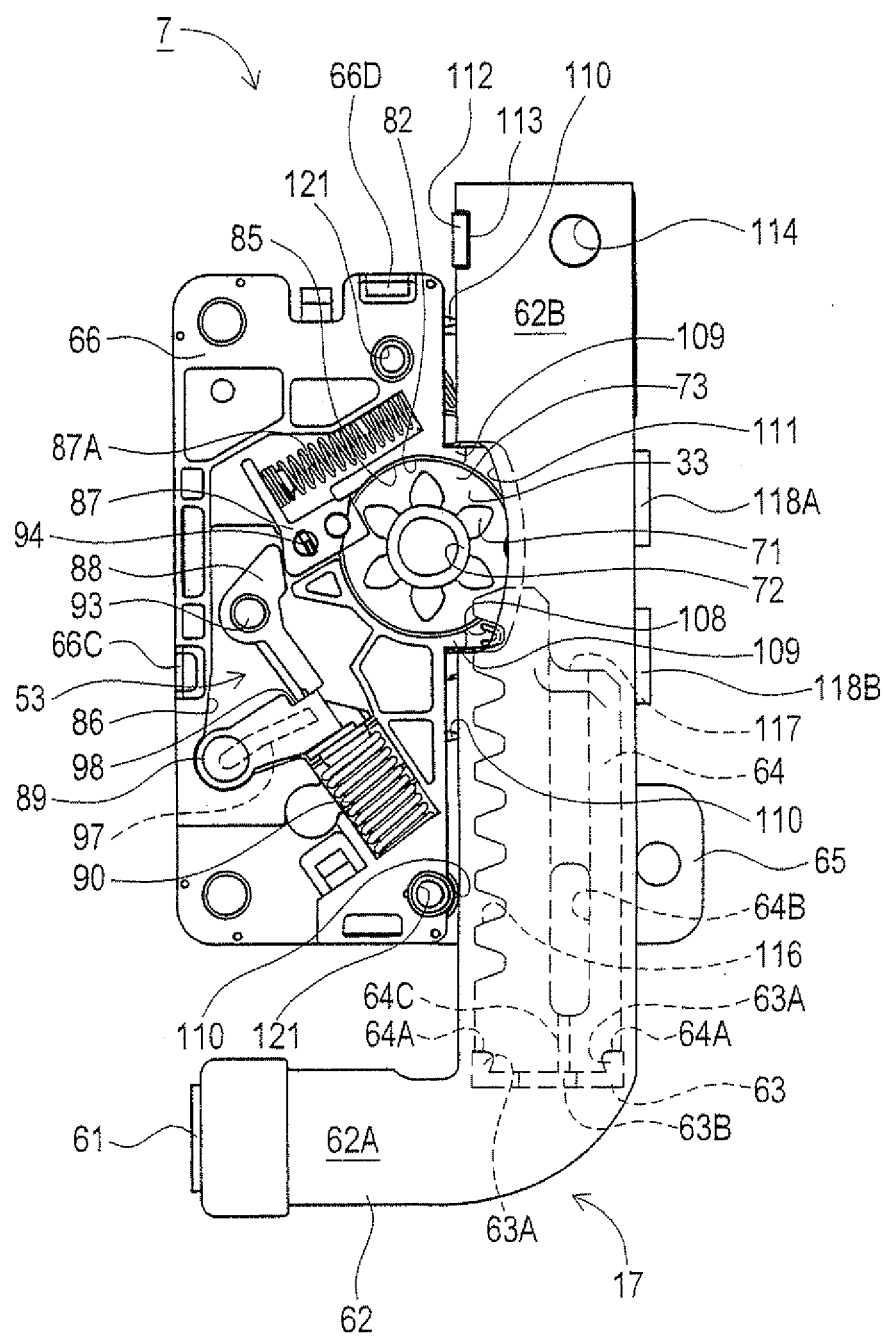
FIG. 7 is a side view showing the pretensioner unit.
Figure 8:
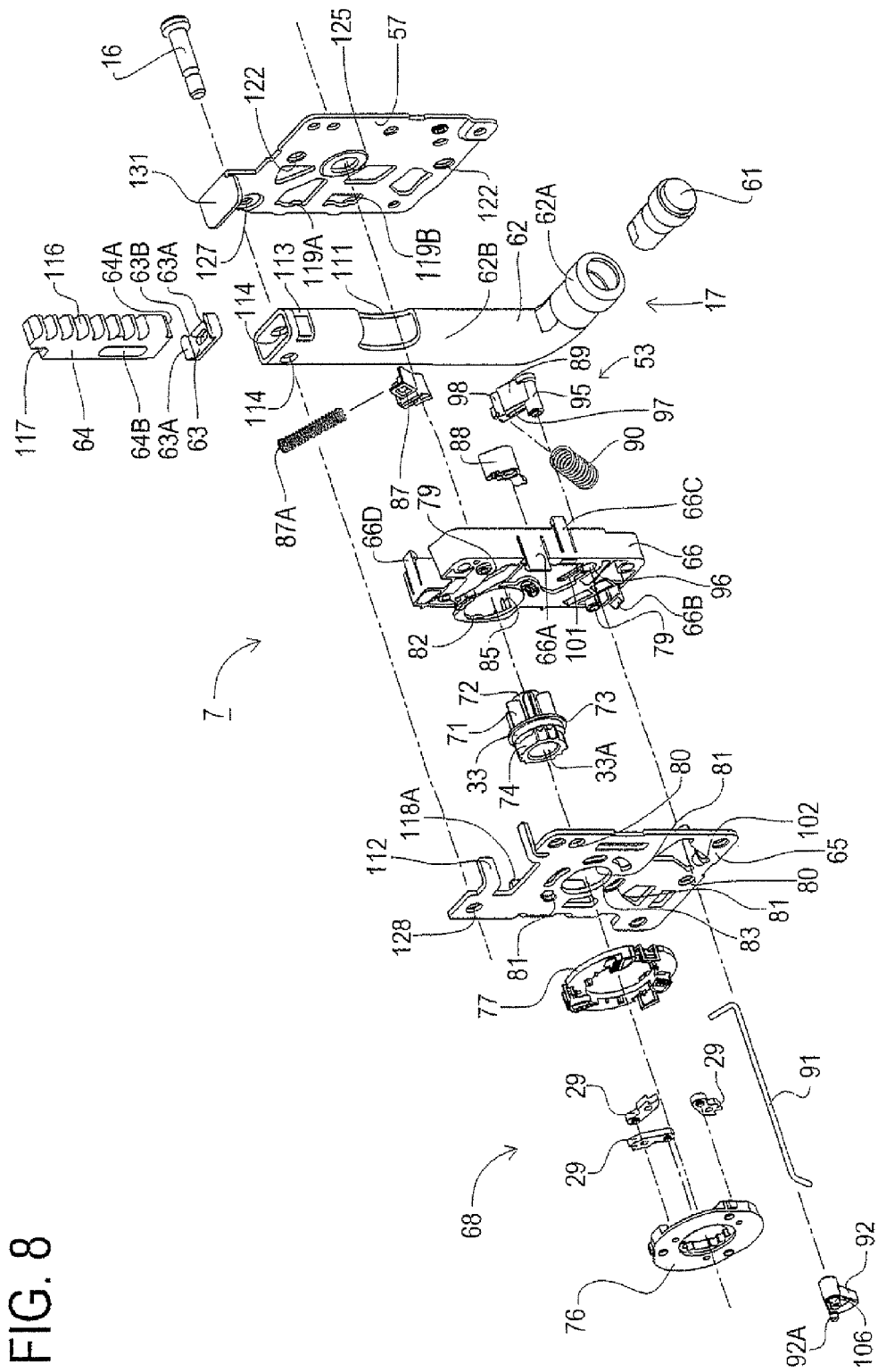
FIG. 8 is an exploded perspective view showing the pretensioner unit in FIG. 6 in a disassembled state.

FIG. 6 is a perspective view of the pretensioner unit 7 as seen from a housing unit 5 mounting side. FIG. 7 is a side view showing the pretensioner unit 7. FIG. 8 is an exploded perspective view showing the pretensioner unit 7 in FIG. 6 in a disassembled state.

As shown in FIG. 2, and FIG. 4 through FIG. 8, the pretensioner unit 7 is comprised of a pretensioner mechanism 17 and a forced locking mechanism 53 rotates a pawl 43 (refer to FIG. 9) which is rotatably supported at a side wall portion 12 of the housing unit 5.

[Pretensioner Mechanism]

As shown in FIG. 5 through FIG. 8, the pretensioner mechanism 17 activates a gas generating member 61 in case of vehicle collision. This causes the take-up drum unit 6 to rotate in the retracting direction of the webbing 3 through the flange portion 27 of the take-up drum unit 6, by using the pressure of this gas.

Here, the pretensioner mechanism 17 consists of a gas generating member 61; a pipe cylinder 62; a sealing plate 63 and a piston 64 which move inside the pipe cylinder 62 under the gas pressure from the gas generating member 61; a pinion gear body 33 which engages a rack formed in this piston 64 and rotates; a base plate 65 to which the pipe cylinder 62 is mounted; a base block body 66 of a substantially rectangular shape which is in contact with the base plate 65 and mounted on a side surface of the pipe cylinder 62 on the pinion gear body 33 side; and a clutch mechanism 68 provided on a back surface of the base plate 65.

The pinion gear body 33 is provided with a pinion gear portion 71 and has a substantially cylindrical shape on an outer peripheral portion thereof. The pinion gear body 33 is made of a steel material or the like and engages the rack formed in the piston 64. The pinion gear body 33 also has a cylinder-shaped support portion 72 formed so as to extend outwardly from an end portion thereof on the cover plate 57 side, in an axial direction of the pinion gear portion 71. The support portion 72 is formed to have substantially the same length as the thickness of the cover plate 57 with the root diameter of the pinion gear portion 71 as outer diameter.

A flange portion 73 extending in a radial direction is formed at an end portion of the pinion gear portion 71 on the base plate 65 side in the axial direction thereof. Further, on the pinion gear body 33, there is formed a boss portion 74 which has a shaft receiving portion 33A formed in a substantially cylindrical-shape in an outward direction from the flange portion 73. The shaft receiving portion 33A is adapted for inserting therein the drum shaft 22 of the take-up drum unit 6 and fitting thereon the bearing 32. Sets of three splines having the outer diameter of the bottom end portion of the boss portion 74 are formed on an outer peripheral surface of this boss portion 74 at an interval of roughly 120° central angle.

The clutch mechanism 68 has a substantially annular-shaped pawl base 76 made of a steel material or the like, three clutch pawls 29 made of a steel material or the like, and a substantially annular-shaped pawl guide 77 which is made of a synthetic resin such as polyacetal resin or the like, and the pawl guide 77 and the pawl base 76 hold the respective clutch pawls 29 therebetween as will be described later (refer to FIG. 17).

On an inner peripheral surface of the pawl base 76 there are formed sets of three spline grooves at an interval of roughly 120° central angle. The spline grooves are press-fitted with the splines formed on the boss portion 74 of the pinion gear body 33. The pawl guide 77 is formed so that an inner peripheral diameter thereof is bigger than the spline grooves in the pawl base 76. Positioning projections 77A are provided at equal angles at three locations on concentrically the outer side face of the pawl guide 77 faced to the base plate 65.

Figure 14:
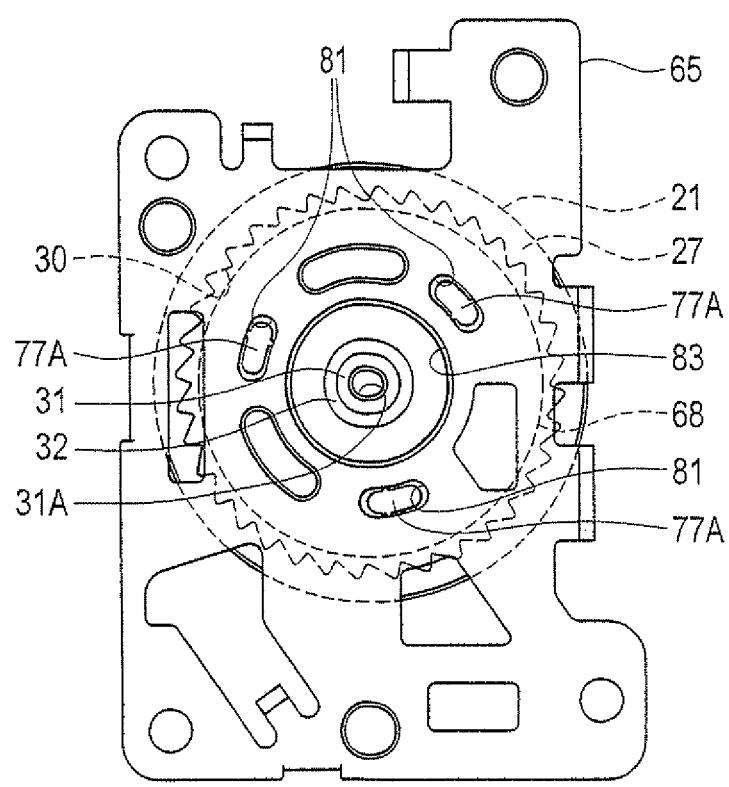
FIG. 14 is a plain view for describing a relationship between a guiding drum, a clutch mechanism and a base plate.

The positioning projections 77A provided on the outer side face of the pawl guide 77 in the clutch mechanism 68 are engaged with the positioning holes 81 formed in the base plate 65, to set the clutch mechanism 68 to an outer surface of the base plate 65 (refer to FIG. 14). Next, as shown in FIG. 8, the boss portion 74 of the pinion gear body 33 is inserted into the through hole 83 formed at substantially a central part of the base plate 65. Thereafter, the respective splines formed on the boss portion 74 are press-fitted and fixed in the respective spline grooves of the pawl base 76 constituting the clutch mechanism 68. As a result, the clutch mechanism 68 and the pinion gear body 33 are set and fixed to the base plate 65 and the pinion gear portion 71 of the pinion gear body 33 is positioned, at all times, in the position shown in FIG. 7.

The base block body 66 is made of a synthetic resin such as polyacetal resin or the like. The flange portion 73 of the pinion gear body 33 is inserted inside the through hole 82 formed on the bottom surface portion of the gear housing portion 85. This gear housing portion 85 is formed so as to be recessed in a substantially semicircle shape in plain view in an inward direction from a side edge portion inside the base block body 66 and also, is formed with a bottom surface thereof protruding outward. Positioning bosses 79 protruding at a side portion of the base block body 66 on the base plate 65 side are inserted into the positioning holes 80 formed in the base plate 65. The base block body 66 is thus set to a surface of the base plate 65.

An elastic engagement piece 66A is formed so as to extend from an outer side surface of the base block body 66 to the base plate 65 side and enables elastic deformation thereof in an outward direction. An elastic engagement piece 66B is formed so as to extend from a lower-side side surface of the base block body 66 to the base plate 65 side and enables elastic deformation thereof in an outward direction. The elastic engaging pieces 66A and 66B latch with the respective side end portions of the base plate 65. As a result, the base block body 66 is set to the base plate 65.

The through hole 83 formed at a substantially central portion of the base plate 65 has an internal diameter which can support an outer diameter of the bottom end portion of the boss portion 74 in the pinion gear body 33. The through hole 83 is also formed so as to rotatably support the pinion gear body 33 with one end portion thereof. The gear housing portion 85 is formed so that a height thereof is substantially the same as the sum of heights of the pinion gear portion 71 and the flange portion 73 in the pinion gear body 33.

[Forced Locking Mechanism]

Here, the forced locking mechanism 53 set inside the base block body 66 will be described based on FIG. 5 through FIG. 8.

As shown in FIG. 7, a concave portion 86 for setting the forced locking mechanism 53 is formed in the base block body 66. In the base block body 66, there are provided a push block 87, a rotating lever 88, a block urging spring 87A, a gear-side arm 89 and an urging spring 90, which constitute the forced locking mechanism 53. The block urging spring 87A urges the push block 87 in the direction of the rotating lever 88. The urging spring 90 urges the gear-side arm 89 in the direction of the rotating lever 88. As shown in FIG. 6, to the gear-side arm 89, there are connected a coupling shaft 91 and a mechanical arm 92 which constitutes the forced locking mechanism 53 from outside the base plate 65.

The rotating lever 88 is made up of a synthetic resin such as polyacetal or an aluminum material or the like and is formed in a substantially L-shape, having through holes formed in a bending portion thereof. As shown in FIG. 7, the rotating lever 88 is rotatably supported by a boss 93 which is erected on the bottom surface of the concave portion 86 provided in the base block body 66, so that one end portion of the rotating lever 88 faces the pinion gear portion 71 of the pinion gear body 33.

The push block 87 is made up of a synthetic resin such as a polyacetal resin or the like. As shown in FIG. 7, the push block 87 is positioned so that one end thereof is in the vicinity of the teeth of the pinion gear portion 71 in the pinion gear body 33 and the other end thereof is in the vicinity of the rotating lever 88, by the positioning projections 94 erected in a bottom surface of the concave portion 86. The push block 87 is urged towards the rotating lever 88 by the block urging spring 87A so as to prevent looseness and making noise.

Accordingly, when the pinion gear body 33 is rotated as will be described later, the rotating lever 88 can be rotated in an outward direction (counter-clockwise direction in FIG. 7) by the push block 87 which is pushed against the teeth of the pinion gear portion 71 (refer to FIG. 11). The push block 87 is thus prevented from returning to the pinion gear body 33 side by the block urging spring 87A.

The gear-side arm 89 is made up of a synthetic resin such as polyacetal or the like or an aluminum material or the like and is formed in a substantially flat plate-shape. A boss 95 to be inserted in the through hole 96 formed in a bottom surface of the concave portion 86 in the base block body 66 is erected at one end portion of the gear-side arm 89 which is opposite to the other portion contacting with the rotating lever 88 at the side surface of the base block body 66. In a side surface onto which the boss 95 of the gear-side aim 89 is erected, there is formed a groove portion 97 which has a predetermined depth and allows for insertion of a bent portion formed at one end of the coupling shaft 91.

As shown in FIG. 6 and FIG. 8, the gear-side arm 89 has a stepped portion 98 formed at a tip end top surface of the rotating lever 88 so as to get in contact with the other end of the rotating lever 88. The boss 95 of the gear-side arm 89 is inserted in the through hole 96 which is formed at a bottom surface of the concave portion 86, and the gear-side arm 89 is rotatably supported toward the rotating lever 88 side. Further, the other tip end lower side of the gear-side arm 89 opposite to the stepped portion 98 is urged by the urging spring 90, and the gear-side arm 89 is urged towards the rotating lever 88 side (upward in FIG. 7). As a result, the stepped portion 98 will come in contact with the other end portion of the rotating lever 88.

Accordingly, if the rotating lever 88 is rotated in a counter-clockwise direction in FIG. 7, the other end portion of the rotating lever 88 moves away from the tip end portion of the gear-side arm 89 so that the gear-side arm 89 can rotate in an outward direction (counter-clockwise direction in FIG. 7) by the urging force of the urging spring 90.

The coupling shaft 91 is formed of a wire rod made up of a steel material or the like and is bent in a substantially right angle so that the ends thereof face each other with approximately 90-degree of tilt. The straight portion of this coupling shaft 91 is slightly longer than the width of the respective side plate portions 13 and 14 (refer to FIG. 9) of the housing unit 5.

As shown in FIG. 8, a groove 101 with the bent portion at one end of the coupling shaft 91 inserted therein extends from the through hole 96 formed in the bottom surface of the concave portion 86 of the base block body 66. A through hole 102 having a bent portion at one end of the coupling shaft 91 inserted therein is formed at a portion facing the gear-side arm 89 of the base plate 65.

Accordingly, the bent portion at one end of the coupling shaft 91 is guided through the through hole 102 of the base plate 65, the through hole 96 and the groove 101 of the base block body 66 to be fitted inside the groove portion 97 of the gear-side arm 89 installed inside the concave portion 86 of the base block body 66.

The mechanical arm 92 is made of a synthetic resin such as a polyacetal resin and the like or an aluminum material or the like and has a flat-plated and substantially fan-like shape, width of the fan-like shape being narrow. On its outer surface of the narrower one of the end portions, there is erected a boss 106 which can be rotatably fitted in the through hole 105 (refer to FIG. 10) formed in the side wall portion 12 (refer to FIG. 9) of the housing unit 5. Also, a boss 92A to be fitted inside a notch portion 138 is erected on an outer surface at an outer peripheral edge portion of the mechanical arm 92 on the side wall portion 12 side. A groove portion 107 of a predetermined depth is formed along a center line in an inner surface of the mechanical arm 92.

Accordingly, as shown in FIG. 6, the bent portion at the other end of the coupling shaft 91 is fitted inside the groove portion 107 of the mechanical arm 92. The mechanical arm 92 is mounted to the other end side of the coupling shaft 91 so that the shaft center of the boss 106 erected in the outer side surface of an edge portion at the rotational axis of the mechanical arm 92 and the shaft center of the coupling shaft 91 become substantially straight.

If the pretensioner unit 7 is mounted to the housing unit 5 as will be described later, the boss 106 of the mechanical arm 92 is rotatably fitted inside the through hole 105 formed in the side wall portion 12 (refer to FIG. 10). The boss 92A of the mechanical arm 92 is inserted in the notch portion 138 formed in the side wall portion 12, so as to be rotatably mounted inside the side wall portion 12.

[Pretensioner Mechanism]

Next, the configuration and mounting of the pipe cylinder 62 constituting the pretensioner mechanism 17 will be described based on FIG. 5 through FIG. 8.

As shown in FIG. 5 through FIG. 8, the pipe cylinder 62 is formed of a steel pipe material or the like in a substantially L shape. The pipe cylinder 62 has a housing portion 62A having a substantially cylindrical shape formed at one end thereof (lower-side bent portion in FIG. 7). The pipe cylinder 62 is configured to house the gas generating member 61. This gas generating member 61 includes explosive powder which is ignited in response to an ignition signal transmitted from a control portion not shown, generating gas as a result of gas generating agent combustion.

At the other end of the pipe cylinder 62 (top-side bent portion in FIG. 7), there are formed a piston housing portion 62B having a substantially rectangular shape in cross section and a notch portion 111 at a portion thereof facing the pinion gear body 33. When the pipe cylinder 62 is installed on the base plate 65, the pinion gear portion 71 of the pinion gear body 33 is fitted inside this notch portion 111. At a top end portion of the piston housing portion 62B, there is formed a notch portion 113 which is engaged with an arm portion 112 bent at a substantially right angle from the base plate 65 at the side surface portion of the base block body 66 and functions as a slip-off prevention means of the pipe cylinder 62 in a vertical direction. A pair of through holes 114 which are relatively opposite each other and allow insertion of a stopper screw 16 are formed at opposite side surface portions of the pipe cylinder 62 and sideways from the notch portion 113. This stopper screw 16 is used for mounting the pretensioner unit 7 to the housing unit 5 and functions as a bounce-out prevention means of the piston 64.

As seen in FIG. 7 and FIG. 8, the sealing plate 63 is made of a rubber material or the like and formed as a substantially rectangular-shaped plate so as to allow insertion thereof from a top end portion of the piston housing portion 62B. The sealing plate 63 has a pair of projecting portions 63A which extend upwards at opposite edge portions in a longitudinal direction thereof and protrude inwardly over the full width of their respective top end portions. A gas releasing hole 63B is formed at a central part in the sealing plate 63.

The piston 64 is made of a steel material or the like and has an overall lengthy shape, with a substantially rectangular shape in cross section, allowing for insertion thereof from the top end portion of the piston housing portion 62B. At a lower end portion of the piston 63, there are formed engagement grooves 64A wherein respective projecting portions 63A of the sealing plated 63 are fitted from sideways. On the lower end surface of the piston 64, there is formed a thin communicating hole 64C which extends from the lower end surface of the piston 64 to a through hole 64B formed in a side surface portion of the piston 64.

After the respective projecting portions 63A of the sealing plate 63 are slid from sideways into to engagement grooves 64A of the piston 64 for fitting therein, the sealing plate 63 is installed inside and is press-fitted to the back side thereof in a depth direction from the top end of the piston housing portion 62B. The gas releasing hole 63B formed in the sealing plate 63 communicates with the through hole 64B through the communicating hole 64C of the piston 64.

Thus, in this state, the sealing plate 63 is depressed by the pressure of the gas generated in the gas generating member 61 and the piston 64 is caused to move to the top end opening portion (top end portion in FIG. 7) of the piston housing portion 62B. Thereafter, in case the webbing 3 is pulled out again after the activation of the pretensioner, the piston 64 drops downward due to the reverse rotation of the pinion gear body 33. The gas inside the pipe cylinder 62 is thus released through the gas releasing hole 63B of the sealing plate 63, the communicating hole 64C and the through hole 64B of the piston 64 and the piston 64 is caused to drop smoothly.

On the side surface of the pinion gear body 33 side of the piston 64, there is formed a rack 116 which engages the pinion gear portion 71 of the pinion gear body 33. At a back surface of a tip end portion of the rack 116 (top end portion in FIG. 7), there is formed a stepped portion 117 which can come in contact with the stopper screw 16. As shown in FIG. 7, in a normal state until the gas generating member 61 is activated, the piston 64 is positioned at the bottom of the piston housing portion 62B and the tip end of the rack 116 becomes disengaged from the pinion gear portion 71.

As shown in FIG. 7, the pipe cylinder 62 is installed on the base plate 65 in such a manner that the respective projecting portions 109 projecting outwardly from opposite edge portions of the gear housing portion 85 in the base block body 66 are being fitted inside the notch portion 111 of the thus configured piston housing portion 62B and the arm portion 112 of the base plate 65 is fitted inside the notch portion 113 formed in the top end portion of the piston housing portion 62B. A rack locking pin 108 having a substantially U-shape in cross section is erected in the base block body 66. The rack locking pin 108 is inserted in the gear groove at the top end of the rack 116 so as to restrain vertical movement of the piston 64. The tip end portion of the piston 64 is positioned in the vicinity of the pinion gear portion 71 of the pinion gear body 33, whereby the piston 64 is disengaged.

Thus, the opposite surfaces of the piston housing portion 62B in the pipe cylinder 62 are supported by ribs 110 and backrest portions 118A and 118B. The ribs 110 have a substantially triangular shape in cross section and are erected in a side surface of the base block body 66. The backrest portions 118A and 118B extend at a substantially right angle from portions on the side edge portions of the base plate 65 facing the pinion gear body 33. These backrest portions 118A and 118B extend slightly higher than the piston housing portion 62B and are formed so as to allow insertion thereof in the respective through holes 119A and 119B formed at side end portions of the cover plate 57 facing the backrest portions 118A and 118B.

The side edge portions of the through holes 119A and 119B facing the outside surfaces of the backrest portions 118A and 118B are recessed inwardly (leftward in FIG. 8) by a predetermined depth (for instance, approximately 1 mm deep). Thus, when the backrest portions 118A and 118B are inserted in the respective through holes 119A and 119B, the inner surface of the through holes 119A and 119B will reliably come in contact with the outside surface of the backrest portions 118A and 118B.

With the base block body 66, the forced locking mechanism 53 and the pipe cylinder 62 etc., being installed on the base plate 65, the positioning bosses 121 of this base block body 66 projecting in a side surface portion of the cover plate 57 are engaged with the respective positioning holes 122 of the cover plate 57. As a result, the cover plate 57 is installed on the top side of the base block body 66, the forced locking mechanism 53 and the pipe cylinder 62 etc. Simultaneously, a cylindrical support portion 72 of the pinion gear body 33 is fitted in a support hole 125 formed at a substantially center part in the cover plate 57.

The backrest portions 118A and 118B which extend substantially at a right angle from the side edge portions of the base plate 65 are inserted in the respective through holes 119A and 119B formed at side edge portions of the cover plate 57 facing the backrest portions 118A and 118B. Elastic engagement piece 66C and elastic engagement piece 66D are latched in the respective side end portions of the cover plate 57. The elastic engagement piece 66C extends from an outer side surface of the base block body 66 to the cover plate 57 side and is formed so as to be elastically deformable outwardly. The elastic engagement piece 66D extends from the top side surface of the base block body 66 to the cover plate 57 side and is formed so as to be elastically deformable outwardly.

Thus, the cover plate 57 is set and fixed to the base block body 66 and the pipe cylinder 62 is mounted between the cover plate 57 and the base plate 65. The support portion 72 formed at the end portion of the pinion gear body 33 is rotatably supported by the support hole 125 in the cover plate 57. Accordingly, as shown in FIG. 4, the support portion 72 and the bottom end portion of the boss portion 74 formed at opposite ends portions of the pinion gear body 33 are rotatably supported by the through hole 83 formed in the base plate 65 and the support hole 125 formed in the cover plate 57.

The through holes 114 of the pipe cylinder 62, the through hole 127 formed in the cover plate 57 at a position facing the through holes 114, and the screw hole 141B formed at a position facing the through holes 114 of the base plate 65 (refer to FIG. 9) are arranged coaxially. The stopper screw 16 formed of a steel material or the like can be inserted and threaded from the cover plate 57 side towards the base plate 65 side.

Accordingly, the pipe cylinder 62 is held between the cover plate 57 and the base plate 65 and also opposite side surfaces thereof are held by the base block body 66 and the backrest portions 118A and 118B. The top end opening of the piston housing portion 62B in the pipe cylinder 62 is covered by a cover portion 131 which extends from the top end portion of the cover plate 57 at a substantially right angle therewith. The sealing plate 63 is depressed under the pressure of the gas generated by the gas generating member 61 and the piston 64 is caused to move toward the top end opening portion (top end in FIG. 7) of the piston housing portion 62B. In this case, the stepped portion 117 of the piston 64 comes in contact with the stopper screw 16 inserted in the through holes 114 so as to stop thereat.

[Schematic Configuration of Housing Unit]

A schematic configuration of the housing unit 5 will next be described based on FIG. 9 and FIG. 10.

Figure 9:
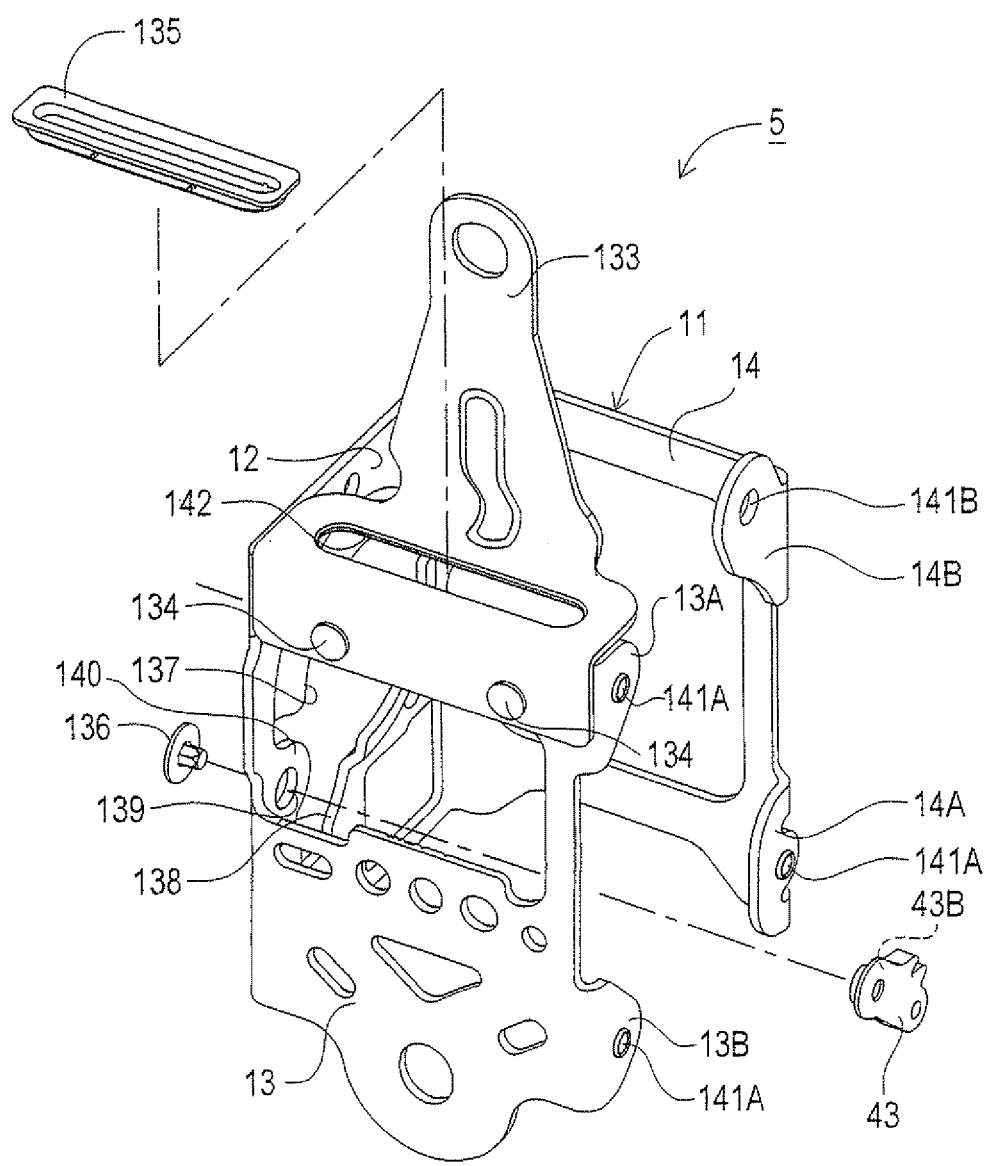
FIG. 9 is an exploded perspective view of a housing unit.

FIG. 9 is an exploded perspective view of the housing unit 5. FIG. 10 is a side view showing the seatbelt retractor 1 with the locking unit 9 removed therefrom.

Figure 10:
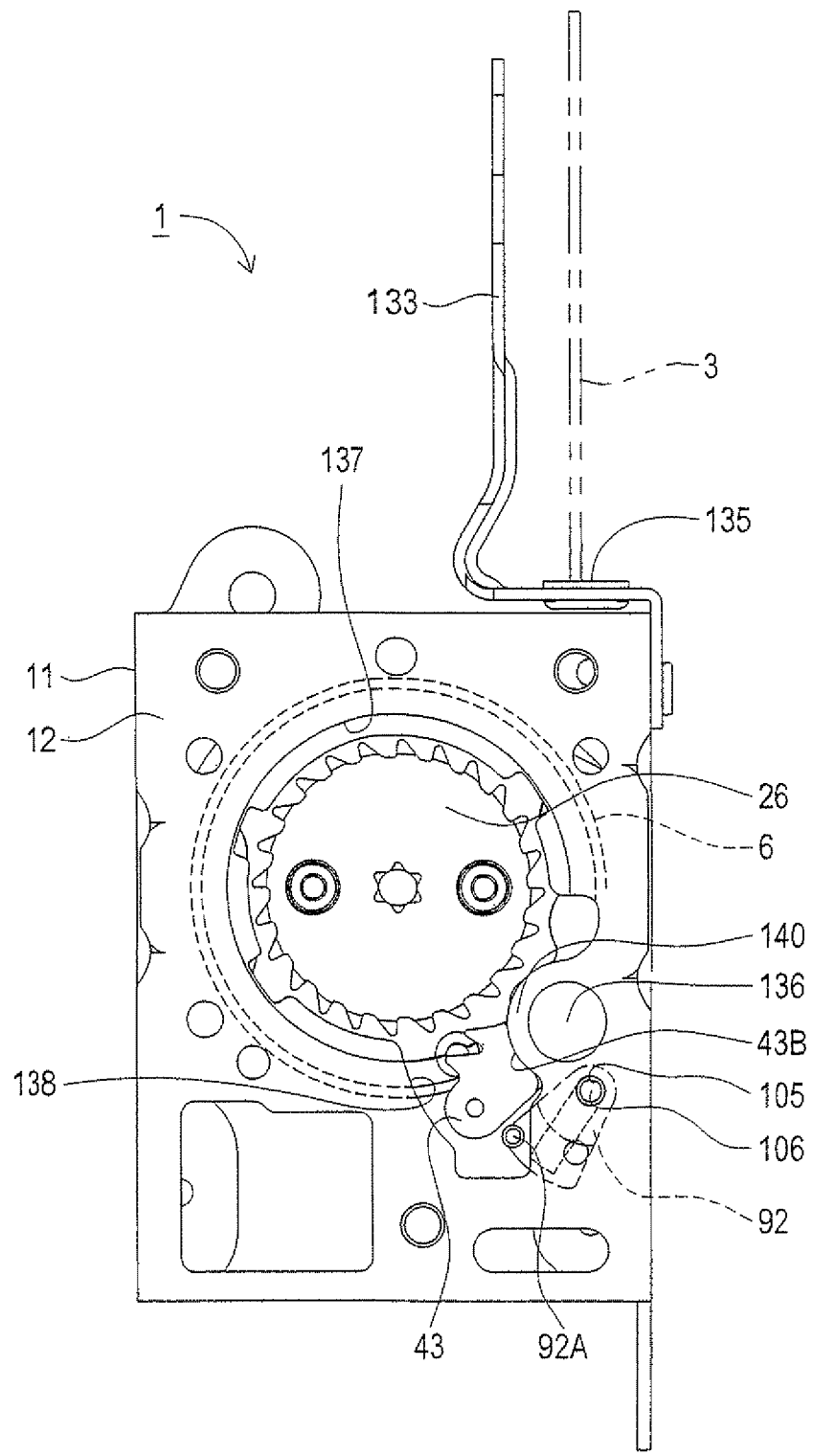
FIG. 10 is a side view showing the seatbelt retractor with the locking unit removed therefrom.

As shown in FIG. 9 and FIG. 10, the housing unit 5 is made of a housing 11, a bracket 133, a protector 135, a pawl 43 and a pawl rivet 136.

The housing 11 is made of a steel material or the like and is formed to have a substantially U-shape in plain view. In a back-side side wall portion 12 of the housing 11, there is formed a through hole 137 allowing for insertion of a tip end portion of the ratchet gear 26 in the take-up drum unit 6. A notch portion 138 is formed at an oblique lower side of the through hole 137 at a portion facing the pawl 43 so that the pawl 43 rotates smoothly. A through hole 139 is formed at the side of the notch portion 138 for mounting the pawl 43 in a rotatable fashion.

A semicircle-shaped guiding portion 140 is formed concentrically with the through hole 139 at a portion of the notch portion 138 which comes in contact with the pawl 43. The portion of the pawl 43 which comes in contact with and moves along the guiding portion 140 is formed to have approximately the same height as the thickness of the side wall portion 12. This portion has a stepped portion 43B which is recessed in a circular shape at a radius curvature which is the same as the side edge of the guiding portion 140 and is slightly higher than the thickness of the side wall portion 12.

Side plate portions 13 and 14 which are relatively opposite to each other extend from opposite edge portions of the side wall portion 12. Opening portions are respectively formed at a center part in the side plate portions 13 and 14 so as to reduce weight and improve efficiency of the webbing mounting operation. Screwed portions 13A, 13B, 14A and 14B are formed at the top and lower edge portions of the side plate portions 13 and 14, respectively. These screwed portions extend inwardly by a predetermined depth, substantially at a right angle with the respective plates. Screw holes 141A wherein the respective screws 15 are screwed are formed in the respective screwed portions 13A, 13B and 14A by extruding. Screwed portion 141B wherein a stopper screw 16 is screwed is formed in the screwed portion 14B by extruding.

A bracket 133 mounted to the top edge portion of the side plate portion 13 by the respective rivets 134 is made of a steel material or the like. A horizontally long through hole 142 is formed at a portion extending from the top edge portion of the side plate portion 13 in an inward direction at a substantially right angle therewith, for pulling out the webbing 3 therefrom. A horizontally long frame-like protector 135 made of a synthetic resin such as nylon or the like is fitted inside the through hole 142.

The stepped portion 43B of the pawl 43 made up of a steel material or the like is brought in contact with the guiding portion 140 and is rotatably fixed by the rivet 136 which is inserted in a rotatable fashion from the outside of the side wall portion 12 into the through hole 139. The side surface of the pawl 43 and the side surface of the ratchet gear 26 are positioned so as to be substantially coplanar with the outside surface of the side wall portion 12.

As shown in FIG. 10, in case the pretensioner unit 7 is mounted to the housing unit 5 through the screws 15 and the stopper screws 16, the boss 106 of the mechanical arm 92 which is mounted to the bent portion formed at the other end of the coupling shaft 91 is fitted in a rotatable fashion in the through hole 105 formed in the side wall portion 12. The boss 106 is thus positioned in the vicinity of the lower side surface of the pawl 43 as positioned inside the notch portion 138. The boss 92A erected in the outer side surface of the mechanical arm 92 is inserted in the notch portion 138. The pawl 43 will be in the vicinity of the mechanical arm 92 without being engaged with the ratchet gear 26 in normal operation.

[Description of Operation of Forced Locking Mechanism and Pawl]

Next, the operation of the forced locking mechanism 53 and the pawl 43 when activated by the gas generating member 61 of the pretensioner mechanism 17 in case of a vehicle collision will be described based on FIG. 11 and FIG. 12. FIG. 11 is an explanatory view showing the state wherein the piston 64 comes in contact with the pinion gear portion 71 of the pinion gear body 33 in response to the activation of the gas generating member 61 in the pretensioner mechanism 17. FIG. 12 is an explanatory diagram showing the operation of the pawl 43 corresponding to FIG. 11.

Figure 11:
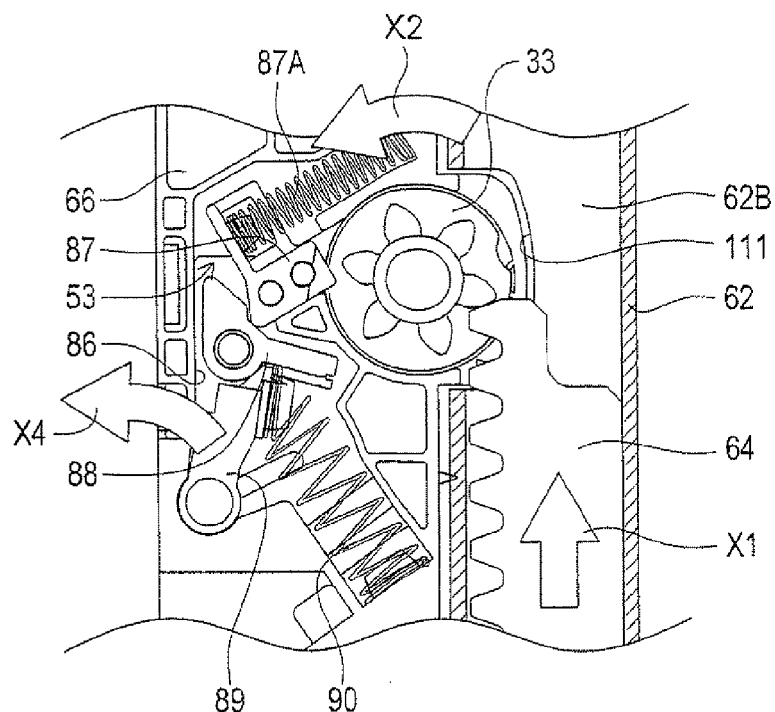
FIG. 11 is an explanatory diagram showing a state that a piston is moved in response to activation of a gas generating member of the pretensioner mechanism and the lower end portion of a rotating lever is disengaged from the tip end portion of a gear-side arm.
Figure 12:
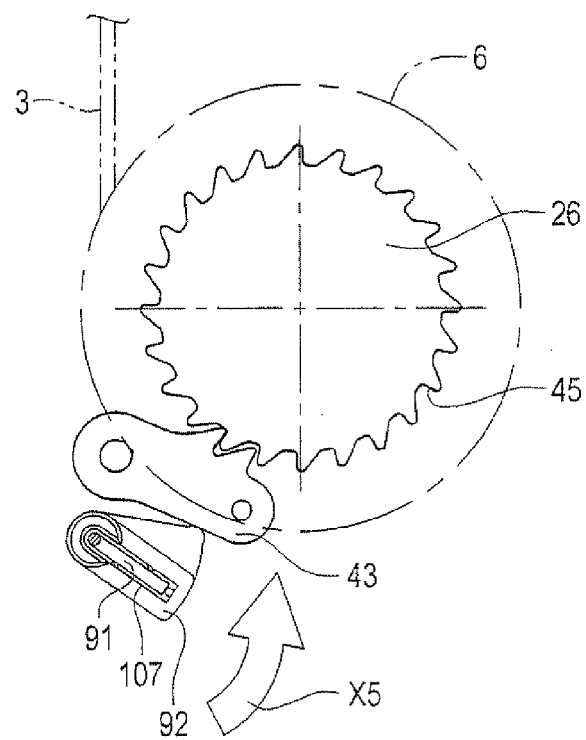
FIG. 12 is an explanatory diagram showing a pawl operation corresponding to FIG. 11.

As shown in FIG. 11, in case the gas generating member 61 of the pretensioner mechanism 17 is activated in case of a vehicle collision or the like, the piston 64 inside the piston housing portion 62B of the pipe cylinder 62 shears the rack locking pin 108 from a normal state as shown in FIG. 7 and moves upwards (direction arrow X1). Thus, the pinion gear body 33 starts rotating in a counter-clockwise direction in front view (direction of arrow X2). As the top end portion of the rotating lever 88 is further depressed by the push block 87 which was depressed by the block urging spring 87A, the lower end portion of this rotating lever 88 is disengaged from the tip end portion of the gear-side arm 89.

The gear-side arm 89 is depressed in an outward direction by the urging spring 90 and rotated in a counter-clockwise direction in front view (direction of arrow X4). The push block 87 is depressed in an outward direction by the block urging spring 87A to be kept disengaged from the pinion gear portion 71 of the pinion gear body 33 and makes the top end portion of the rotating lever 88 kept in contact with the internal wall surface of the concave portion 86.

As shown in FIG. 12, in case the lower end portion of the rotating lever 88 is disengaged from the tip end portion of the gear-side arm 89, this gear-side arm 89 is rotated in a counter-clockwise direction in front view (direction of arrow X5). This will cause the coupling shaft 91, with the bent portion formed at one end thereof being inserted inside the groove 97 of the gear-side arm 89, to rotate in a counter-clockwise direction as seen from a front view around a center axis (direction of arrow X5).

As the bent portion at the other end portion of the coupling shaft 91 is inserted in the groove portion 107, the mechanical arm 92 is rotated in a counter-clockwise direction as seen from a front view (direction of arrow X5) in response to rotation of the gear-side arm 89. This causes the pawl 43 to engage the ratchet gear portion 45 of the ratchet gear 26. The pawl 43 and the ratchet gear portion 45 of the ratchet gear 26 are engaged so as to restrain rotation of the take-up drum unit 6 in the webbing-pull-out direction and allow rotation in the retracting direction of the webbing 3.

Accordingly, in case the pawl 43 and the ratchet gear portion 45 of the ratchet gear 26 are engaged, a locking operation is carried out to restrain rotation of the take-up drum unit 6 in a pull out direction of the webbing 3, and rotation in the retracting direction of the webbing 3 is allowed. Thus, the pawl 43 can restrain rotation of the take-up drum unit 6 in a pull out direction of the webbing 3 before the clutch mechanism 68 and the pinion gear body 33 start rotating together.

After rotation of the pinion gear body 33 is stopped following activation of the pretensioner mechanism 17, the lower end portion of the rotating lever 88 is kept away from the tip end portion of the gear-side arm 89, as shown in FIG. 11. After the pretensioner mechanism 17 has been activated, the pawl 43 and the ratchet gear portion 45 of the ratchet gear 26 are kept engaged. Thus, the ratchet gear 26 and the wire plate 25 of the take-up drum unit 6 are restrained from rotating in the pull out direction of the webbing 3.

[Configuration of Peripherals Including Pretensioner Unit]

Next, the mechanism of rotating the take-up drum unit 6 to retract the webbing 3, caused by the operation of the pretensioner unit 7 in case of vehicle collision will be described based on FIG. 13 through FIG. 26. The description will focus on the configuration/construction of the mechanism and its operation and effects.

Figure 13:
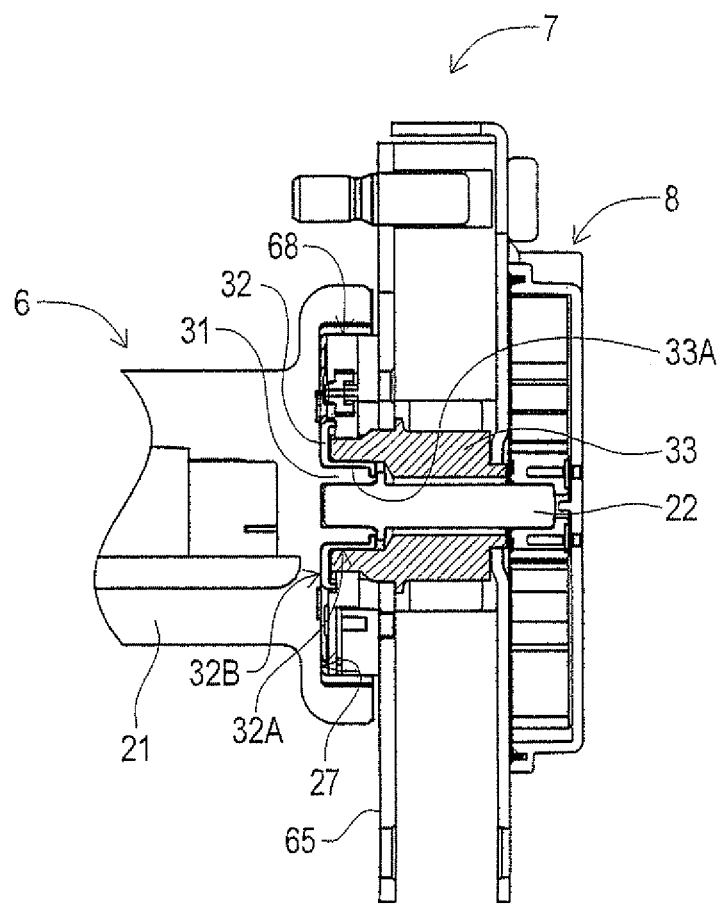
FIG. 13 is a partial sectional view showing a configuration wherein the take-up drum unit and the take-up spring unit are coupled with the pretensioner unit placed thereinbetween.

FIG. 13 is a partial cross-sectional view showing a configuration wherein the take-up drum unit 6 and the take-up spring unit 8 are coupled with the pretensioner unit 7 placed therebetween. FIG. 13 represents a view of the cross sectional diagram in FIG. 4 as seen from a back side.

As shown in FIG. 13, the guiding drum 21 is coupled coaxially with the take-up spring unit 8 through the drum shaft 22. The guiding drum 21 is always urged in a retracting direction of the webbing 3 by the take-up spring unit 8.

From the pretensioner unit 7, the clutch mechanism 68 provided so as to protrude from the base plate 65 is stored inside the flange portion 27 of the guiding drum 21. A bearing 32 is provided in a freely sliding fashion between the guiding drum 21 and the pinion gear body 33. The bearing 32 has a cylindrical portion 32A which has a cylinder shape and a flanged end portion 32B provided at one end thereof and extending in the direction of the outer diameter. The bearing 32 is mounted in a freely sliding fashion between the mounting boss 31 of the guiding drum 21 and the shaft receiving portion 33A of the pinion gear body 33.

More specifically, the inner surface of the cylindrical portion 32A and the lower surface of the flanged end portion 32B of the bearing 32 come in contact in a freely sliding fashion with the outside surface of the mounting boss 31 of the guiding drum 21 and the bottom surface of the flange portion 27 provided in the outside surface of the mounting boss 31. The outside surface of the cylindrical portion 32A and the top surface of the flanged end portion 32B of the bearing 32 come in contact with the inner surface and tip end portion of the pinion gear body 33 in a freely sliding fashion.

In the pretensioner unit 7, the pinion gear body 33 and the clutch mechanism 68 are in contact with the guiding drum 21 through the bearing 32 in a freely sliding fashion. As a result, the rotation of the guiding drum 21 responsive to the pull out and retracting operation of the webbing 3 is not restrained, in normal operation, by the pinion gear body 33 and the clutch mechanism 68 of the pretensioner unit 7.

FIG. 14 is a plain view of the seatbelt retractor 1 as seen from the take-up spring unit 8 side. To describe the relationship between the guiding drum 21, the clutch mechanism 68 and the base plate 65, the constituting members of the pretensioner unit 7, excluding the clutch mechanism 68 and the base plate 65, the take-up spring unit 8 and the drum shaft 22 will be omitted. To show the relationship between these members, a part or all these members are shown in a see-through state (shown by a broken line), as necessary.

As shown in FIG. 14, the clutch mechanism 68 is mounted coaxially with the guiding drum 21. This is because the pawl base 76 of the clutch mechanism 68 is press-fitted and fixed in and coaxially coupled with the boss portion 74 of the pinion gear body 33 which is fitted and inserted in the through hole 83 formed in a substantially central position of the base plate 65 and is rotatably supported by the inner surface of the pinion gear body 33 and the outer surface of the mounting boss 31 through the bearing 32.

The clutch gear 30 is engraved towards the shaft center on an inner peripheral edge portion constituting the flange portion 27 of the guiding drum 21. As will be described later, the clutch pawl 29 housed in the clutch mechanism 68 protrudes in a pretensioner-activated state. The protruding clutch pawl 29 engages the opposing clutch gear 30 and the guiding drum 21 is caused to rotate in the retracting direction of the webbing 3.

At a face of the clutch mechanism 68 which comes in contact with the base plate 65, there are provided three positioning projections 77A at equal angles which engages the respective positioning holes 81 formed around the through hole 83 in the base plate 65. As a result, the clutch mechanism 68 and the base plate 65 are fixed so that relative rotation thereof is disabled in normal operation.

The positioning projections 77A are formed in the pawl guide 77 constituting the clutch mechanism 68, at the side face facing the base plate 65. Accordingly, at an initial stage in normal operation and in case of a vehicle collision, the pawl guide 77 is fixed in the base plate 65 so that relative rotation thereof with respect to the base plate 65 is disabled.

In case of vehicle collision, the gas generating member 61 of the pretensioner unit 7 is activated so as to depress the piston 64. Thereby, the pinion gear body 33 is caused to rotate and the pawl base 76 will be relatively rotated with respect to the pawl guide 77. Each clutch pawl 29 protrudes outwardly in response to this rotary motion. The rotary driving force of the pinion gear body 33 given by the piston 64 is maintained even after each clutch pawl 29 protrudes, which means that this rotary driving force is also applied to the pawl guide 77.

When each projection 77A of the pawl guide 77 cannot resist this rotary driving force any more, each positioning projection 77A will fracture. Thereafter, the clutch mechanism 68 becomes integral with the pinion gear body 33 and the guiding drum 21 is caused to rotate, which in turn will result in a webbing 3 retracting operation. An opening portion 31A is provided coaxially in the mounting boss 31 of the guiding drum 21. The drum shaft 22 is then press-fitted in this opening portion 31A.

[Description of Mechanism of Pretensioner Operation]

Figure 15:
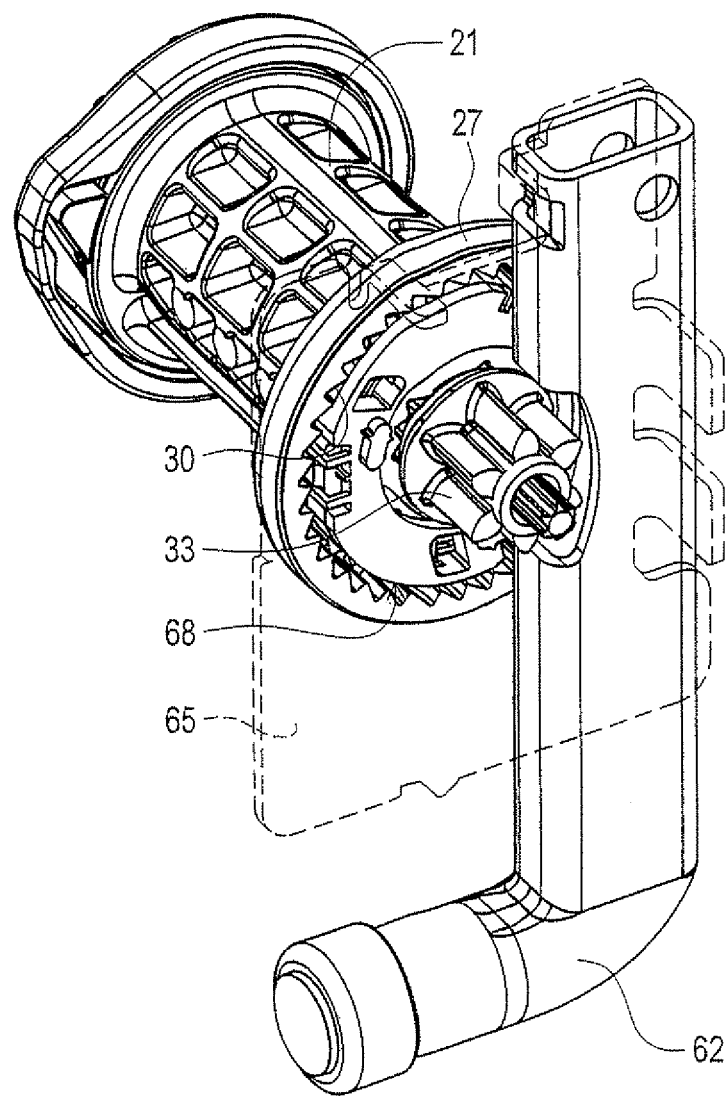
FIG. 15 is a perspective view for describing the mechanism of carrying out a pretensioner operation.
Figure 16:
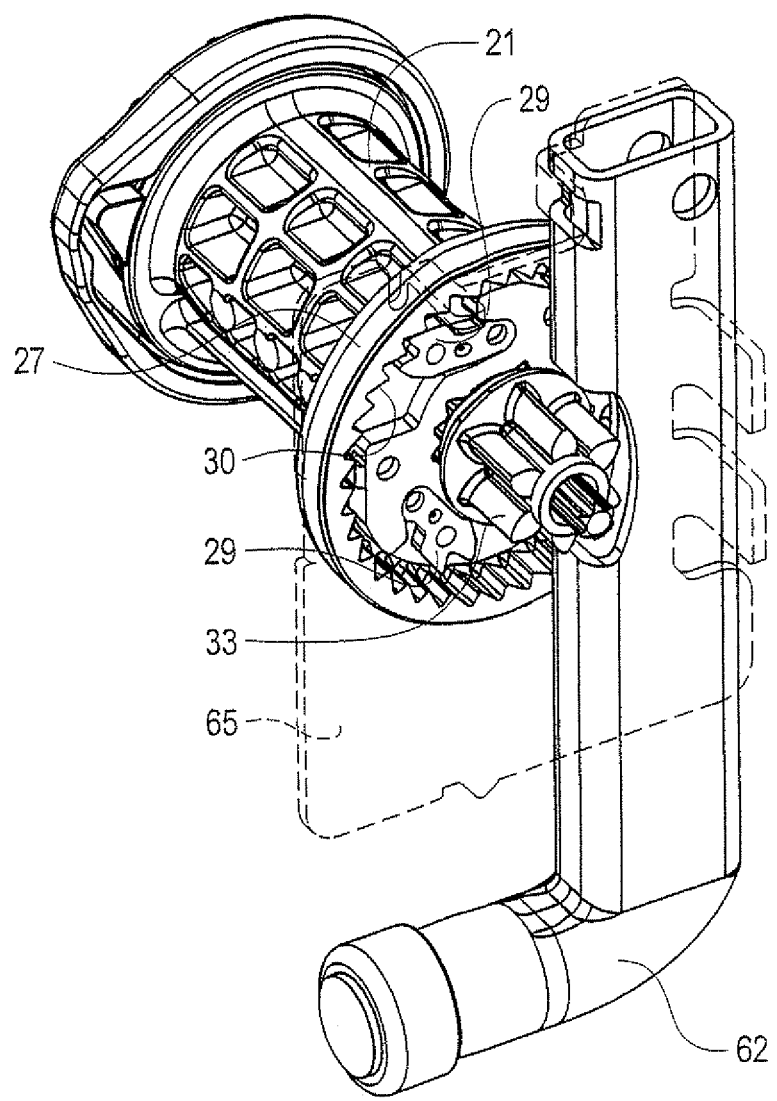
FIG. 16 is the perspective view with the pawl guide in FIG. 15 removed therefrom.

FIG. 15 and FIG. 16 are perspective views showing the webbing 3 retracing operation carried out in the pretensioner unit 7 in case of vehicle collision, i.e., these are perspective views to show the configuration of the pretensioner operation. To describe the configuration relating to the pretensioner operation, the constituting elements will be partially omitted. More specifically, from the members constituting the pretensioner unit 7, the clutch mechanism 68, the pinion gear body 33 and the pipe cylinder 62 will be left, while the rest of the members will be omitted. Here, the base plate 65 will be shown by a dotted line. The take-up spring unit 8 will be omitted as well.

As shown in FIG. 15 and FIG. 16, the clutch mechanism 68 which is coupled with the pinion gear body 33 with the base plate 65 placed therebetween, is housed in the inner side of the flange portion 27 of the guiding drum 21. Thus, the clutch mechanism 68 is installed so that a side surface thereof faces the clutch gear 30 of the guiding drum 21. When the pretensioner is activated, the pinion gear body 33 is rotated by depression of the piston 64 that moves in response to the gas pressure inside the pipe cylinder 62.

The clutch pawls 29 housed inside the clutch mechanism 68 protrude outwardly from the side surface of the clutch mechanism 68 in response to rotation of the pinion gear body 33 as driven by depressing of the piston 64. The clutch pawls 29 protruding from the side surface of the clutch mechanism 68 engage the opposing clutch gear 30, then the guiding drum 21 is caused to rotate in the retracting direction of the webbing 3.

Here, a plurality of clutch pawls 29 are installed, as shown in FIG. 16. As will be described later in FIG. 17 and FIG. 18, three clutch pawls 29 are provided concentrically at substantially equal angles and get engaged with the clutch gear 30 of the guiding drum 21 at three locations. Thus, the three clutch pawls 29 can evenly engage the clutch gear 30 formed at inner the peripheral surface of the flange portion 27 of the guiding drum 21, which enables the pinion gear body 33 to transmit its rotary driving force to the guiding drum 21.

[Configuration of Clutch Mechanism]

Here, a schematic configuration of the clutch mechanism 68 will be described based on FIG. 17 through FIG. 20.

Figure 17:
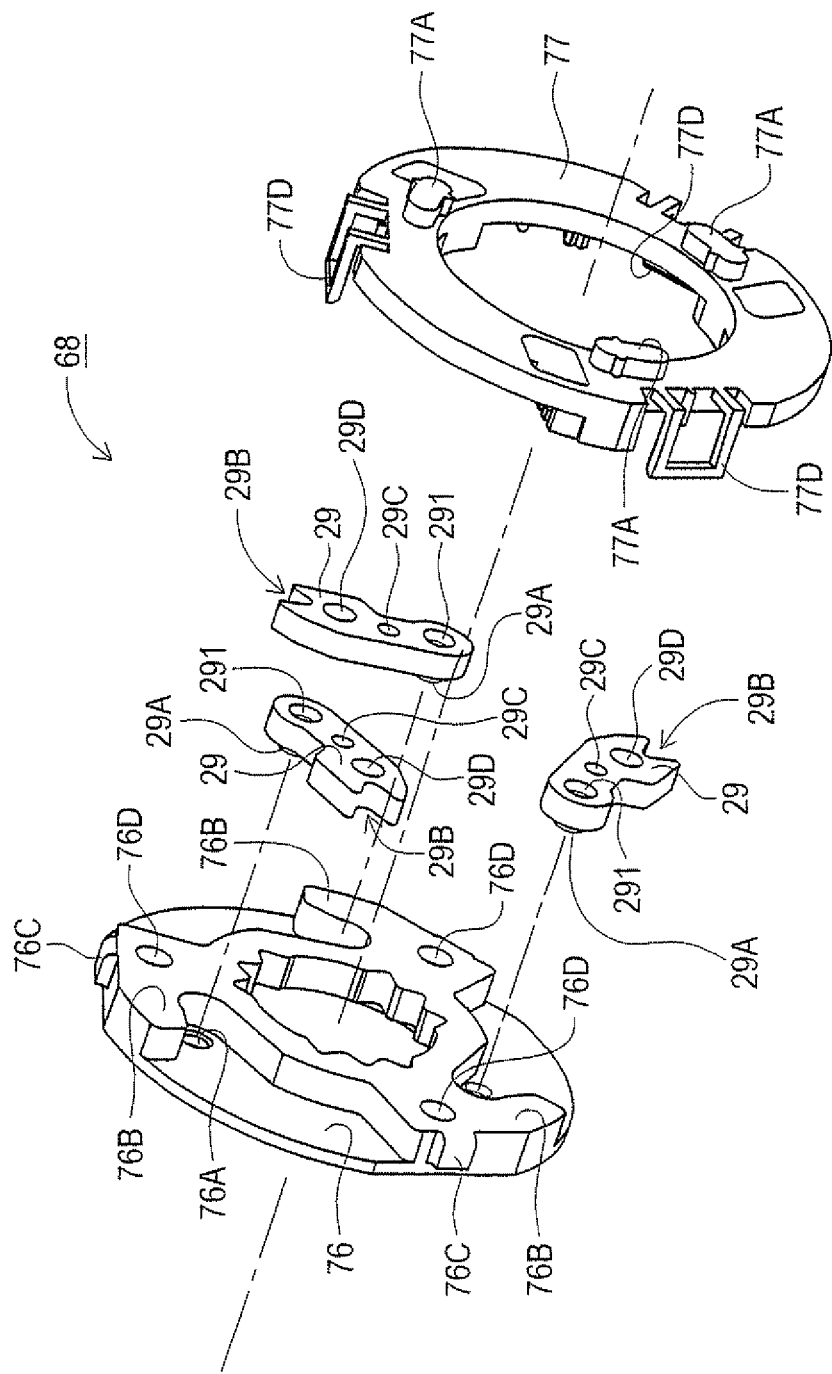
FIG. 17 is an exploded perspective view showing a configuration of the clutch mechanism seen from the take-up spring unit side.
Figure 18:
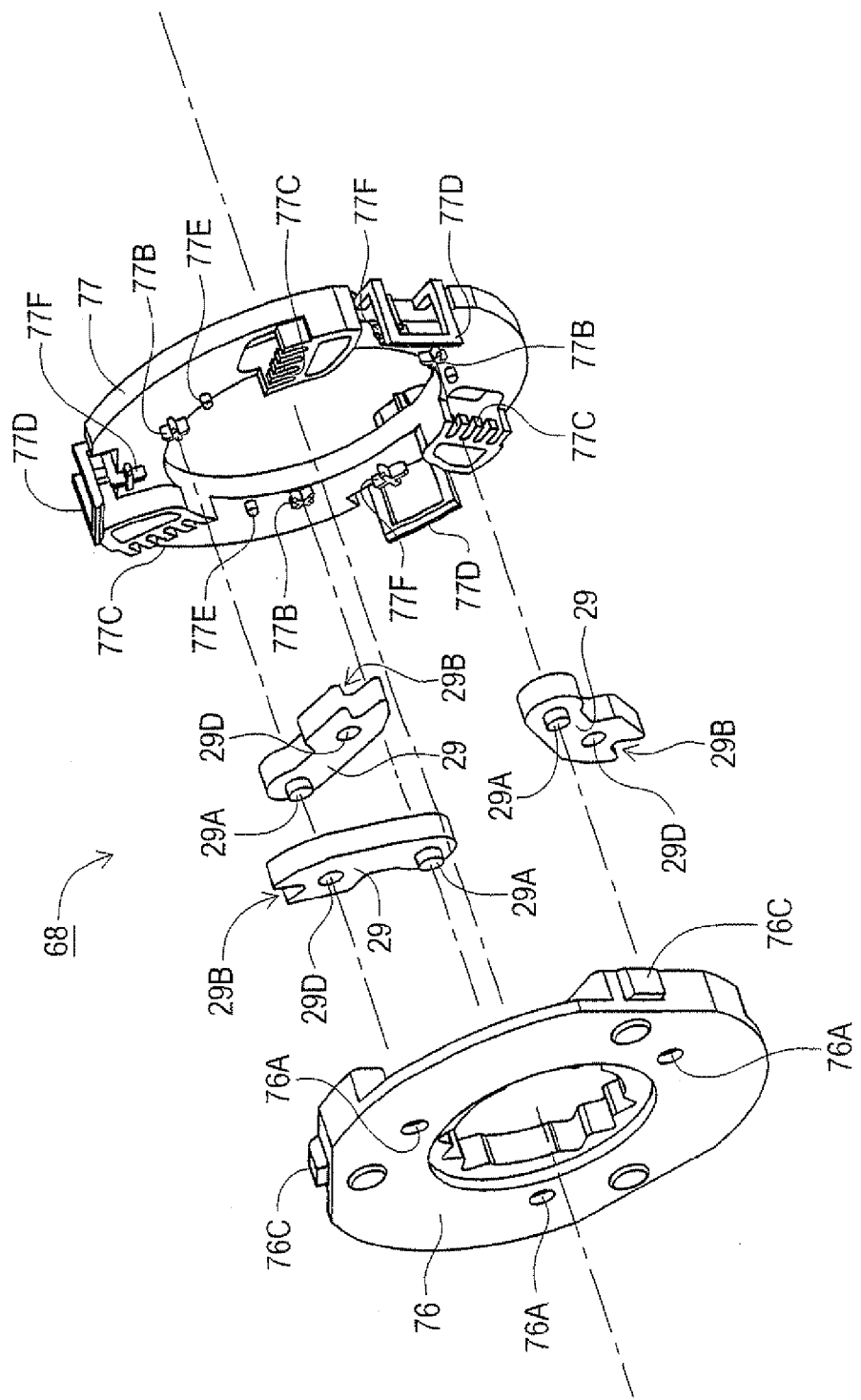
FIG. 18 is an exploded perspective view showing a configuration of a clutch mechanism seen from the take-up drum unit side.
Figure 19:
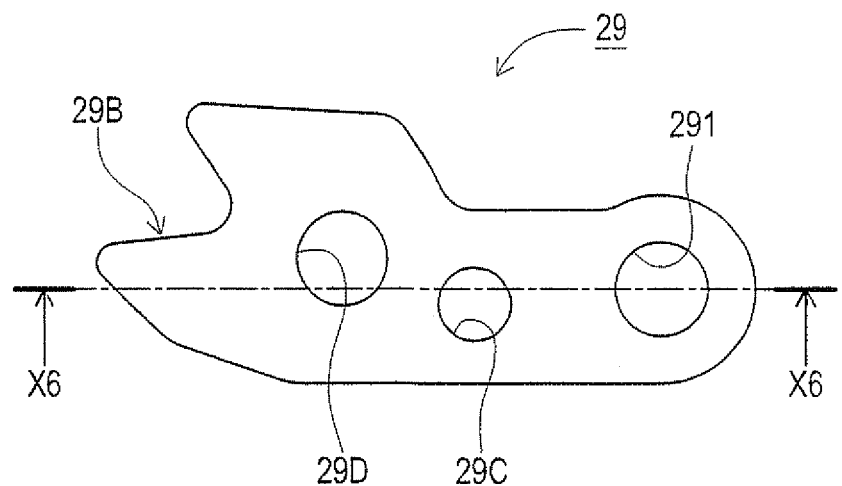
FIG. 19 is a plain view of a clutch pawl.
Figure 20:
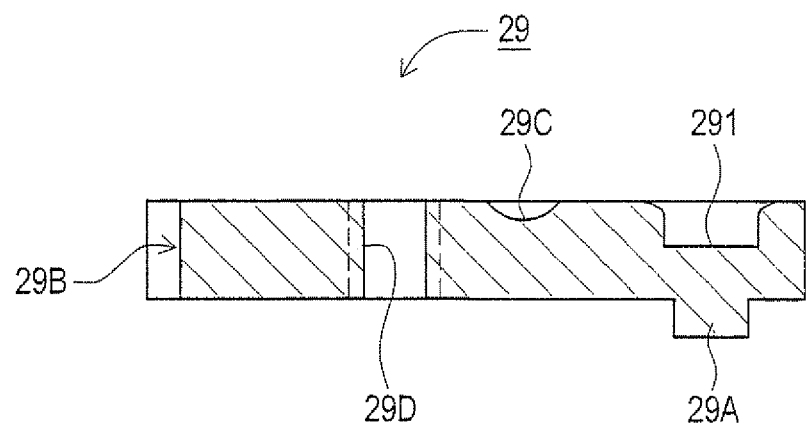
FIG. 20 is a cross sectional view taken along arrow X6-X6 in FIG. 19.

FIG. 17 and FIG. 18 are exploded perspective view showing the configuration of the clutch mechanism 68. FIG. 17 is an exploded perspective view as seen from the take-up spring unit 8 side. FIG. 18 is an exploded perspective view as seen from the take-up drum unit 6 side. FIG. 19 is a plain view of the clutch pawl 29. FIG. 20 is a cross sectional view taken along arrow X6-X6 in FIG. 19.

As shown in FIG. 17 and FIG. 18, the clutch mechanism 68 is comprised of the pawl base 76, three clutch pawls 29 and the pawl guide 77. It is to be noted that four or more clutch pawls 29 may be provided with the clutch mechanism 68.

Further, as shown in FIG. 17 through FIG. 20, bosses 29A are erected at the respective base end portions of the clutch pawls 29. The bosses 29A each have a circular shape in cross section and are inserted through the respective insertion holes 76A formed in the pawl base 76. The bosses 29A are formed so as not to protrude from the pawl base 76 when inserted through the insertion holes 76A. At the other side faces of the respective clutch pawls 29 opposite to the bosses 29A, recessed portions 291 having a circular shape in cross section are formed so as to be located on the same axis with the bosses 29A. The recessed portions 291 are each formed so that the depth thereof is shallower than the thickness of the clutch pawls 29.

The recessed portion 291 will be press-fitted in a cross-bars projection 77B erected in the pawl guide 77. The cross-bars projection 77B is formed so that one bar of the cross-bars is longer than the diameter of the recessed portion 291 of the clutch pawl 29. This will help restrain the rotation of the clutch pawl 29 in a press-fitted state. In each clutch pawl 29, the side of the recessed portion 291 which faces the pawl guide 77 is subjected to a chamfering process.

Also, in place of the chamfering process of the recessed portion 291 or together with this chamfering process, the cross-bars projection 77B may be formed so that one bar of the cross-bars are shorter at the tip end portions thereof, or alternatively, the tip end portions are formed thinner as compared to the other portions. As a result, the press-fitting operation can be carried out smoothly.

The clutch pawls 29 are each formed so that the width thereof from a tip end portion to a substantially center portion in a longitudinal direction is slightly wider than the base end portion of the clutch pawl 29 at which the boss 29A is protruded. The clutch pawls 29 each have an engagement tooth 29B of which tip end portion is recessed inwardly in the longitudinal direction in a V-shaped manner in plan view. This engagement tooth 29B engages with the clutch gear 30. A concave portion 29C caved in a substantially hemispherical shape is provided at an intermediate position between the tip end portion of the engagement tooth 29B and the recessed portion 291. A projection 77E is erected at the corresponding position in the pawl guide 77.

The projection 77E and the concave portion 29C are engaged, with the recessed portion 291 of the clutch pawl 29 being press-fitted to the cross-bars projection 77B of the pawl guide 77. The arrangement position of the concave portion 29C and the projection 77E has the effect of determining the rotating position of each clutch pawl 29 of which recessed portion 291 is press-fitted in the cross-bars projection 77B. This configuration is for positioning each clutch pawl 29 of which recessed portion 291 is press-fitted in the cross-bars projection 77B at a storing position.

Due to the engagement between the concave portion 29C and the projection 77E and the recessed portion 291 being press-fitted in the cross-bars projection 77B, each clutch pawl 29 is prevented from rotating from the storing position in normal operation and the engagement tooth 29B is prevented from protruding outside the side faces of the pawl base 76 and the pawl guide 77.

The pawl base 76 is also provided with three insertion holes 76A having a circular shape in cross section at positions opposed to the bosses 29A of the respective clutch pawls 29 so as to pass therethrough. When the pawl guide 77 and the pawl base 76 are engaged, the bosses 29A of the clutch pawls 29 are respectively inserted through the insertion holes 76A rotatably.

The pawl supporting blocks 76B of enough thickness are provided so as to surround the insertion holes 76A at an outer diameter side of the pawl base 76. The pawl supporting blocks 76B are provided so as to receive the load which is in turn received by the clutch pawls 29 when the clutch pawls 29 depress and drive the guiding drum 21.

The engagement tooth 29B of each clutch pawl 29 formed so that the width thereof is slightly wider than the width of the clutch pawl 29 is provided with a deforming through hole 29D having a diameter of substantially half the width of the engagement tooth 29B at a substantial center portion in a longitudinal direction of the engagement tooth 29B. It is to be noted that the modification through hole may be formed in a shape other than circular shape in cross section. It may be formed in, for instance, a triangular shape, a rectangular shape, a diamond shape or an oval shape in cross section. The deforming through hole 29D is preferably be formed at an edge portion of the base end portion of the engagement tooth 29B, that is, before a portion from which the width thereof starts to narrow.

At the inner side face of the pawl guide 77 facing the pawl base 76, a guiding portion 77C is provided for each clutch pawl 29 so as to be adjacent to a side face of the clutch pawl 29 in a rotation direction. At an initial stage in operation of the pretensioner unit 7, the respective positioning projections 77A of the pawl guide 77 are engaged with the positioning holes 81 of the base plate 65 and therefore the rotation of the pawl guide 77 is disabled.

In case of vehicle collision, the pawl base 76 rotates with the pinion gear body 33 in this state. The respective clutch pawls 29 depressed by the pawl supporting blocks 76B in response to this rotation rotate around the bosses 29A and move in a rotation direction, while fracturing the cross-bars projections 77B and the projections 77E. The side faces at the inner side of the moved clutch pawls 29 are brought into contact with and depressed by the guiding portions 77C.

As the pawl base 76 rotates further, the clutch pawls 29 are depressed by the pawl supporting blocks 76B and the guiding portions 77C. As a result, the clutch pawls 29 are slidably guided radially outwardly along the guiding portion 77C and depressed by the pawl supporting blocks 76B in a rotating direction. Therefore, the respective engagement teeth 29B protrude outwardly from the side faces of the pawl base 76 and the pawl guide 77.

In the present embodiment, three clutch pawls 29 are provided concentrically at substantially equal angles. When the guiding drum 21 is rotated and driven through the clutch pawls 29 for activation of the pretensioner, the depressing load is applied on the flange portion 27 of the guiding drum 21 by the clutch pawls 29 in response to this rotary driving. Owing to the configuration of this embodiment, this depressing load is dispersed, which makes it possible to achieve efficient pressure capabilities and load bearing capabilities.

In the pawl base 76, the engaging blocks 76C are formed at an outer diameter end of the pawl supporting blocks 76B. The concave portions 76D caved in a predetermined depth and having a circular shape in cross section are opened close to the engagement blocks 76C, at one corner of the pawl supporting blocks 76B.

In the pawl guide 77, there are formed three locking hooks 77D in a substantially rectangular frame shape which engage the locking blocks 76C, and cross-bars projections 77F which engage the concave portions 76D, when the pawl guide 77 is mounted to the pawl base 76. The locking hooks 77D are each formed so that the inner width thereof in a circumferential direction is wider than the width of the locking block 76C in the circumferential direction.

Here, engagement between the locking blocks 76C and the locking hooks 77D is configured so that the pawl base 76 is relatively rotatable with respect to the pawl guide 77 at an initial stage in the rotation of the pawl base 76 caused by the pinion gear body 33. At an initial stage of the rotation of the pawl base 76, the pawl base 76 rotates with the pawl guide 77 kept in a rotation-disabled state and the clutch pawls 29 are caused to protrude. The cross-bars projections 77F which engage the concave portions 76D fracture in response to rotation of the pawl base 76.

Here, the pawl base 76 and the clutch pawls 29 are made of metallic members such as steel material, and the pawl guide 77 is made of a resin member. The projecting operation of the clutch pawls 29, following the projecting operation of the clutch pawls 29, the integral rotating operation of the pawl guide 77 with the pawl base 76 or a regulating operation of reverse rotation of the pawl base 76 can thus be carried out easily and reliably.

[Description of Pretensioner Operation]

Next, rotary driving of the guiding drum 21 caused by the pretensioner operation will be described based on FIG. 21 through FIG. 26.

Figure 21:
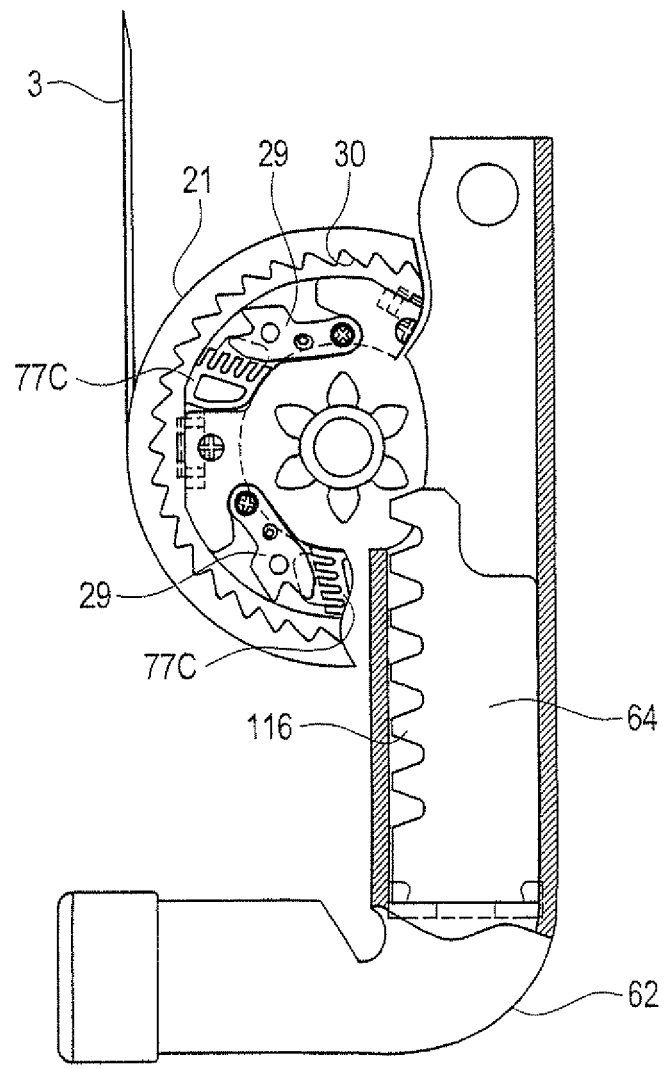
FIG. 21 is a partially cut-out perspective view showing a positional relationship between the guiding drum, the clutch mechanism and the piston before pretensioner operation is carried out.
Figure 22:
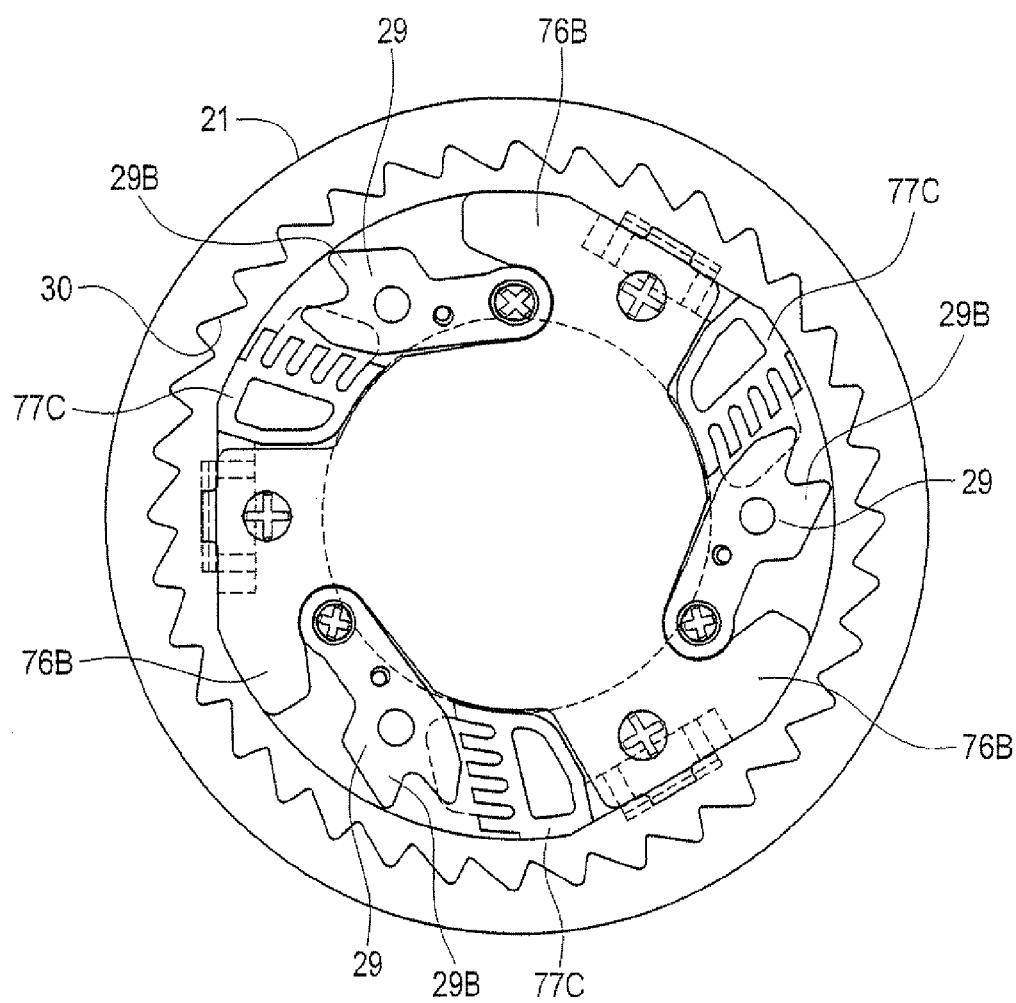
FIG. 22 is a partially enlarged view showing a state that the respective clutch pawls and the guiding drum of FIG. 21.
Figure 23:
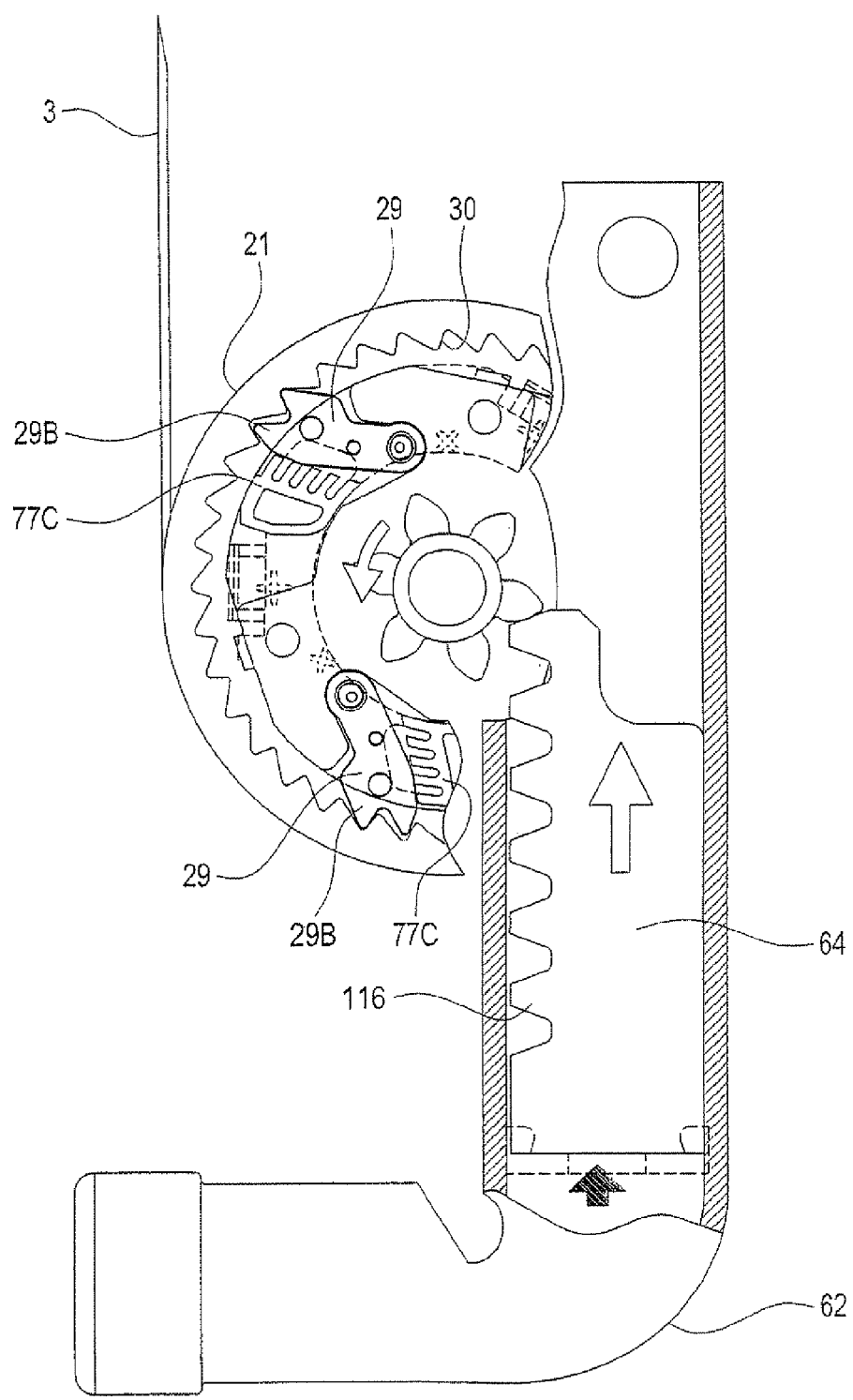
FIG. 23 is a partially cut-out perspective view showing a positional relationship between the guiding drum, the clutch mechanism and the piston at the time the pretensioner operation is started.
Figure 24:
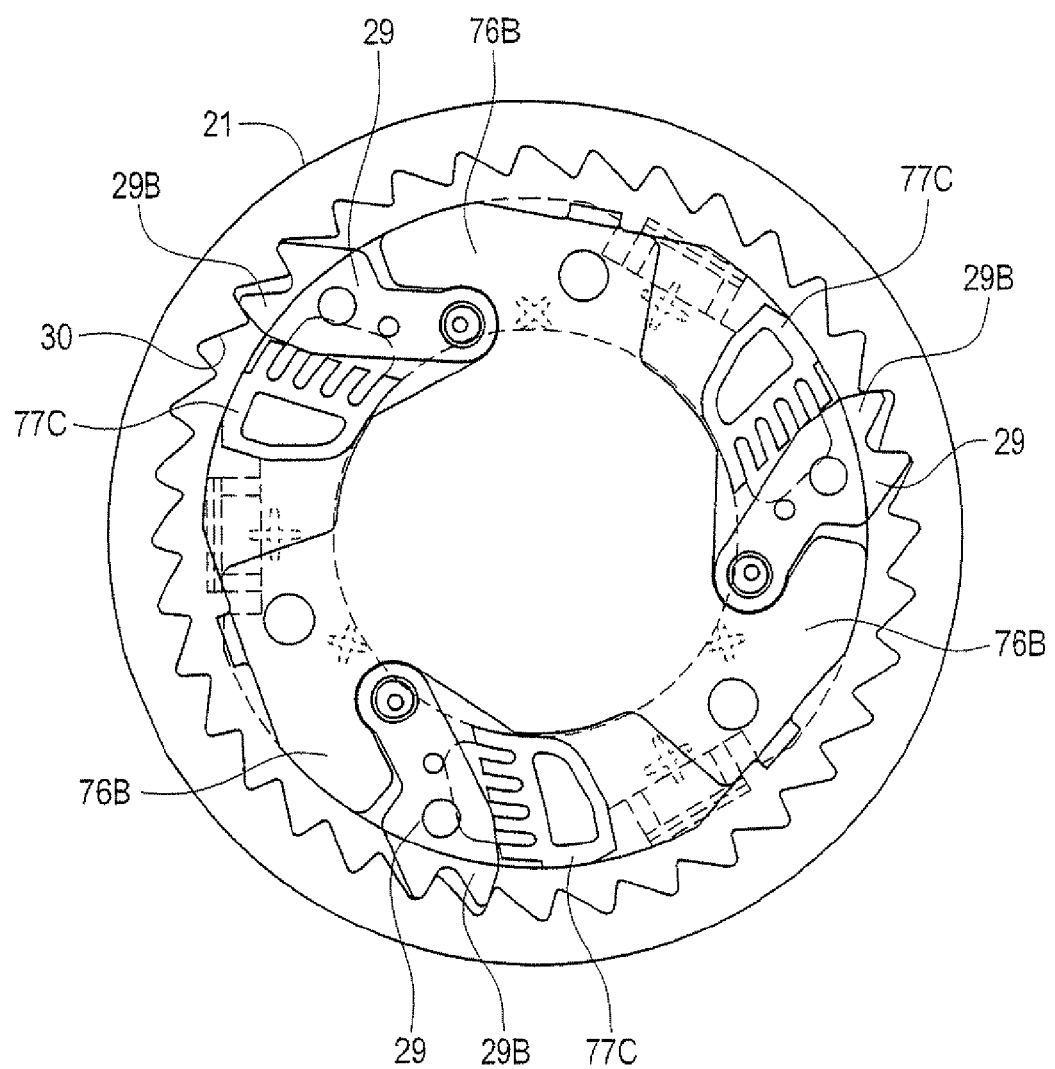
FIG. 24 is a partially enlarged view showing an engaged state between the clutch pawl and the guiding drum in FIG. 23 (when engagement is initiated)
Figure 25:
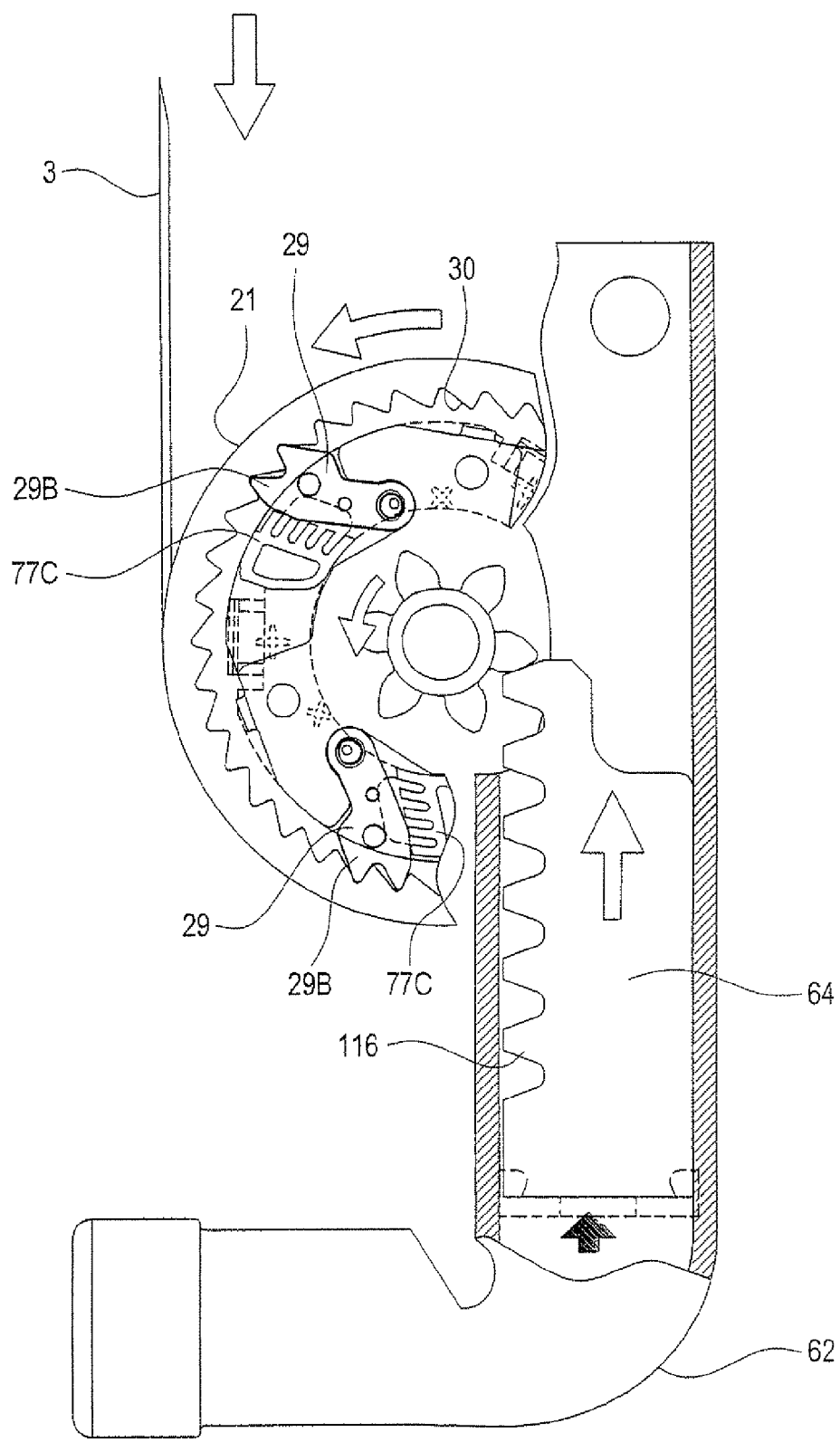
FIG. 25 is a partially cut-out perspective view showing a positional relationship between the guiding drum, the clutch mechanism and the piston when the pretensioner is operated.
Figure 26:
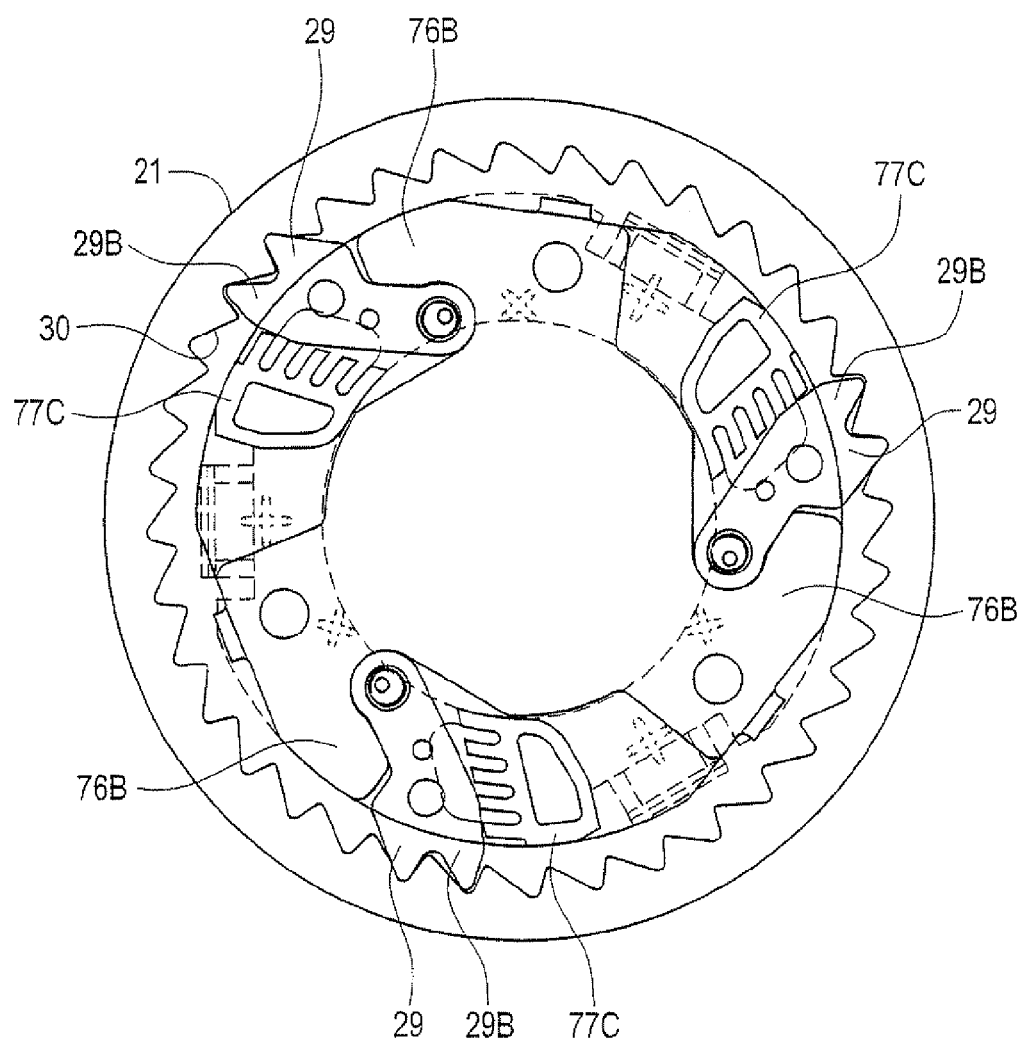
FIG. 26 is a partially enlarged view showing an engaged state between the clutch pawl and the guiding drum in FIG. 25 (when engagement is completed)

FIG. 21, FIG. 23 and FIG. 25 show one part of the pipe cylinder 62 as a cross sectional view to describe the configuration wherein the pretensioner operation is transmitted to the guiding drum 21. The position where the piston 64 is arranged inside the pipe cylinder 62 will become apparent from these drawings. The drawings show the engaging state between the clutch pawls 29 and the guiding drum 21, excluding the base plate 65 and the pawl guide 77. FIG. 22, FIG. 24 and FIG. 26 are enlarged views of the engaging state between the clutch pawls 29 and the guiding drum 21, which correspond to FIG. 21, FIG. 23 and FIG. 25, respectively.

First, the state prior to activation of the pretensioner will be described based on FIG. 21 and FIG. 22.

As shown in FIG. 21 and FIG. 22, the piston 64 is provided at a bottom position inside the pipe cylinder 62, whereby the rack 116 carved in the piston 64 is prevented from engaging with the pinion gear body 33. The clutch pawls 29 are kept at the storing positions which are positioned at the inner side of the side surfaces of the pawl base 76 and the pawl guide 77.

Next, the state at the time the pretensioner operation is started will be described based on FIG. 23 and FIG. 24. FIG. 23 shows a state that the gas generating member 61 has started gas generation inside the pipe cylinder 62. FIG. 24 shows the state corresponding to FIG. 23. Specifically, FIG. 24 shows the state that the clutch pawls 29 which were protruding radially outwardly start engaging the clutch gear 30.

As shown in FIG. 23 and FIG. 24, as the gas generating member 61 of the pretensioner unit 7 starts gas generation in case of vehicle collision, the piston 64 starts to be depressed and driven toward the top end portion of the pipe cylinder 62 under the gas pressure. Then, as the rack 116 and the pinion gear body 33 are engaged and the pinion gear body 33 rotates, the pawl base 76 starts rotating. Meanwhile, the positioning projections 77A of the pawl guide 77 are fitted in the respective positioning holes 81 in the base plate 65 and thereby fixed in a rotation-disabled state. Therefore, the pawl base 76 rotates relatively with respect to the pawl guide 77.

In response to this rotary motion, the inner side surface of the respective clutch pawls 29 are brought into contact with and depressed by the guiding portions 77C of the pawl guide 77, and then the respective engagement teeth 29B start protruding radially outwardly from the side surfaces of the pawl base 76 and the pawl guide 77. As a result, the engagement teeth 29B of the clutch pawls 29 start engaged with the clutch gear 30.

Next, the state that the pretensioner operation succeeds will be described based on FIG. 25 and FIG. 26. FIG. 25 shows the succeeding state of depressing and driving of the piston 64 under the gas pressure. FIG. 26 shows a state corresponding to FIG. 25.

As shown in FIG. 25 and FIG. 26, the depression and driving of the piston 64 succeeds and thereby the pinion gear body 33 engaged with the rack 116 continues rotating. As a result, the clutch pawls 29 protrude further and then engagement with the clutch gear 30 is completed. Since the pawl base 76 is rotated further with the clutch pawls 29 engaged with the clutch gear 30, the clutch pawls 29 depress the guiding portions 77C in a rotating direction and thereby the rotary driving force is also applied to the pawl guide 77.

Once the pawl guide 77 fail to resist this rotary driving force, the positioning projections 77A fracture and the pawl guide 77, the pawl base 76 and the pinion gear body 33 rotate integrally with each other. As a result, the guiding drum 21 of which clutch pawls 29 are engaged with the clutch gear 30 are rotated and driven in a retracting direction of the webbing 3, whereby the webbing 3 is wound on the guiding drum 21.

[Description of Pretensioner Operation (in Case that Only One Clutch Pawl is Engaged Initially)]

The description will be made on the state that only one clutch pawl 29 is engaged with the clutch gear 30 of the guiding drum 21 initially after the pretensioner operation is started. Here, the operation in case that the other clutch pawls 29 engage with the clutch gear 30 will be made based on FIG. 27 through FIG. 30. FIG. 27 through FIG. 30 are enlarged views of the operation in case that only one clutch pawl 29 is engaged with the clutch gear 30 and then the other clutch pawls 29 are engaged with the clutch gear 30.

Figure 27:
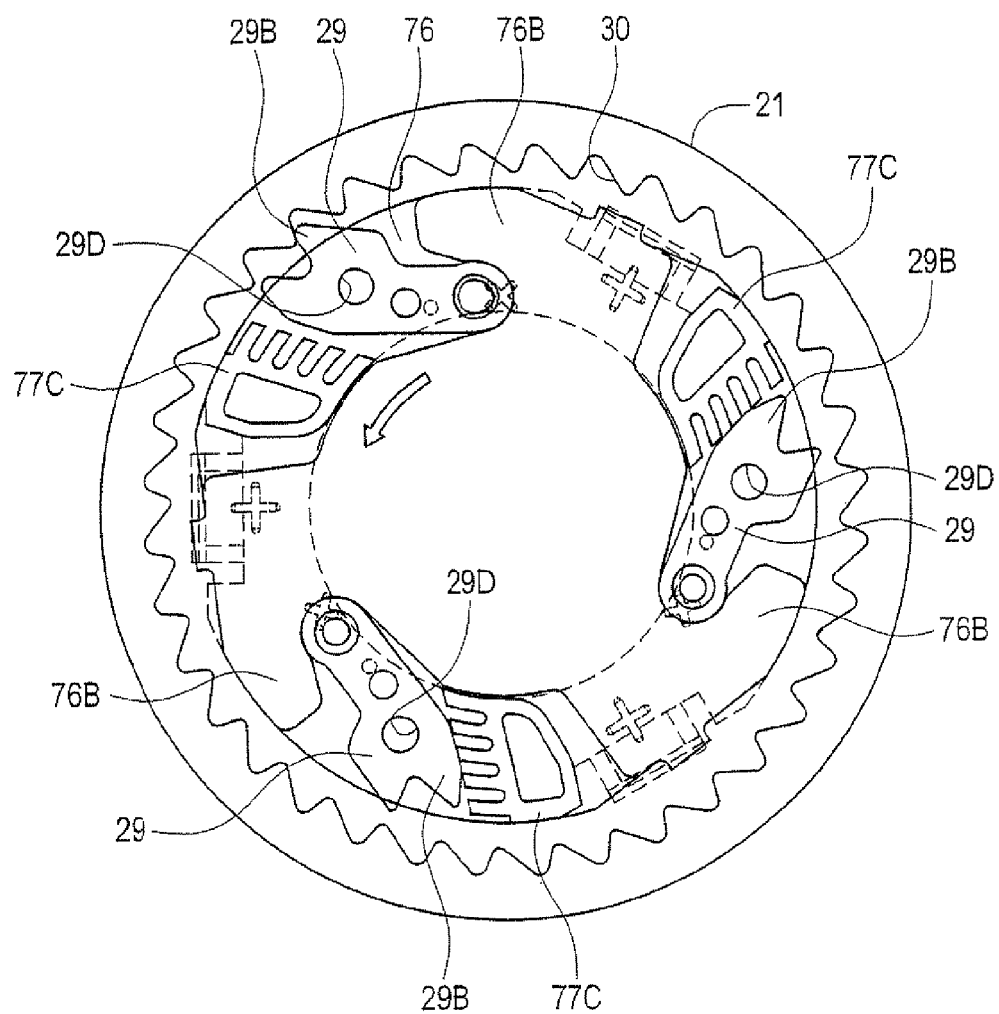
FIG. 27 is a partially enlarged view showing an enlarged state that a tip end portion of engagement tooth of only one clutch pawl is stuck with the clutch gear.
Figure 28:
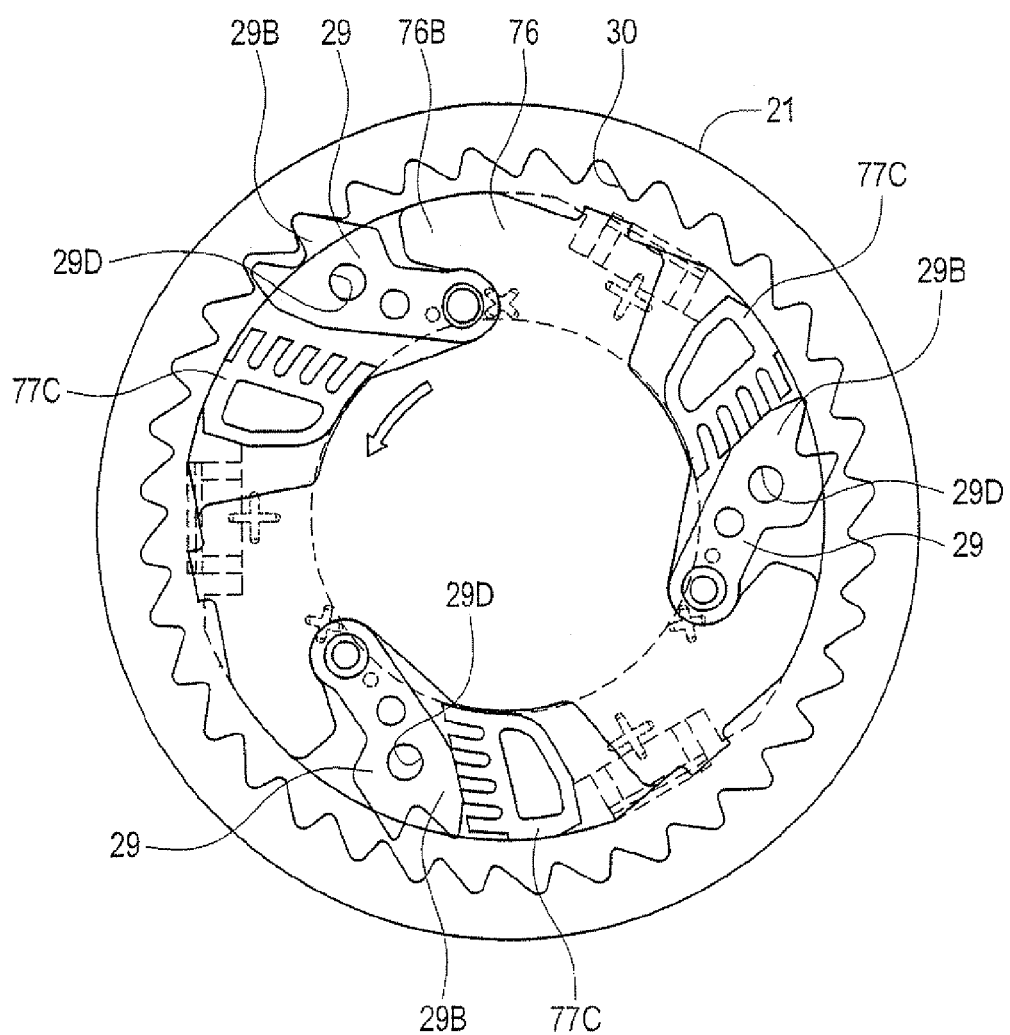
FIG. 28 is a partially enlarged view showing an enlarged state that only one clutch pawl is engaged with the clutch gear.

As shown in FIG. 27 and FIG. 28, as the piston 64 of the pretensioner unit 7 activates in case of vehicle collision and thereby the pinion gear body 33 causes to start rotation of the pawl base 76, the respective tip end portions of the engagement teeth 29B of the clutch pawls 29 protrude from the side surface of the pawl base 76. Then, in case that the rotation center of the pawl base 76 is decentered from the rotation center of the guiding drum 21 and thereby the tip end portion of the engagement tooth 29B of one of the three clutch pawls 29 (the upper left clutch pawl 29 in FIG. 27) is stuck with the edge of tooth tip of the clutch gear 30, only this clutch pawl 29 is engaged with the clutch gear 30 in response to rotation of the pawl base 76.

Figure 29:
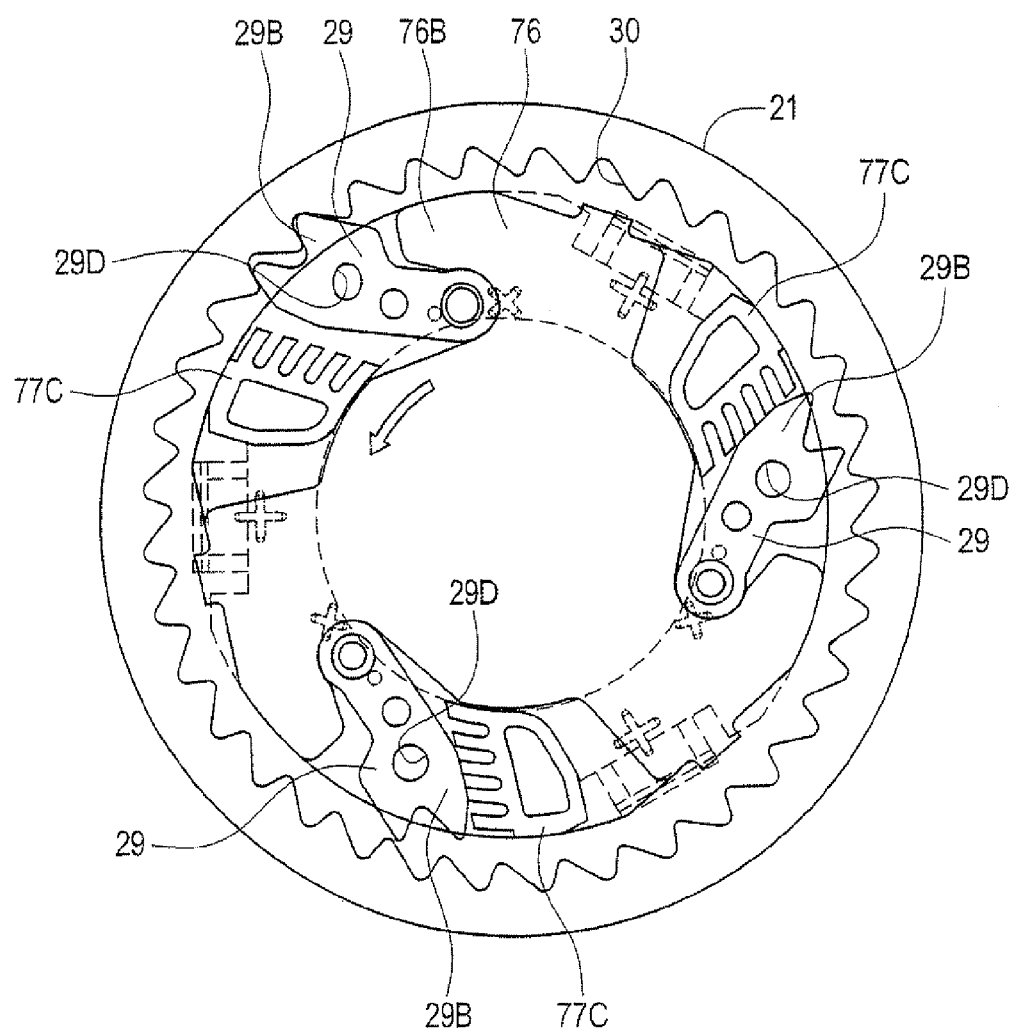
FIG. 29 is a partially enlarged view showing an enlarged state that the first clutch pawl engaged with the clutch pawl is slightly deformed.
Figure 30:
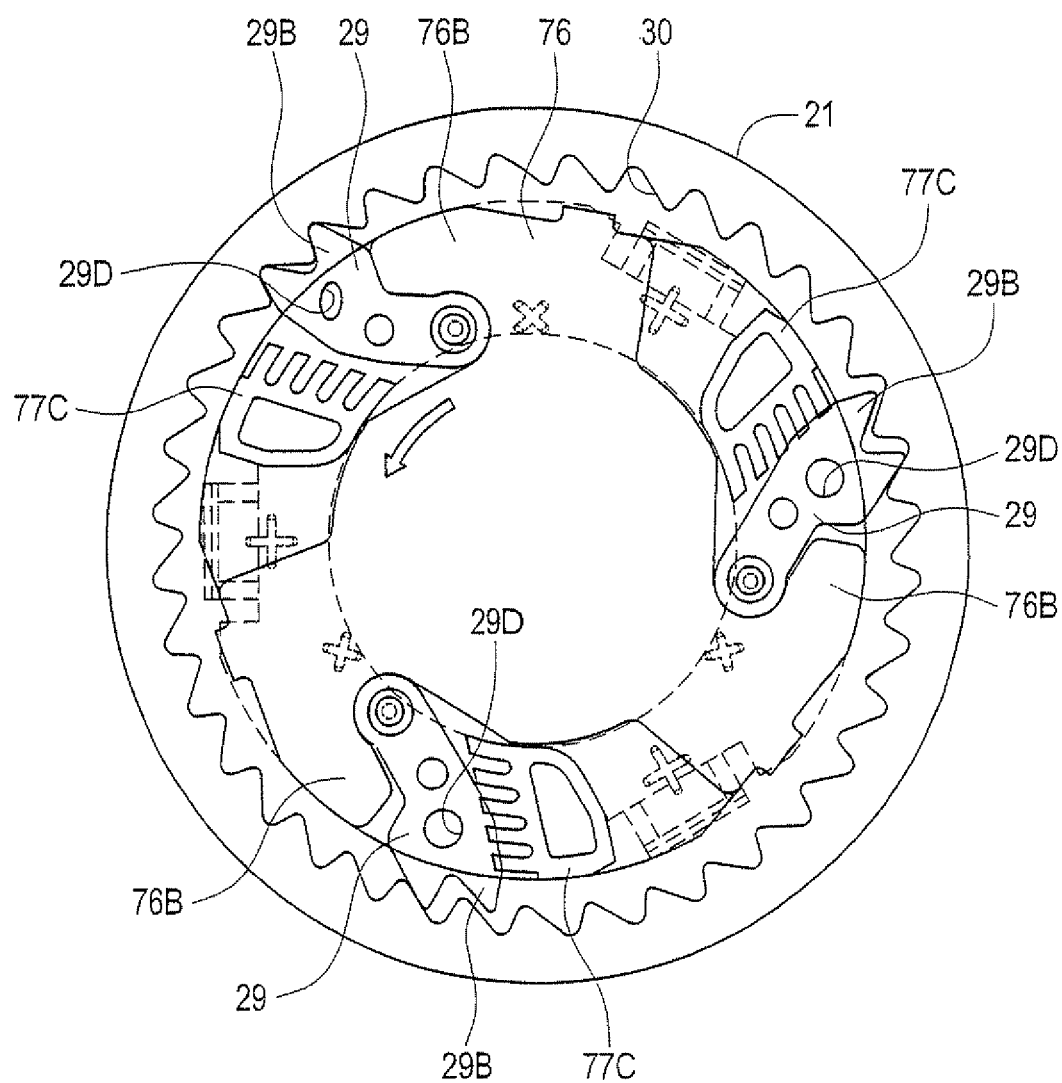
FIG. 30 is a partially enlarged view showing an enlarged state that all the clutch pawls are engaged with the clutch gear.

Then, since the pawl base 76 keeps rotating as shown in FIG. 29 and FIG. 30, the first clutch pawl 29 engaged with the clutch gear 30 is depressed by the pawl supporting block 76B of the pawl base 76 in a rotating direction and receive large depressing force from the clutch gear 30 in a reverse direction of rotation. Thus, the peripheral portion of the deforming through hole 29D of the first clutch pawl 29 engaged with the clutch gear 30 is plastically deformed, with the engagement tooth 29B thereof engaged with the clutch gear 30 by the depressing force in the reverse direction of rotation. As a result, the first clutch pawl 29 is deformed in a substantially L-shape protruding in a rotating direction.

Subsequently, the pawl base 76 further rotates by the deformation of the first clutch pawl 29 in a substantially L-shape and the other two clutch pawls 29 are brought into contact with and depressed by the respective guiding portions 77C of the pawl guide 77. Then, the two clutch pawls 29 protrude radially outwardly from the side face of the pawl base 76 and are each engaged with the clutch gear 30. As a result, the clutch pawls 29 engaged with the clutch gear 30 are depressed by the respective pawl supporting blocks 76B and rotated integrally with the pawl base 76, whereby the guiding drum 21 engaged with the clutch pawls 29 is rotated and driven in a retracting direction of the webbing 3.

In FIG. 27 through FIG. 30 as described above, in case the tip end portions of the engagement teeth 29B of the two of the three clutch pawls 29 are stuck with the teeth ends of the clutch gear 30 while the tip end portion of the engagement tooth 29B of the other one clutch pawl 29 is not stuck with the tooth end of the clutch gear 30, only these two clutch pawls 29 are engaged with the clutch gear 30 in response to the rotation of the pawl base 76. Since the pawl base 76 then keeps rotating, the two clutch pawls 29 engaged with the clutch gear 30 are depressed in a rotating direction by the pawl supporting blocks 76B of the pawl base 76 and thereby receive large depression force from the clutch gear 30 in a reverse direction of rotation.

Thus, the peripheral portion of the deforming through holes 29D of the two clutch pawls 29 engaged with the clutch gear 30 are plastically deformed, with the engagement teeth 29B thereof engaged with the clutch gear 30 by the depressing force in a reverse direction of rotation. As a result, the two clutch pawls 29 are deformed in a substantially L-shape protruding in a rotating direction. Then, the pawl base 76 further rotates by the deformation of the two clutch pawls 29 in a substantially L-shape, whereby the remaining one clutch pawl 29 is brought into contact with and depressed by the guiding portion 77C of the pawl guide 77 and protrudes radially outwardly from the side surface of the pawl base 76 to thereby engage with the clutch gear 30.

[Description of Pretensioner Operation (in Case the First Clutch Pawl has Tooth Contact Initially)]

Figure 31:
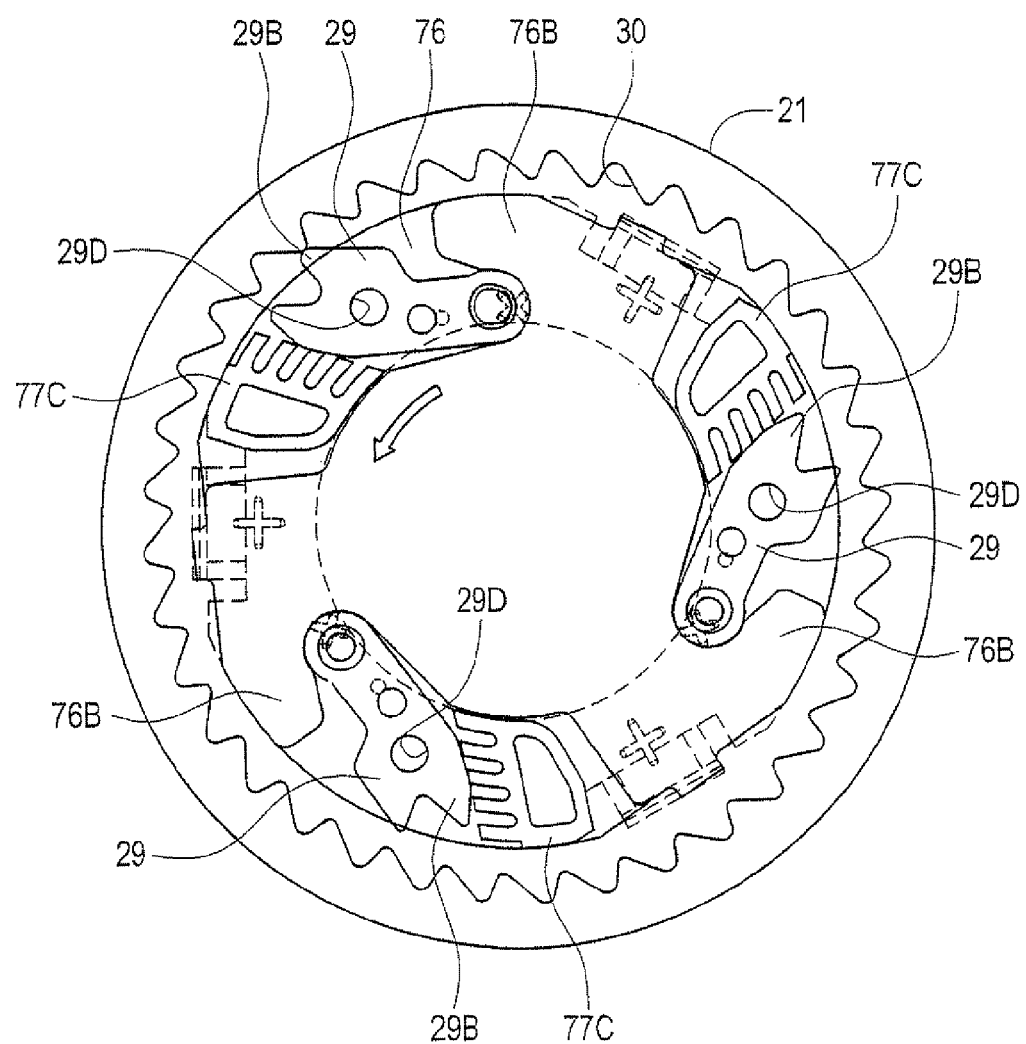
FIG. 31 is a partially enlarged view showing an enlarged state that the engagement tooth of the only one clutch pawl is in contact with the clutch gear.
Figure 32:
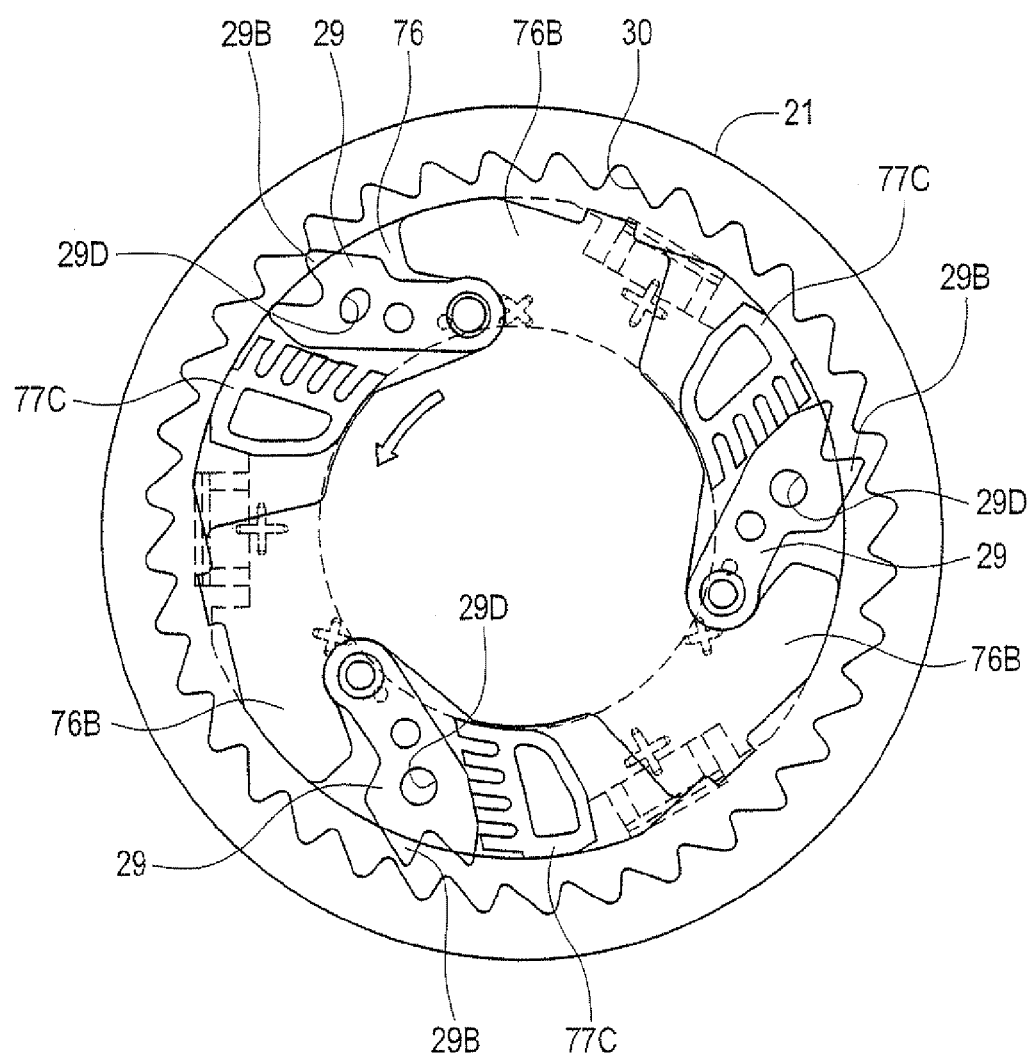
FIG. 32 is a partially enlarged view showing an enlarged state that the clutch pawl having tooth contact with the clutch gear is slightly deformed.
Figure 33:
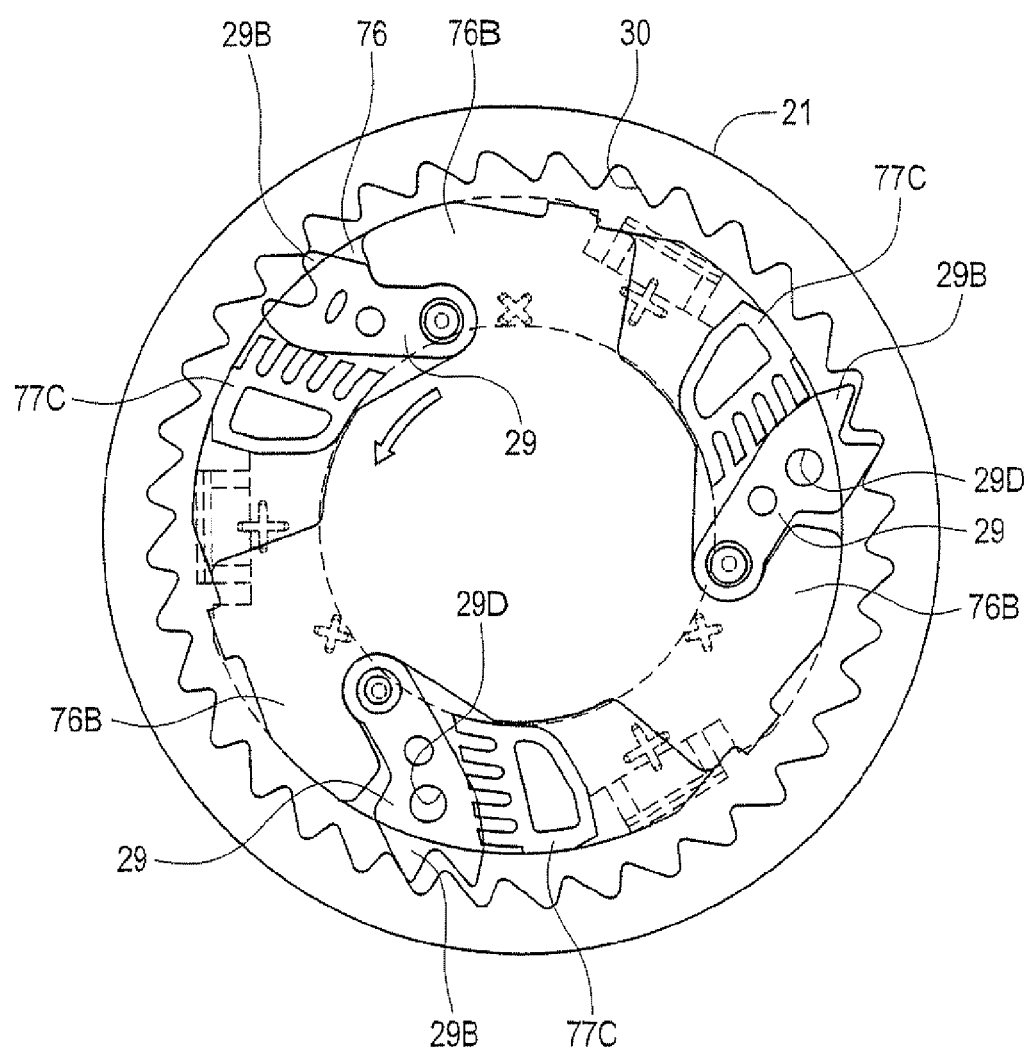
FIG. 33 is a partially enlarged view showing an enlarged state that two clutch pawls are engaged with the clutch gear.

Next, the description will be made based on FIG. 31 through FIG. 33, with regard to a case that only the engagement tooth 29B of the first clutch pawl 29 is brought into contact with the tip end portion of the clutch gear 30 of the guiding drum 21, that is, in case of tooth contact between the first clutch pawl 29 and the clutch gear 30. FIG. 31 through FIG. 33 are enlarged views showing an operation in case that only the engagement tooth 29B of the first clutch pawl 29 is brought into contact with the clutch gear 30 initially and then the other clutch pawls 29 are engaged with the clutch gear 30.

As shown in FIG. 31, when the piston 64 of the pretensioner unit 7 is activated in case of vehicle collision and rotation of the pawl base 76 is started through the pinion gear body 33, the respective tip end portions of the engagement teeth 29B of the clutch pawls 29 protrude from the side surface of the pawl base 76. Then, the rotation center of the pawl base 76 will be decentered from the rotation center of the guiding drum 21 and the tip end portion of the engagement tooth 29B of one of three clutch pawls 29 (the upper left clutch pawl 29 in FIG. 27) will be brought into contact with the tip end portion of the clutch gear 30. In such a case, that is, in case of tooth contact, this clutch pawl 29 cannot engage with the clutch gear 30.

Then, since the pawl base 76 keeps rotating as shown in FIG. 32 and FIG. 33, the first clutch pawl 29 with tooth contact with the clutch gear 30 is depressed toward the clutch gear 30 by the pawl supporting block 76B of the pawl base 76 and thereby receives large depressing force from the clutch gear 30 toward the base end portion in a longitudinal direction. Accordingly, the peripheral portion of the deforming through hole 29D formed in the engagement tooth 29B of the clutch pawl 29 with tooth contact with the clutch gear 30 is plastically deformed by this depressing force toward the base end portion in a longitudinal direction. Then, the clutch pawl 29 with tooth contact with the clutch gear 30 is compressed and deformed in a longitudinal direction.

Subsequent to the compression and deformation in a longitudinal direction of the clutch pawl 29 with tooth contact with the clutch gear 30, the pawl base 76 further rotates and the remaining two clutch pawls 29 are brought into contact with and depressed by the respective guiding portions 77C of the pawl guide 77. Then, the two clutch pawls 29 protrude from the side surface of the pawl base 76 radially outwardly and are each engaged with the clutch gear 30. As a result, while one clutch pawl 29 has tooth contact with the clutch gear, the remaining two clutch pawls 29 engaging with the clutch gear 30 are depressed by the respective pawl supporting blocks 76B and rotated integrally with the pawl base 76. Then, the guiding drum 21 which engages with the two clutch pawls 29 is rotated and driven in the retracting direction of the webbing 3.

Incidentally, in FIG. 31 through FIG. 33 as mentioned above, when the two clutch pawls 29 are brought into contact with the clutch gear 30 at their teeth, the peripheral portions of the deforming through holes 29D of these two clutch pawls 29 are plastically deformed and thereby compressed and deformed in a longitudinal direction. Then, the pawl base 76 can further rotate and the remaining one clutch pawl 29 protrudes from the side surface of the pawl base 76 outwardly to thereby engage with the clutch gear 30.

As was described in detail earlier, in the seatbelt retractor 1 according to the present embodiment, if the gas generating member 61 of the pretensioner mechanism 17 is activated in case of vehicle collision, the piston 64 is moved upwards inside the piston housing portion 62B of the pipe cylinder 62 from a normal state and comes in contact with the pinion gear portion 71 of the pinion gear body 33, whereby the pinion gear body 33 is caused to rotate.

Then, the pawl base 76 press-fitted and fixed to the pinion gear body 33 is rotated relatively with respect to the pawl guide 77 and the respective guiding portions 77C are brought into contact with the side faces of the clutch pawls 29 and pushes the clutch pawls 29, whereby the three clutch pawls 29 of which respective bosses 29A are inserted in the insertion holes 76A of the pawl base 76 protrude radially outwardly. The three clutch pawls 29 protruding from the side surface of the pawl base 76 radially outwardly are depressed by the pawl supporting blocks 76B and rotate integrally with the pawl base 76 while being engaged with the clutch gear 30 formed in an inner peripheral surface of the flange portion 27 of the guiding drum 21.

Accordingly, the rotation of the pinion gear body 33 and the pawl base 76 are transmitted to the guiding drum 21 through the three clutch pawls 29 which are rotatably supported at the pawl base 76 with the bosses 29A, whereby retraction of the webbing 3 is started. This contributes to reducing delay or time variance in transmission of driving force between the instant when the pinion gear body 33 is rotated and driven and the instant when the guiding drum 21 is rotated and driven. Further, it becomes possible to carry out a retracting operation of the webbing 3 in case of vehicle collision promptly and at a stable timing.

Further, in case one or two of the three clutch pawls 29 protrudes outwardly from the side surface of the pawl base 76 and engages with the clutch gear 30, the peripheral portion of the deforming through hole 29D of the clutch pawl 29 engaging with the clutch gear 30 is plastically deformed. As a result, the clutch pawl 29 engaging with the clutch gear 30 is deformed in a substantially L-shape while engaging with the clutch gear 30. Then, the pawl base 76 can be rotated further and the remaining clutch pawls 29 not yet engaged with the clutch gear 30 protrude outwardly from the side surface of the pawl base 76 further and engage with the clutch gear 30.

This means that, by providing the deforming through hole 29D in each of the clutch pawls 29, it is possible to engage three clutch pawls 29 with the clutch gear 30 even when one or two of the three clutch pawls 29 engage with the clutch gear 30. Accordingly, it is possible to disperse the rotary driving force of the pinion gear body 33 and the pawl base 76 through the three clutch pawls 29 to transmit to the clutch gear 30. It is thus possible to obtain a thin-walled flange portion 27 and thereby reduce the weight of a guiding drum 21.

Further, in case one or two of the three clutch pawls 29 protrudes outwardly from the side surface of the pawl base 76 and is brought into contact with the clutch gear 30 at the tooth thereof, the peripheral portion of the deforming through hole 29D of the clutch pawl 29 with tooth contact with the clutch gear 30 is plastically deformed. As a result, the clutch pawl 29 with tooth contact with the clutch gear 30 is compressed and deformed in a longitudinal direction. Then, the pawl base 76 can be rotated further and the remaining clutch pawls 29 without tooth contact protrude outwardly from the side surface of the pawl base 76 further and engage with the clutch gear 30.

This means that, by providing the deforming through hole 29D in each of the clutch pawls 29, it is possible to engage three clutch pawls 29 with the clutch gear 30 even when one or two of the three clutch pawls 29 is in contact with the clutch gear 30 at the tooth thereof. Accordingly, it is possible to disperse the rotary driving force of the pinion gear body 33 and the pawl base 76 through the three clutch pawls 29 to transmit to the clutch gear 30. It is thus possible to obtain a thin-walled flange portion 27 and thereby reduce the weight of a guiding drum 21.

The present invention is not limited to the above-described embodiment, but various improvements and alterations can be made thereto without departing from the spirit of the present invention. For instance, the invention may be modified in the following manners.

Other Embodiment 1

Figure 34:
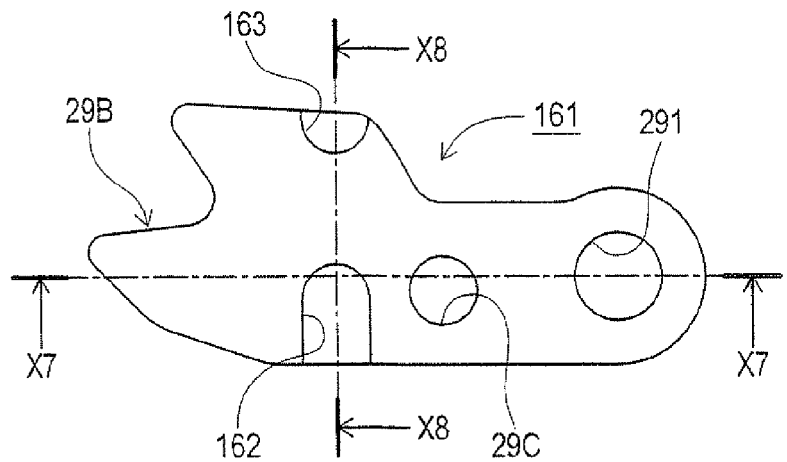
FIG. 34 is a plain view showing clutch pawls according to another embodiment.
Figure 35:
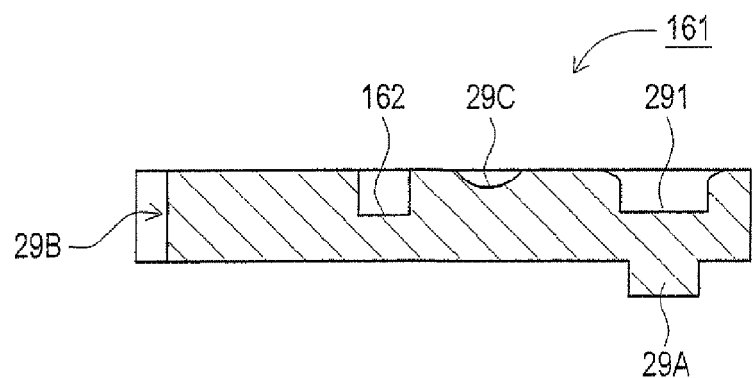
FIG. 35 is a cross sectional view taken along arrow X7-X7 in FIG. 34.
Figure 36:
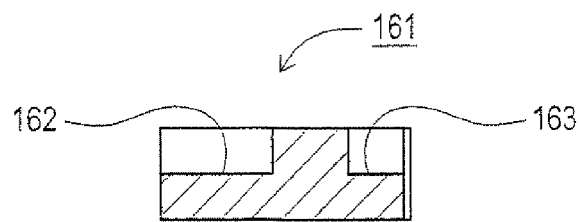
FIG. 36 is a cross sectional view taken along arrow X8-X8 in FIG. 35.

(A) Instead of the clutch pawl 29 as mentioned above, it is possible to employ a clutch pawl 161 as shown in FIG. 34 through FIG. 36. FIG. 34 through FIG. 36 are views showing the configuration of the clutch pawl 161 according to other embodiment 1. In the following description, numerical symbols which are the same as those in the clutch pawl 29 according to the above-described embodiment shown in FIG. 19 and FIG. 20 represent the same elements in the clutch pawl 29 according to the above-described embodiment or correspondences thereof.

As shown in FIG. 34 through FIG. 36, the clutch pawl 161 is configured in a substantially same manner as the clutch pawl 29 according to the above-described embodiment. However, the clutch pawl 161 is different from the clutch pawl 29 in that, instead of the deforming through hole 29D, deforming groove portions 162 and 163 are formed around a position where the deforming through hole 29D is to be formed. It is to be noted that the clutch pawl 161 may be configured in such a manner that only deforming groove portion 162 is formed therein. Alternatively, the deforming groove portions 162 and 163 may be formed in the reverse side of the side face in which the deforming through hole 29D is to be formed. Alternatively, the deforming groove portions 162 and 163 may be configured so that the bottom faces thereof are recessed in an arc shape.

The deforming groove portion 162 is formed in one side face of the clutch pawl 161 in which the groove portion 291 is formed, extending from the side face which is in contact with the guiding portion 77C of the pawl guide 77 to a substantially center portion in a width direction so as to be substantially right-angled with respect to a longitudinal direction. Further, the deforming groove portion 162 is formed so as to have a depth which is substantially half the thickness of the clutch pawl 161 and a width which is substantially equal to the diameter of the deforming through hole 29D, and be recessed in a substantially U-shape in cross section.

The deforming groove portion 163 is formed in one side face of the clutch pawl 161 in which the groove portion 291 is formed, extending from the side face which is opposed to the side face where the deforming groove portion 162 is formed and having shorter length than the length of deforming groove portion 162 so as to be substantially right-angled with respect to a longitudinal direction. Further, the deforming groove portion 163 is formed so as to have a depth which is substantially half the depth of the thickness of the clutch pawl 161 and a width which is substantially equal to the diameter of the deforming through hole 29D, and be recessed in a substantially U-shape in cross section.

Accordingly, as shown in FIG. 27 through FIG. 30, in case one or two of the three clutch pawls 161 protrudes outwardly from the side surface of the pawl base 76 and engages with the clutch gear 30, the peripheral portions of the deforming groove portions 162 and 163 of the clutch pawl 161 engaging with the clutch gear 30 are plastically deformed. As a result, the clutch pawl 161 engaging with the clutch gear 30 is deformed in a substantially L-shape while engaging with the clutch gear 30. Then, the pawl base 76 can be rotated further and the remaining clutch pawls 161 not yet engaged with the clutch gear 30 protrude outwardly from the side surface of the pawl base 76 further and engage with the clutch gear 30.

This means that, by providing the deforming groove portions 162 and 163 in each of the clutch pawls 161, it is possible to engage three clutch pawls 161 with the clutch gear 30 even when one or two of the three clutch pawls 161 engage with the clutch gear 30. Accordingly, it is possible to disperse the rotary driving force of the pinion gear body 33 and the pawl base 76 through the three clutch pawls 161 to transmit to the clutch gear 30. It is thus possible to obtain a thin-walled flange portion 27 and thereby reduce the weight of a guiding drum 21.

Further, as shown in FIG. 31 through FIG. 33, in case one or two of the three clutch pawls 161 protrudes outwardly from the side surface of the pawl base 76 and is brought into contact with the clutch gear 30 at the tooth thereof, the peripheral portions of the deforming groove portions 162 and 163 of the clutch pawl 161 with tooth contact with the clutch gear 30 is plastically deformed. As a result, the clutch pawl 161 with tooth contact with the clutch gear 30 is compressed and deformed in a longitudinal direction. Then, the pawl base 76 can be rotated further and the remaining clutch pawls 161 without tooth contact protrude outwardly from the side surface of the pawl base 76 further and engage with the clutch gear 30.

This means that, by providing the deforming groove portions 162 and 163 in each of the clutch pawls 161, even when one or two of the three clutch pawls 161 is in contact with the clutch gear 30 at the tooth thereof, it is possible to engage the remaining clutch pawls 161 without tooth contact with the clutch gear 30. Accordingly, it is possible to disperse the rotary driving force of the pinion gear body 33 and the pawl base 76 through the three clutch pawls 161 to transmit to the clutch gear 30. It is thus possible to obtain a thin-walled flange portion 27 and thereby reduce the weight of a guiding drum 21.

Other Embodiment 2

Figure 37:
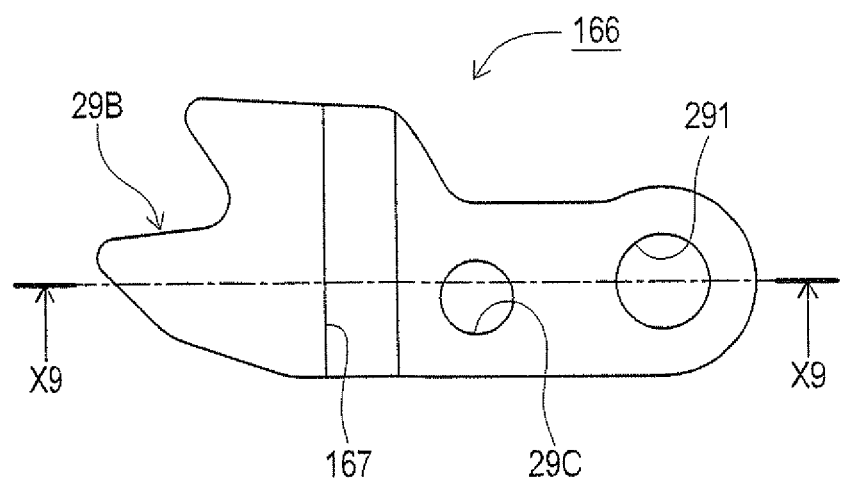
FIG. 37 is a plain view showing clutch pawls according to another embodiment.
Figure 38:
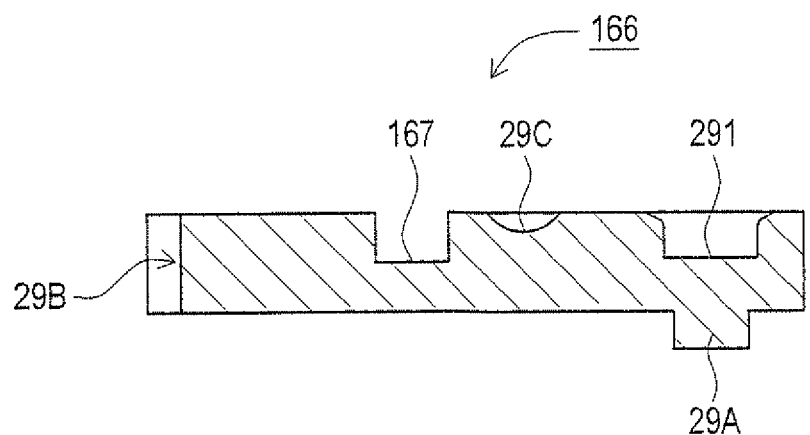
FIG. 38 is a cross sectional view taken along arrow X9-X9 in FIG. 37.

(B) Instead of the clutch pawl 29 as mentioned above, it is possible to employ a clutch pawl 166 as shown in FIG. 37 and FIG. 38. FIG. 37 and FIG. 38 are views showing the configuration of the clutch pawl 166 according to other embodiment 2. In the following description, numerical symbols which are the same as those in the clutch pawl 29 according to the above-described embodiment shown in FIG. 19 and FIG. 20 represent the same elements in the clutch pawl 29 according to the above-described embodiment or correspondences thereof.

As shown in FIG. 37 and through FIG. 38, the clutch pawl 166 is configured in a substantially same manner as the clutch pawl 29 according to the above-described embodiment. However, the clutch pawl 166 is different from the clutch pawl 29 in that, instead of the deforming through hole 29D, a deforming groove portion 167 is formed around a position where the deforming through hole 29D is to be formed. It is to be noted that the deforming groove portion 167 may be formed in the reverse side of the side face in which the deforming through hole 29D is to be formed. Alternatively, the deforming groove portion 167 may be configured so that the bottom face thereof is recessed in an arc shape.

The deforming groove portion 167 is formed in the side face of the clutch pawl 166 in which the groove portion 291 is formed, extending from the side face which is in contact with the guiding portion 77C of the pawl guide 77 to its opposite side face, across the entire width of the clutch pawl 166. Further, the deforming groove portion 167 is formed so as to have a depth which is substantially half the thickness of the clutch pawl 166 and a width which is substantially equal to the diameter of the deforming through hole 29D, and be recessed in a substantially U-shape in cross section.

Accordingly, as shown in FIG. 27 through FIG. 30, in case one or two of the three clutch pawls 166 protrudes outwardly from the side surface of the pawl base 76 and engages with the clutch gear 30, the peripheral portion of the deforming groove portion 167 of the clutch pawl 166 engaging with the clutch gear 30 is plastically deformed. As a result, the clutch pawl 166 engaging with the clutch gear 30 is deformed in a substantially L-shape while engaging with the clutch gear 30. Then, the pawl base 76 can be rotated further and the other clutch pawls 166 not yet engaged with the clutch gear 30 protrude outwardly from the side surface of the pawl base 76 further and engage with the clutch gear 30.

This means that, by providing the deforming groove portion 167 in each of the clutch pawls 166, it is possible to engage three clutch pawls 166 with the clutch gear 30 even when one or two of the three clutch pawls 166 engage with the clutch gear 30. Accordingly, it is possible to disperse the rotary driving force of the pinion gear body 33 and the pawl base 76 through the three clutch pawls 166 to transmit to the clutch gear 30. It is thus possible to obtain a thin-walled flange portion 27 and thereby reduce the weight of a guiding drum 21.

Further, as shown in FIG. 31 through FIG. 33, in case one or two of the three clutch pawls 166 protrudes outwardly from the side surface of the pawl base 76 and is brought into contact with the clutch gear 30 at the tooth thereof, the peripheral portion of the deforming groove portion 167 of the clutch pawl 166 with tooth contact with the clutch gear 30 is plastically deformed and thereby compressed and deformed in a longitudinal direction. Then, the pawl base 76 can be rotated further and the remaining clutch pawls 166 without tooth contact protrude outwardly from the side surface of the pawl base 76 further and engage with the clutch gear 30.

This means that, by providing the deforming groove portion 167 in each of the clutch pawls 166, even when one or two of the three clutch pawls 166 is in contact with the clutch gear 30 at the tooth thereof, it is possible to engage the remaining clutch pawls 166 without tooth contact with the clutch gear 30. Accordingly, it is possible to disperse the rotary driving force of the pinion gear body 33 and the pawl base 76 through the three clutch pawls 166 to transmit to the clutch gear 30. It is thus possible to obtain a thin-walled flange portion 27 and thereby reduce the weight of a guiding drum 21.

Other Embodiment 3

Figure 39:
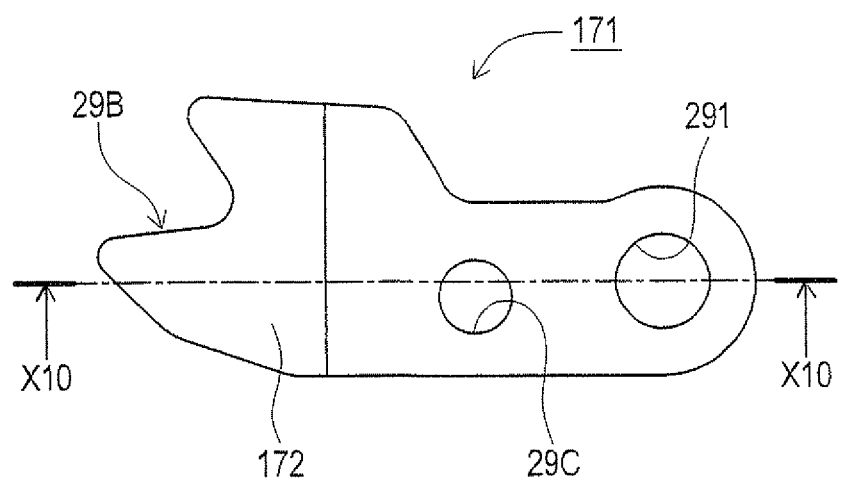
FIG. 39 is a plain view showing clutch pawls according to another embodiment.
Figure 40:
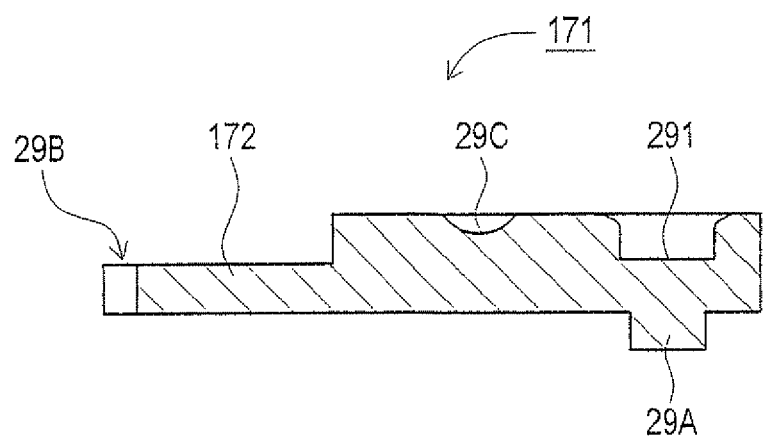
FIG. 40 is a cross sectional view taken along arrow X10-X10 in FIG. 39.

(C) Instead of the clutch pawl 29 as mentioned above, it is possible to employ a clutch pawl 171 as shown in FIG. 39 and FIG. 40. FIG. 39 and FIG. 40 are views showing the configuration of the clutch pawl 171 according to other embodiment 3. In the following description, numerical symbols which are the same as those in the clutch pawl 29 according to the above-described embodiment shown in FIG. 19 and FIG. 20 represent the same elements in the clutch pawl 29 according to the above-described embodiment or correspondences thereof.

As shown in FIG. 39 and FIG. 40, the clutch pawl 171 is configured in a substantially same manner as the clutch pawl 29 according to the above-described embodiment. However, the clutch pawl 171 is different from the clutch pawl 29 in that, a thin portion 172 is formed instead of the deforming through hole 29D. It is to be noted that the thin portion 172 may be configured so that the side face thereof at the base end portion is recessed in an arc shape in plain view.

This thin portion 172 is recessed in the surface of the clutch pawl 171 in which the recessed portion 291 is formed, extending from the tip end portion of the engagement tooth 29B to a substantially center portion in a longitudinal direction of the engagement tooth 29B over the full width thereof. The thin portion 172 is formed so as to have a thickness which is substantially half the thickness of the base end portion. The side face of the thin portion 172 at the base end portion side in a longitudinal direction thereof is formed so as to be substantially right-angled with respect to the longitudinal direction. It is to be noted that the thin portion 172 may be formed in the reverse side of the face in which the recessed portion 291 is formed. Furthermore, the thin portion 172 may be recessed in the both side faces by substantially one fourth of the thickness of the base end portion so as to have a thickness which is substantially half the thickness of the base end portion.

Accordingly, as shown in FIG. 27 through FIG. 30, in case one or two of the three clutch pawls 171 protrudes outwardly from the side surface of the pawl base 76 and engages with the clutch gear 30, the thin portion 172 of the clutch pawl 171 engaging with the clutch gear 30 is plastically deformed. As a result, the clutch pawl 171 engaging with the clutch gear 30 is deformed in a substantially L-shape while engaging with the clutch gear 30. Then, the pawl base 76 can be rotated further and the remaining clutch pawls 171 not yet engaged with the clutch gear 30 protrude outwardly from the side surface of the pawl base 76 further and engage with the clutch gear 30.

This means that, by providing the thin portion 172 in each of the clutch pawls 171, it is possible to engage three clutch pawls 171 with the clutch gear 30 even when one or two of the three clutch pawls 171 is engaged with the clutch gear 30. Accordingly, it is possible to disperse the rotary driving force of the pinion gear body 33 and the pawl base 76 through the three clutch pawls 171 to transmit to the clutch gear 30. It is thus possible to obtain a thin-walled flange portion 27 and thereby reduce the weight of a guiding drum 21.

Further, as shown in FIG. 31 through FIG. 33, in case one or two of the three clutch pawls 171 protrudes outwardly from the side surface of the pawl base 76 and is brought into contact with the clutch gear 30 at the tooth thereof, the thin portion 172 of the clutch pawl 171 with tooth contact with the clutch gear 30 is plastically deformed. As a result, the clutch pawl 171 with tooth contact with the clutch gear 30 is compressed and deformed in a longitudinal direction. Then, the pawl base 76 can be rotated further and the remaining clutch pawls 171 without tooth contact protrude outwardly from the side surface of the pawl base 76 further and engage with the clutch gear 30.

This means that, by providing the thin portion 172 in each of the clutch pawls 171, even when one or two of the three clutch pawls 171 is in contact with the clutch gear 30 at the tooth thereof, it is possible to engage the remaining clutch pawls 171 without tooth contact with the clutch gear 30. Accordingly, it is possible to disperse the rotary driving force of the pinion gear body 33 and the pawl base 76 through the three clutch pawls 171 to transmit to the clutch gear 30. It is thus possible to obtain a thin-walled flange portion 27 and thereby reduce the weight of a guiding drum 21.

Other Embodiment 4

Figure 41:
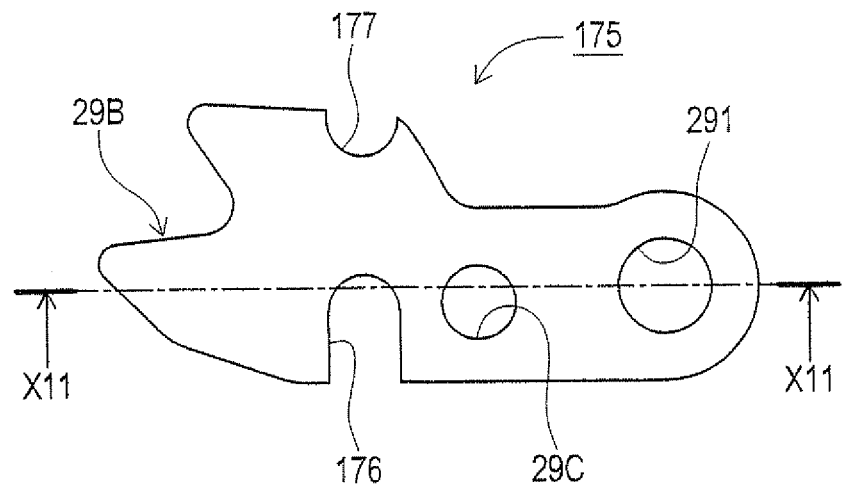
FIG. 41 is a plain view showing clutch pawls according to another embodiment.
Figure 42:
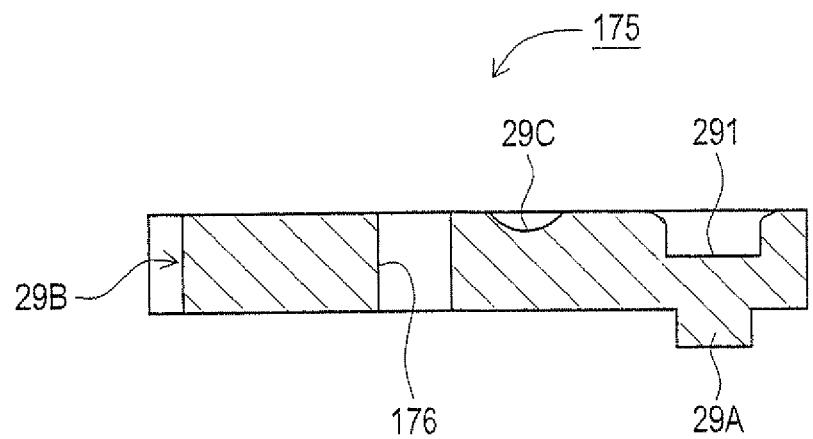
FIG. 42 is a cross sectional view taken along arrow X11-X11 in FIG. 41.

(D) Instead of the clutch pawl 29 as mentioned above, it is possible to employ a clutch pawl 175 as shown in FIG. 41 and FIG. 42. FIG. 41 and FIG. 42 are views showing the configuration of the clutch pawl 175 according to other embodiment 4. In the following description, numerical symbols which are the same as those in the clutch pawl 29 according to the above-described embodiment shown in FIG. 19 and FIG. 20 represent the same elements in the clutch pawl 29 according to the above-described embodiment or correspondences thereof.

As shown in FIG. 41 and FIG. 42, the clutch pawl 175 is configured in a substantially same manner as the clutch pawl 29 according to the above-described embodiment. However, the clutch pawl 175 is different from the clutch pawl 29 in that, instead of the deforming through hole 29D, deforming cut-out groove portions 176 and 177 are formed around a position where the deforming through hole 29D is to be formed. It is to be noted that the deforming cut-out groove portions 176 and 177 may be configured so that the side faces thereof at the deeper side are formed in a substantially U-shape in plain view.

This deforming cut-out groove portion 176 is cut out from the side face which is in contact with the guiding portion 77C of the pawl guide 77 to a substantially center portion in a width direction so as to be substantially right-angled with respect to a longitudinal direction. The deforming cut-out groove portion 176 is cut out over the full thickness of the clutch pawl 175 so that a width thereof is substantially equal to the diameter of the above-described deforming through hole 29D. The deforming cut-out groove portion 177 is cut out from the opposite side face of the side face where the deforming cut-out groove portion 176 is formed by shorter length than that of the deforming cut-out groove portion 176 so as to be substantially right-angled with respect to a longitudinal direction. The deforming cut-out groove portion 177 is cut out over the full thickness of the clutch pawl 175 so that a width thereof is substantially equal to the diameter of the above-described deforming through hole 29D.

Accordingly, as shown in FIG. 27 through FIG. 30, in case one or two of the three clutch pawls 175 protrudes outwardly from the side surface of the pawl base 76 and engages with the clutch gear 30, the narrow portion between the deforming cut-out groove portions 176 and 177 of the clutch pawl 175 engaging with the clutch gear 30 are plastically deformed. As a result, the clutch pawl 175 engaging with the clutch gear 30 is deformed in a substantially L-shape while engaging with the clutch gear 30. Then, the pawl base 76 can be rotated further and the remaining clutch pawls 175 not yet engaged with the clutch gear 30 protrude outwardly from the side surface of the pawl base 76 further and engage with the clutch gear 30.

This means that, by providing the deforming cut-out groove portions 176 and 177 in each of the clutch pawls 175, it is possible to engage three clutch pawls 175 with the clutch gear 30 even when one or two of the three clutch pawls 175 engage with the clutch gear 30. Accordingly, it is possible to disperse the rotary driving force of the pinion gear body 33 and the pawl base 76 through the three clutch pawls 175 to transmit to the clutch gear 30. It is thus possible to obtain a thin-walled flange portion 27 and thereby reduce the weight of a guiding drum 21.

Further, as shown in FIG. 31 through FIG. 33, in case one or two of the three clutch pawls 175 protrudes outwardly from the side surface of the pawl base 76 and is brought into contact with the clutch gear 30 at the tooth thereof, the narrow portion between the deforming cut-out groove portions 176 and 177 of the clutch pawl 175 with tooth contact with the clutch gear 30 is plastically deformed. As a result, the clutch pawl 175 with tooth contact with the clutch gear 30 is compressed in a longitudinal direction or deformed in a substantially L-shape. Then, the pawl base 76 can be rotated further and the remaining clutch pawls 175 without tooth contact protrude outwardly from the side surface of the pawl base 76 further and engage with the clutch gear 30.

This means that, by providing the deforming cut-out groove portions 176 and 177 in each of the clutch pawls 175, even when one or two of the three clutch pawls 175 is in contact with the clutch gear 30 at the tooth thereof, it is possible to engage the remaining clutch pawls 175 without tooth contact with the clutch gear 30. Accordingly, it is possible to disperse the rotary driving force of the pinion gear body 33 and the pawl base 76 through the three clutch pawls 175 to transmit to the clutch gear 30. It is thus possible to obtain a thin-walled flange portion 27 and thereby reduce the weight of a guiding drum 21.

Other Embodiment 5

Figure 43:
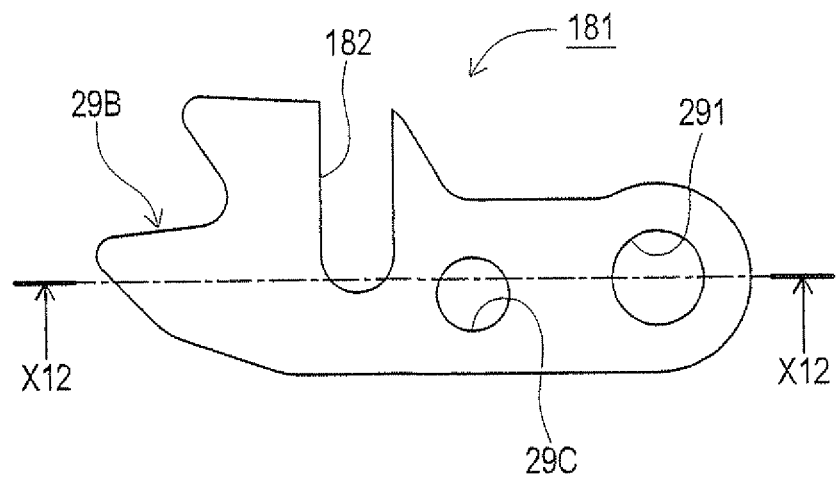
FIG. 43 is a plain view showing clutch pawls according to another embodiment.
Figure 44:
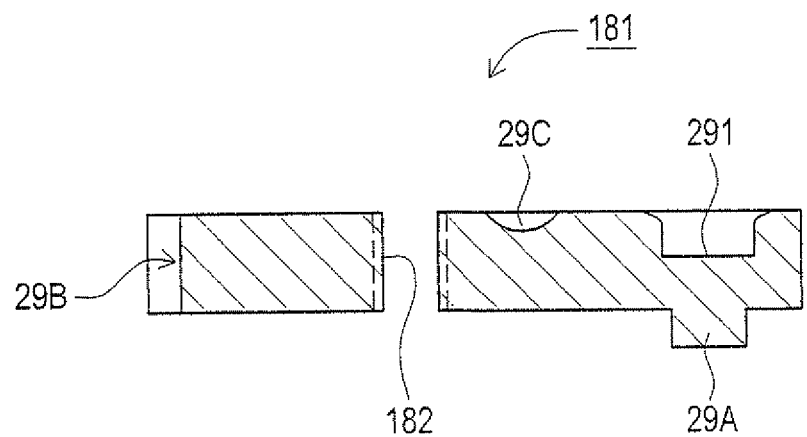
FIG. 44 is a cross sectional view taken along arrow X12-X12 in FIG. 43.

(E) Instead of the clutch pawl 29 as mentioned above, it is possible to employ a clutch pawl 181 as shown in FIG. 43 and FIG. 44. FIG. 43 and FIG. 44 are views showing the configuration of the clutch pawl 181 according to other embodiment 5. In the following description, numerical symbols which are the same as those in the clutch pawl 29 according to the above-described embodiment shown in FIG. 19 and FIG. 20 represent the same elements in the clutch pawl 29 according to the above-described embodiment or correspondences thereof.

As shown in FIG. 43 and FIG. 44, the clutch pawl 181 is configured in a substantially same manner as the clutch pawl 29 according to the above-described embodiment. However, the clutch pawl 181 is different from the clutch pawl 29 in that, instead of the deforming through hole 29D, a deforming cut-out groove portion 182 is formed around a position where the deforming through hole 29D is to be formed. It is to be noted that the deforming cut-out groove portion may be cut out from the opposite side. Further, the deforming cut-out groove portion 182 may be configured so that the side face thereof at the deeper side is formed in a substantially U-shape in plain view.

The deforming cut-out groove portion 182 is cut out from the other side face of the side face which is in contact with the guiding portion 77C of the pawl guide 77, extending to a position ranging between substantially half and three fourths the full width, so as to be substantially right-angled with respect to a longitudinal direction. The deforming cut-out groove portion 182 is cut out over the full thickness of the clutch pawl 181 so that the width thereof is substantially equal to the diameter of the deforming through hole 29D as mentioned above.

Accordingly, as shown in FIG. 27 through FIG. 30, in case one or two of the three clutch pawls 181 protrudes outwardly from the side surface of the pawl base 76 and engages with the clutch gear 30, the narrow portion between the deforming cut-out groove portion 181 of the clutch pawl 181 engaging with the clutch gear 30 and the side face thereof which is in contact with the guiding portion 77C of the pawl guide 77 is plastically deformed. As a result, the clutch pawl 181 engaging with the clutch gear 30 is deformed in a substantially L-shape while engaging with the clutch gear 30. Then, the pawl base 76 can be rotated further and the remaining clutch pawls 181 not yet engaged with the clutch gear 30 protrude outwardly from the side surface of the pawl base 76 further and engage with the clutch gear 30.

This means that, by providing the deforming cut-out groove portion 182 in each of the clutch pawls 181, it is possible to engage three clutch pawls 181 with the clutch gear 30 even when one or two of the three clutch pawls 181 engage with the clutch gear 30. Accordingly, it is possible to disperse the rotary driving force of the pinion gear body 33 and the pawl base 76 through the three clutch pawls 181 to transmit to the clutch gear 30. It is thus possible to obtain a thin-walled flange portion 27 and thereby reduce the weight of a guiding drum 21.

Further, as shown in FIG. 31 through FIG. 33, in case one or two of the three clutch pawls 181 protrudes outwardly from the side surface of the pawl base 76 and is brought into contact with the clutch gear 30 at the tooth thereof, the narrow portion between the deforming cut-out groove portion 182 of the clutch pawl 181 with tooth contact with the clutch gear 30 and the side face thereof which is in contact with the guiding portion 77C of the pawl guide 77 is plastically deformed. As a result, the clutch pawl 181 with tooth contact with the clutch gear is compressed in a longitudinal direction or deformed in a substantially L-shape. Then, the pawl base 76 can be rotated further and the remaining clutch pawls 181 without tooth contact protrude outwardly from the side surface of the pawl base 76 further and engage with the clutch gear 30.

This means that, by providing the deforming cut-out groove portion 182 in each of the clutch pawls 181, even when one or two of the three clutch pawls 181 is in contact with the clutch gear 30 at the tooth thereof, it is possible to engage the remaining clutch pawls 181 without tooth contact with the clutch gear 30. Accordingly, it is possible to disperse the rotary driving force of the pinion gear body 33 and the pawl base 76 through the three clutch pawls 181 to transmit to the clutch gear 30. It is thus possible to obtain a thin-walled flange portion 27 and thereby reduce the weight of a guiding drum 21.

The invention claimed is:

1. A seatbelt retractor comprising a take-up drum which retracts a webbing and is rotatably housed in a housing, a pretensioner assembly which rotates the take-up drum in its retracting direction to retract the webbing in case of vehicle collision,
wherein the pretensioner assembly comprises:
a pinion gear body which rotates coaxially with rotational axis of the take-up drum in case of vehicle collision;
a driving device which rotates and drives the pinion gear body;
a first rotation body which is mounted coaxially with the pinion gear body;
a second rotation body which is mounted coaxially and fixedly with the pinion gear body and is kept in stationary state in an initial phase of rotation of the pinion gear body; and
a plurality of clutch pawls each formed in a substantially flat plate shape and held between the first rotation body and the second rotation body, the plurality of clutch pawls each of which includes a first end portion which is rotatably supported at the first rotation body so as to be capable of swinging radially outwardly and a second end portion which is caused to protrude from an outer peripheral portion of the first rotation body and an outer peripheral portion of the second rotation body by swinging of each of the plurality of clutch pawls radially outwardly in response to relative rotation of the first rotation body with respect to the second rotation body,
wherein the take-up drum comprises:
a flange portion which extends radially outwardly from an outer periphery of an edge portion of the take-up drum closer to the pinion gear body, the flange portion further extending in a direction of the rotational axis so as to face the outer peripheral portion the first rotation body and the outer peripheral portion of the second rotation body;
a clutch gear formed in an inner peripheral surface of the flange portion facing the outer peripheral portion of the first rotation body and the outer peripheral portion of the second rotation body,
wherein each of the plurality of clutch pawls comprises:
an engagement tooth formed at the second end portion, the engagement tooth engaging with the clutch gear at a projecting position of the engagement tooth; and
a deformable portion formed between the engagement tooth and the first end portion, the deformable portion being deformable plastically, and
wherein, in case only part of the plurality of clutch pawls engages with the clutch gear, or in case at least one of the plurality of clutch pawls has tooth contact with the clutch gear, the deformable portion of the part of the clutch pawl is plastically deformed, whereby the first rotation body further rotates relatively with respect to the second rotation body and other clutch pawls are caused to protrude further and engage with the clutch gear.

2. The seatbelt retractor according to claim 1, wherein the second rotation body comprises a plurality of guiding portions which are brought into contact with respective front side surfaces of the plurality of clutch pawls in a rotating direction in response to relative rotation of the second rotation body with respect to the first rotation body and slidably move the plurality of clutch pawls while depressing radially outwardly.

3. The seatbelt retractor according to claim 1, wherein the deformable portion comprises a through hole formed at a flat portion between the engagement tooth and the first end portion.

4. The seatbelt retractor according to claim 1, wherein the deformable portion comprises a groove portion which has a predetermined depth and is formed in one of surfaces of the flat portion between the engagement tooth and the first end portion.

5. The seatbelt retractor according to claim 1, wherein the deformable portion is formed so that thickness of the engagement tooth is thinner than thickness of the first end portion.

6. The seatbelt retractor according to claim 1, wherein the deformable portion comprises a cut-out groove portion formed inwardly from at least one of side surfaces of the flat portion between the engagement tooth and the first end portion.

* * * * *